United States Patent
Chang et al.

(10) Patent No.: US 7,542,504 B2
(45) Date of Patent: Jun. 2, 2009

(54) FREQUENCY HOPPING OFDMA METHOD USING SYMBOLS OF COMB PATTERN

(75) Inventors: Kyung-Hi Chang, Daejon (KR); Kwang-Soon Kim, Daejon (KR); Yong-Soo Cho, Seoul (KR); Suk-Won Ha, Seoul (KR)

(73) Assignee: Electronics and Telecommunications Research Institute (KR)

( * ) Notice: Subject to any disclaimer, the term of this patent is extended or adjusted under 35 U.S.C. 154(b) by 651 days.

(21) Appl. No.: 10/532,734

(22) PCT Filed: Nov. 26, 2002

(86) PCT No.: PCT/KR02/02214

§ 371 (c)(1),
(2), (4) Date: Oct. 3, 2005

(87) PCT Pub. No.: WO2004/038972

PCT Pub. Date: May 6, 2004

(65) Prior Publication Data

US 2006/0072649 A1    Apr. 6, 2006

(30) Foreign Application Priority Data

Oct. 26, 2002    (KR) .................. 10-2002-0065638

(51) Int. Cl.
*H04B 1/00* (2006.01)
*H04B 1/66* (2006.01)

(52) U.S. Cl. .................. 375/132; 375/135; 375/136; 375/240.26

(58) Field of Classification Search ......... 375/132–138, 375/260, 295, 316, 240.26–240.27; 370/526, 370/525; 455/701–703
See application file for complete search history.

(56) References Cited

U.S. PATENT DOCUMENTS

RE37,802 E  *  7/2002  Fattouche et al. ........... 375/141

(Continued)

FOREIGN PATENT DOCUMENTS

EP    01001566    5/2000

(Continued)

OTHER PUBLICATIONS

He et al, "Computing Partial DFT for Comb Spectrum Evaluation", Jun. 1996, IEEE Signal Processing Letters, vol. 3, No. 6, pp. 173-175.*

(Continued)

*Primary Examiner*—David C Payne
*Assistant Examiner*—Linda Wong
(74) *Attorney, Agent, or Firm*—Blakely, Sokoloff, Taylor & Zafman

(57) ABSTRACT

Method for providing frequency-hopping OFDMA using symbols of comb patter, the method including the steps of: a) assigning frequency domain signal X(k) of comb pattern (comb symbol, k is frequency index) to modulated data sequence, the comb symbol comprising predetermined number of sub carriers (sub carrier group) which are placed with predetermined interval in the whole available frequency band; b) getting the comb symbol hopped for the comb symbol to have independent frequency offset; and c) inverse fast fourier transforming the comb symbol to time domain signal x(n) (n is time index) and transmitting the signal.

31 Claims, 46 Drawing Sheets

U.S. PATENT DOCUMENTS

| | | | |
|---|---|---|---|
| 6,549,566 B1* | 4/2003 | Lee et al. | 375/219 |
| 6,549,784 B1* | 4/2003 | Kostic et al. | 455/501 |
| 6,563,881 B1* | 5/2003 | Sakoda et al. | 375/260 |
| 6,628,673 B1* | 9/2003 | McFarland et al. | 370/481 |
| 6,650,616 B2* | 11/2003 | Crawford | 370/203 |
| 7,272,162 B2* | 9/2007 | Sano et al. | 375/135 |
| 2004/0062193 A1* | 4/2004 | Ma et al. | 370/208 |

FOREIGN PATENT DOCUMENTS

| | | |
|---|---|---|
| JP | 09261130 A | 3/1997 |
| JP | 2001-156739 | 6/2001 |
| JP | 2001-186104 | 7/2001 |
| JP | 2001-251268 | 9/2001 |
| JP | 2001-358615 | 12/2001 |

OTHER PUBLICATIONS

He et al, "VLSI Computation of the Partial DFT for (De)modulation in Multi-Channel OFDM System", Sep. 27-29, 1995, Personal, Indoor and Mobile Radio Communications, Sixth IEEE International Symbposium, vol. 3, pp. 1257-1261.*

Justin Chuang et al., "Beyond 3G: Wideband Wireless Data Access Based on OFDM and Dynamic Packet Aswsignment" IEEE Communications Magazine, Jul. 2000 (pp. 78-87).

* cited by examiner

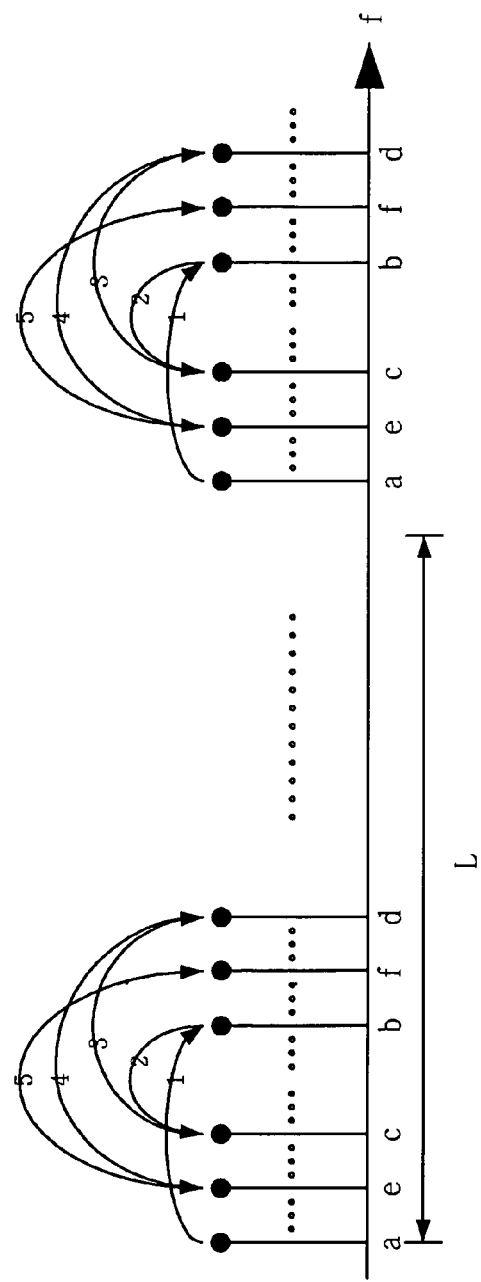
FIG. 10
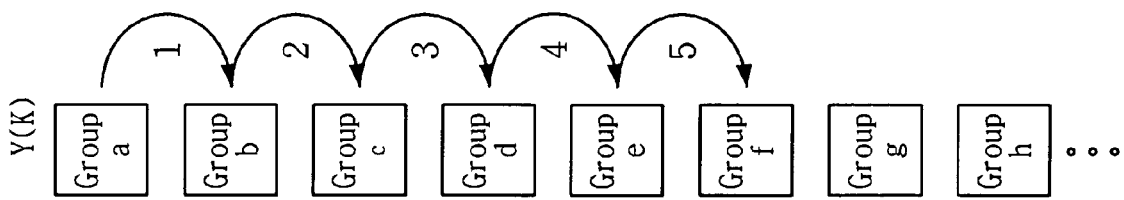

FREQUENCY HOPPING OFDMA METHOD USING SYMBOLS OF COMB PATTERN

The present patent application is a non-provisional application of International Application No. PCT/KR2002/002214, filed Nov. 26, 2002.

TECHNICAL FIELD

The present invention relates to an Orthogonal Frequency Division Multiple Access (OFDMA) method; and, more particularly, to a frequency hopping OFDMA method of comb symbols in a wireless mobile communication system.

BACKGROUND ART

An Orthogonal Frequency Division Multiplexing (OFDM) method is a multi-carrier transmission method which divides an entire usable frequency band into a predetermined number of narrow bands, modulates the sub-carriers of the narrow bands in parallel, and transmits the modulated sub-carriers. To each sub-carrier, low-rate data, which has a small amount of data, are allocated. The applied modulation methods are diverse from simple Quadrature Phase Shift Keying (QPSK) to 256-Quadrature Amplitude Modulation (QAM) according to the change of data capacity or definite transmission requests.

Channel signals have orthogonality to approach another channels without causing interference. Since no other sub-carrier can affect the center frequency of each channel, the frequency utility efficiency is high. Since each sub-carrier is processed into narrow band signals, such as 1 Khz, the transmission rate is low. So, although time delay is caused, such as 500 nanoseconds, while the channel signals are multi-reflected and transmitted, the interference between the OFDM symbols can be removed.

In other words, the sub-carriers used in the OFDM method have orthogonality, the frequency utility efficiency is increased and multi-path channel problem can be overcome only with a simple frequency domain equalizer having one tab. Since the OFDM method can be implemented at a high speed using Fast Fourier Transform (FFT), the OFDM method is used as a transmission method for high-speed digital communication systems recently.

For example, the OFDM method is used in wireless communication systems, such as Digital Audio Broadcasting (DAB), Digital Video Broadcasting (DVB), Institute of Electrical and Electronics Engineers (IEEE) 802.11a, and High Performance Radio Local Area Network 2 (HIPERLAN/2). Also, Discrete MultiTone (DMT), which is similar to the OFDM, is used in wired communication systems, such as x Digital Subscriber Line (xDSL).

Meanwhile, differently from a communication system adopting a broadcasting method or a point-to-point method, when a plurality of mobile stations transmit data using the OFDM method, multiple-access methods are needed, for example, OFDM-Time Division Multiple Access (TDMA), OFDM-Frequency Division Multiple Access (FDMA) (OFDMA), and OFDM-Code Division Multiple Access (CDMA).

In the OFDMA, each mobile station can use predetermined sub-carriers among the entire sub-carriers all the time. The sub-carriers can be allocated variably according to the requests from the mobile stations. To put it differently, in the OFDMA, resources can be distributed efficiently by allocating sub-carriers differently according to a data transmission rate requested by each mobile station. The OFDMA provides a high transmission efficiency, because it does not require any preamble that is requested in an OFDM-TDMA system.

Particularly, the OFDMA method is suitable when a large number of sub-carriers are in use, that is, when the amplitude of an FFT unit is large. So, it can be applied efficiently to a wireless communication system having a cell of wide area that is a cell whose delay spread is relatively large.

Meanwhile, frequency hopping OFDMA (FH-OFDMA) is used to increase frequency diversity effect and obtain interference average effect by overcoming sub-carriers in deep fading or the sub-carrier interference by another mobile station. More details on this are described in a book by Richard van Nee and Ramjee Prasad, entitled "OFDM Wireless Multimedia Communications," Artech House, 2000.

FIG. 1A is a diagram showing a frequency hopping pattern of a cluster in accordance with a conventional OFDMA method. Referring to FIG. 1A, different frequency bands a, b and c are allocated according to a data transmission rate requested by a mobile station. The allocated frequency band is changed by performing frequency hopping based on time. The vertical axis 11 of each rectangular cell of FIG. 1A is a set of consecutive sub-carriers in the frequency domain, that is, a frequency band which is the number of sub-carriers within a rectangular cell * sub-carrier frequency interval (cluster), and the horizontal axis 10 of each rectangular cell indicates a symbol period.

According to the conventional FH-OFDMA method, a predetermined number of neighboring sub-carriers are grouped among the entire sub-carriers to form a cluster and allocated to mobile stations on a cluster basis. The cluster performs frequency hopping based on a time slot so that the cluster could not fall into frequency null continuously.

More detailed description is presented in an article by J. Chuang and N. R. Sollenberger, entitled "Beyond 3G: Wideband Wireless Data Access Based on OFDM and Dynamic Packet Assignment," IEEE Communication Magazine, pp. 78-87, July 2000.

FIG. 1B is a diagram showing clusters falling into frequency null during frequency hopping in the conventional OFDMA method. Referring to FIG. 1B, the clusters 40 and 41 perform frequency hopping randomly based on a time slot. Each cluster is a set of consecutive sub-carriers. When a cluster 40 falls into frequency null of a channel as shown in time slot 3, burst errors occur. To overcome the burst errors, interleaving or encoding is performed.

However, the conventional method using clusters has a problem that the mobile station consumes a great deal of power because it performs FFT with respect to the entire sub-carriers, even if it has a cluster assigned to itself. Also, the conventional method cannot overcome the burst errors in case that the data of a packet are not long enough to perform interleaving, such as a control signal.

DISCLOSURE OF INVENTION

It is, therefore, an object of the present invention to provide a frequency hopping Orthogonal Frequency Division Multiple Access (OFDMA) method using symbols of a comb pattern, i.e., comb symbols, the method that can overcome burst errors even when a short packet is transmitted by allocating comb symbols to mobile stations, instead of allocating clusters, as sub-carriers of the OFDMA.

It is another object of the present invention to provide a frequency hopping OFDMA method using comb symbols, the method that can reduce the amount of Fast Fourier Transform (FFT) computation by allocating the comb symbols to mobile stations as sub-carriers of the OFDMA.

It is another object of the present invention to provide a frequency hopping OFDMA method using comb symbols, the method that can reduce the amount of FFT computation by allocating the comb symbols to mobile stations as sub-carriers of the OFDMA, when the comb symbols are allocated to the mobile stations additionally. Each comb symbol includes sub-carriers adjacent to the sub-carriers of the comb symbols that are already allocated to a mobile station and has the same size as the already allocated symbols.

It is another object of the present invention to provide a frequency hopping OFDMA method using comb symbols, the method that can reduce the amount of FFT computation by setting up the minimum frequency hopping unit of the comb symbols as the size of the comb symbols.

It is another object of the present invention to provide a frequency hopping OFDMA method using comb symbols, the method that can reduce the amount of FFT computation and increase frequency diversity by setting up a minimum frequency hopping unit as the size of the first allocated comb symbol to thereby change the interval of sub-carriers according to the frequency hopping, when the comb symbols are allocated additionally.

It is another object of the present invention to provide a frequency hopping OFDMA method using comb symbols, the method that can reduce the amount of FFT computation and improve a frequency utility efficiency by grouping sub-carriers according to the size of a comb symbol, allocating the comb symbols a predetermined number of sub-carrier groups that are suitable for a data transmission rate, and performing frequency hopping.

It is another object of the present invention to provide a frequency hopping OFDMA method using comb symbols, the method that can prevent interference between cells by making all mobile stations of a cell of a base station have the same frequency hopping pattern.

It is another object of the present invention to provide a frequency hopping OFDMA method using comb symbols, the method that can minimize the interference between cells by differentiating the frequency hopping patterns of comb symbols that are allocated to mobile stations according to the cell of each base station.

It is another object of the present invention to provide a frequency hopping OFDMA method using comb symbols, the method wherein mobile stations can obtain channel information on the entire band with a least amount of power by allocating comb symbols which are formed of a group of sub-carriers having a least amount of FFT computation to a pilot tone and not performing frequency hopping.

It is another object of the present invention to provide a frequency hopping OFDMA method using comb symbols, the method that can allocate comb symbols to be orthogonal to each other in a cell by constructing a structure of a tree or a structure of multiple trees with comb-patterned symbols of various sizes according to the data transmission rate and allocating the comb symbols to mobile stations according to the tree structure or the multiple tree structure in a cell of a base station.

It is another object of the present invention to provide a frequency hopping OFDMA method using comb symbols, the method wherein all comb symbols of a cell perform hopping in the frequency domain according to one single frequency hopping pattern so that the comb-patterned symbols formed of a different number of sub-carriers could perform frequency hopping without colliding with each other, when various sizes of comb-patterned symbols are formed according to the data transmission rate.

Those of ordinary skill in the art of the present invention can understand the other objects and advantages of the present invention easily from the drawings, detailed description, and claims of the present specification.

In accordance with another aspect of the present invention, there is provided a method for performing frequency hopping orthogonal Frequency Division Multiple Accesses (OFDMA), including the steps of: a) allocating frequency domain signals X(k) of a comb pattern to a modulated data sequence, X(k) being comb symbols and k being a frequency index; b) performing frequency hopping so that the comb symbols could have an independent frequency offset; and c) performing inverse Fast Fourier Transform (FFT) on the comb symbols to be transformed to time domain signals x(n) and transmitting the time domain signals x(n), n being a time index.

BRIEF DESCRIPTION OF DRAWINGS

The above and other objects and features of the present invention will become apparent from the following description of the preferred embodiments given in conjunction with the accompanying drawings, in which:

FIG. 10 is a diagram illustrating comb symbols, which are allocated to one mobile station, performing frequency hopping in accordance with an embodiment of the present invention;

BEST MODE FOR CARRYING OUT THE INVENTION

Figure 1A:
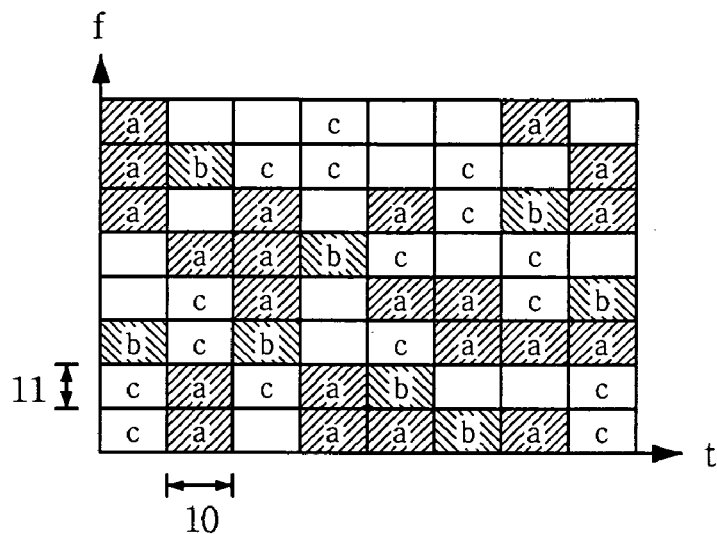
FIG. 1A is a diagram showing a frequency hopping pattern of a cluster in accordance with a conventional OFDMA method.
Figure 1B:
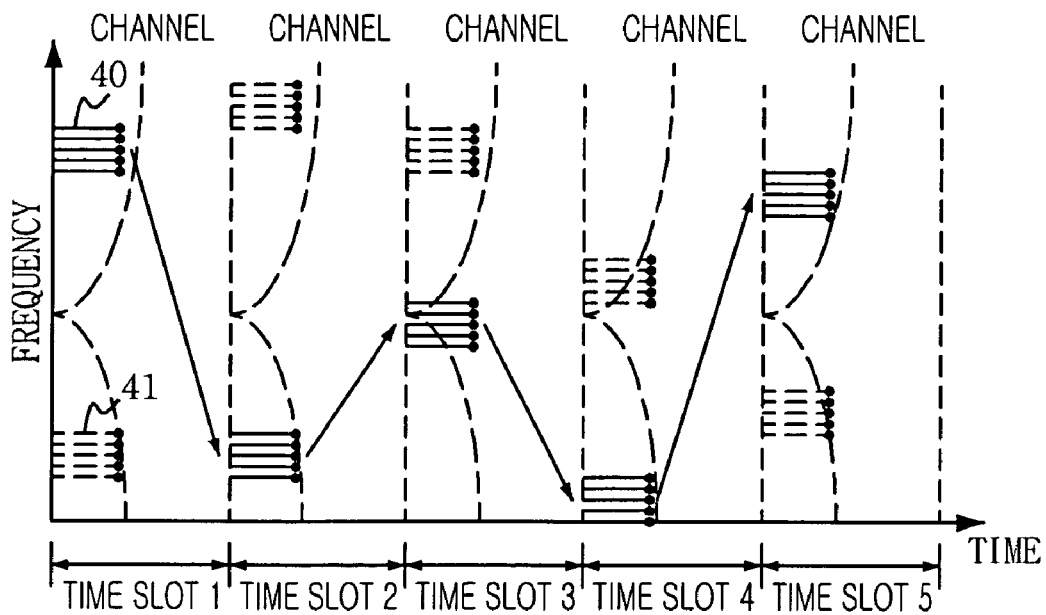
FIG. 1B is a diagram showing clusters falling into frequency null of a channel during frequency hopping in accordance with the conventional OFDMA method.

Other objects and aspects of the invention will become apparent from the following description of the embodiments with reference to the accompanying drawings, which is set forth hereinafter. The same reference numeral is given to the same element, although the element appears in different drawings. In addition, if further detailed description on the related prior arts is determined to blur the point of the present invention, the description is omitted. Hereafter, preferred embodiments of the present invention will be described in detail with reference to the drawings.

Figure 2:
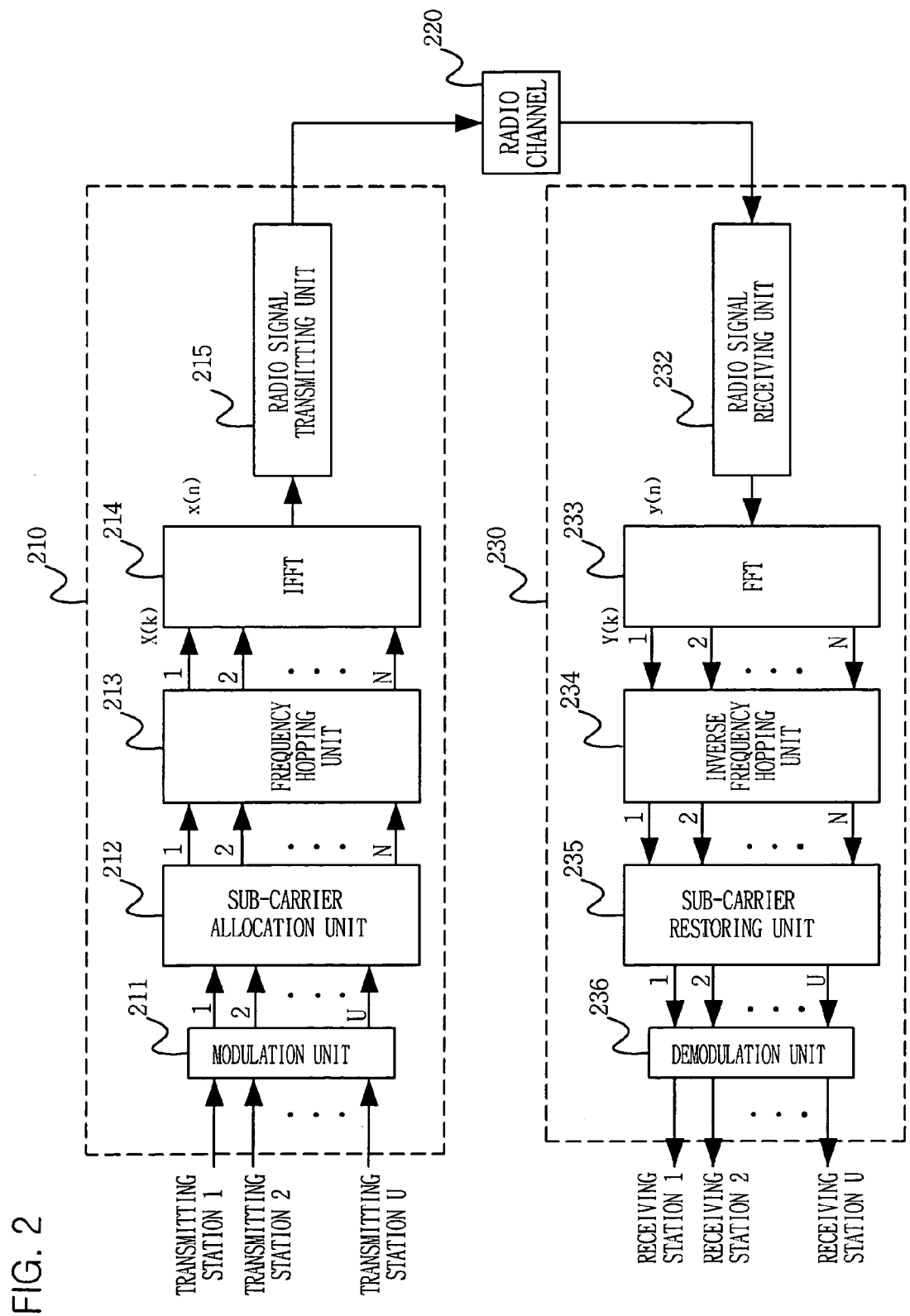
FIG. 2 is a block diagram illustrating a frequency hopping Orthogonal Frequency Division Multiple Access (FH-OFDMA) system using symbols of a comb pattern, i.e., comb symbols, in accordance with the present invention.

FIG. 2 is a block diagram illustrating a frequency hopping Orthogonal Frequency Division Multiple Access (FH-OFDMA) system using symbols of a comb pattern, i.e., comb symbols, in accordance with the present invention. Referring to FIG. 2, the FH-OFDMA communication system is formed of a transmitting system 210 and receiving system 230.

The transmitting system 210 includes a modulation unit 211, a sub-carrier allocation unit 212, a frequency hopping unit 213, an Inverse Fast Fourier Transform (IFFT) 214, and a radio signal transmitting unit 215.

Transmitting data sequences are modulated in the modulation unit 211 in a widely known modulation method, such as Quadrature Phase Shift Keying (QPSK) and mapped to complex numbers. The modulation method is an option of a system designer and it is not limited to a particular modulation method in the present invention.

Comb symbols, each including a different number of sub-carriers, are allocated to a plurality of mobile stations by the sub-carrier allocation unit 212 according to each requested transmission rate. Then, complex numbers modulated in the modulation unit 211 are allocated to each sub-carrier signal.

The frequency hopping unit 213 performs frequency hopping of the sub-carriers according to a time slot in a given pattern to thereby output frequency domain signals X(k) to the IFFT 214. The frequency domain signals X(k) are converted to time-domain signals x(n) in the IFFT 214. Then guard intervals are added to the time-domain signals x(n) to prevent inter-symbol interference caused by multi-path fading in the radio signal transmitting unit 215.

The receiving system 230 includes a radio signal receiving unit 232, a FFT unit 233, an inverse frequency hopping unit 234, a sub-carrier restoring unit 235, and a demodulation unit 236.

The radio signal receiving unit 232 receives radio signals transmitted to the receiving system 230 through a wireless communication channel environment 220, performs sampling, removes the guard intervals to obtain time-domain signals y(n), and outputs the time-domain signals y(n) to the FFT unit 233. The time-domain signals y(n) are converted into frequency-domain signals Y(k) in the FFT unit 233.

In the inverse frequency hopping unit 234, the comb symbols which perform frequency hopping according to the time slot in the transmitting system 210 are restored to have the sub-carrier frequency before the frequency hopping. The sub-carrier restoring unit 235 restores data sequences expressed as complex numbers from the sub-carriers of the comb symbols that have been allocated to the mobile stations. Lastly, the data sequences are restored in the demodulation unit 236.

Figure 3:
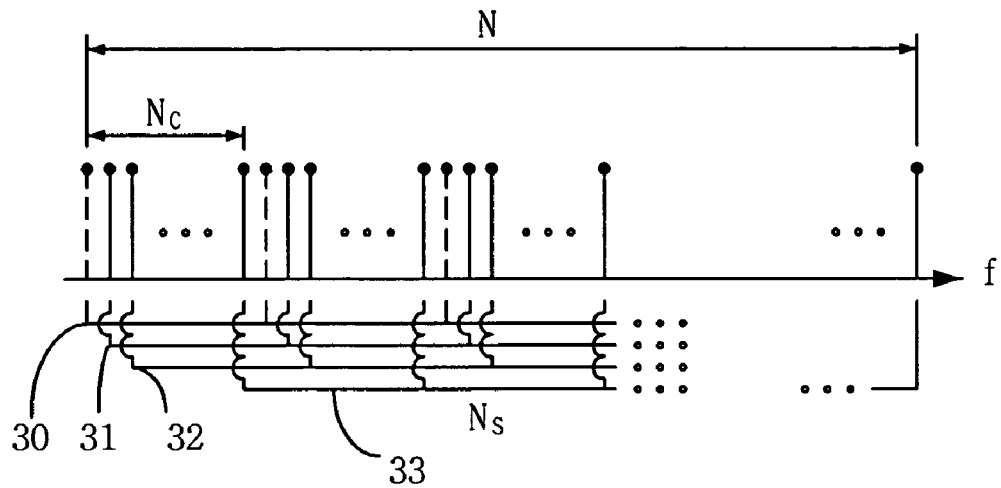
FIG. 3 is a diagram describing comb symbols which are formed of sub-carriers in the frequency domain in accordance with an embodiment of the present invention.

FIG. 3 is a diagram describing comb symbols each of which is formed of sub-carriers in the frequency domain in accordance with an embodiment of the present invention. In the drawing, the sub-carriers of a comb pattern are allocated over the entire available frequency band at the same frequency interval.

In the present invention, a set of sub-carriers of a comb pattern is referred to as a comb symbol and the sub-carrier set is called a sub-carrier group. In FIG. 3, the reference numerals 30 through 33 indicate comb symbols, respectively.

When the number of the all sub-carriers that can be used in the entire frequency band is N, the number of sub-carriers that forms an $i^{th}$ comb symbol is $N_{si}$, and the number of comb symbols that can be allocated in the entire frequency band is $N_c$, the following equation can be obtained.

$$N = \sum_{1}^{N_C} N_{si} = N_C * N_S (N_{si} = N_s = \text{Const.})$$

Equation 1 wherein $N_c$ denotes the number of comb symbols that can be allocated in the entire frequency band, that is, the number of frequency offsets; and $N_{si}$ denotes the number of sub-carriers within an $i^{th}$ comb symbol, the size of the $i^{th}$ comb symbol, or a size of the sub-carrier group that constitutes the $i^{th}$ comb symbol.

The number $N_s$ of sub-carriers constituting each of the $N_c$ comb symbols can be set up differently according to the data transmission rate requested by the mobile stations. For example, one comb symbol can be formed of four sub-carriers, while another comb symbol can be formed of 64 sub-carriers.

Referring to FIG. 3, the sub-carriers that constitute the $i^{th}$ comb symbol have an interval of $\Delta f_i (=N_C * \Delta f)$ [Hz], which is expressed as Equation 2 below.

$$X_{N_C,i,q}(k) = \begin{cases} \neq 0, k = p_i N_C + q_i \\ = 0, \text{Otherwise} \end{cases}$$

$$\begin{cases} p_i = 0, 1, \ldots, N_{si} - 1 \\ q_i = 0, 1, \ldots, N_C - 1 \end{cases}$$

Equation 2

If multiple accesses are performed on a comb symbol basis, it is possible to acquire the frequency diversity effect with the comb symbols. This is because the sub-carriers constituting the comb symbols are put apart over the entire frequency band at the same frequency interval, i.e., $\Delta f_i (=N_C * \Delta f)$ [Hz]. Also, the frequency hopping of the comb symbols produces the effects of frequency diversity and interference averaging. The method how the comb symbols are allocated to mobile stations without collision between frequencies will be described later on.

Figure 4:
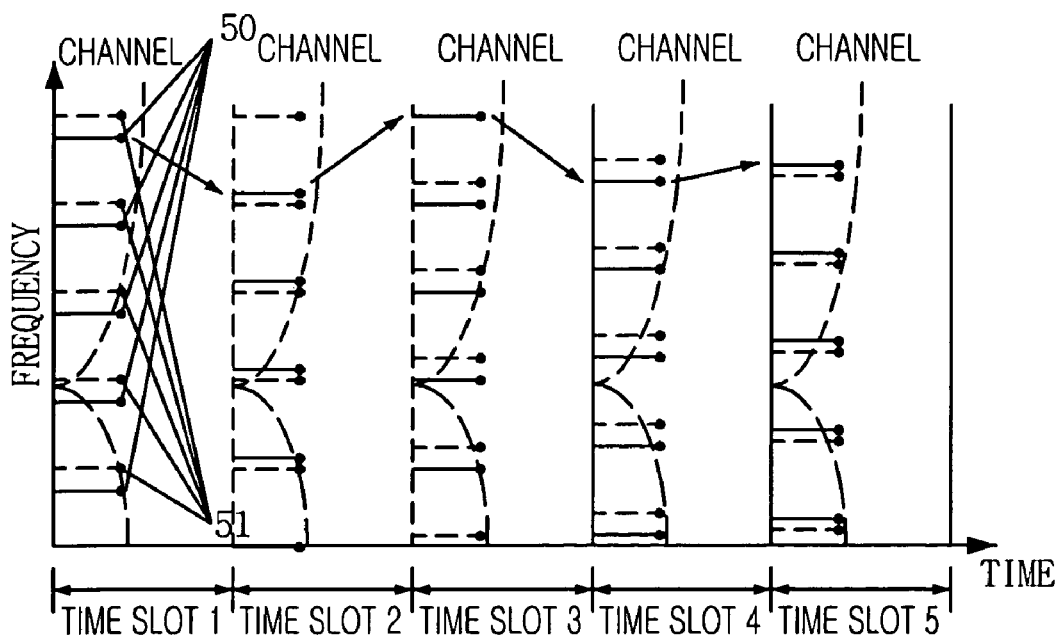
FIG. 4 is an exemplary diagram illustrating frequency hopping of comb symbols in accordance with an embodiment of the present invention.

FIG. 4 is an exemplary diagram illustrating frequency hopping of comb symbols in accordance with an embodiment of the present invention. Referring to FIG. 4, sub-carriers constituting each of two comb symbols 50 and 51 are put apart uniformly over the entire frequency band. This prevents the all sub-carriers from falling in frequency null simultaneously and thus it prevents burst errors. Therefore, the comb symbol frequency hopping method of the present invention has an excellent frequency diversity effect in the transmission of short packets, compared to conventional clustering method.

As described before, if sub-carriers are allocated to the mobile stations on a comb symbol basis and the signals of each mobile station are discriminated from those of other mobile stations by the frequency offset between comb symbols, the signals for each mobile station can be restored in the receiving system by using partial FFT, which will be described hereafter.

The numerical expression of the partial FFT is presented below. FFT is one of digital signal processing algorithms implementing discrete Fourier Transform (DFT). It is materialized in the integrated circuit of one or more physical devices to process signals in real-time. In the FH-OFDMA method of an embodiment of the present invention, the FFT is materialized in a FFT unit 233 of FIG. 2. An N-point direct DFT operation can be expressed as Equation 3:

$$Y(k) = \sum_{n=0}^{N-1} y(n) W^{nk} k = 0, \ldots, N-1$$

Equation 3 wherein n denotes a time index;

k denotes a frequency index;

N denotes a point; and

W denotes a twiddle factor and equals to $e^{-\int 2\pi/N}$ ($W = e^{-\int 2\pi/N}$).

In Equation 3, y(n) indicates comb symbols of the time domain received in the receiving system 230, that is, a value obtained by sampling an OFDM signal with a sampling interval $T_s$[second], while y(k) indicates frequency domain signals.

If the period of an OFDM symbol excluding the guard interval is T[second], the sub-carrier interval $\Delta f$[Hz] is 1/T. Therefore, if the frequency of a sub-carrier is $f_c$[Hz], Y(k) is a value at $$f_C + \left(k - \frac{N}{2}\right) \Delta f \text{[Hz]}.$$

The index k of the frequency domain and the index n of the time domain can be separated into two different variables and defined as Equation 4:

$$k = p_i N_C = q_i, \begin{cases} p_i = 0, 1, \ldots, N_{si} - 1 \\ q_i = 0, 1, \ldots, N_C - 1 \end{cases}$$

$$n = r_i N_s + s_i, \begin{cases} r_i = 0, 1, \ldots, N_C - 1 \\ q_i = 0, 1, \ldots, N_{si} - 1 \end{cases}$$

Equation 4 wherein p denotes an individual sub-carrier that constitutes one comb symbol, and q denotes the frequency offset of the comb symbol. For example, the frequency offset q can be determined to be 0, $N_c/2*\Delta f$, $N_c/4*\Delta f$, $3N_c/4*\Delta f$, $N_c/8*\Delta f$, $5N_c/8*\Delta f$, $3N_c/8*\Delta f$, $7N_c/8*\Delta f$, $N_c/16*\Delta f$, $9N_c/16*\Delta f$, $5N_c/16*\Delta f$, $13N_c/16*\Delta f$, $3N_c/16*\Delta f$, $11N_c/16*\Delta f$, $7N_c/16*\Delta f$, $15N_c/16*\Delta f$, . . . [Hz] according to the option of a system designer. Therefore, the frequency offset q should be understood not limited to a particular pattern.

The DFT equation can be reformed by substituting the variables k and n of Equation 3 with the variables $p_i$, $q_i$, $r_i$, and $s_i$ which are defined in Equation 4. The reformed DFT equation is shown in Equation 5:

$$Y(p, q) = \sum_{s=0}^{N_s-1} W^{N_c sp} W^{sq} g(q, s) \quad \text{Equation 5}$$

wherein $g(q, s) =$ $$\sum_{r=0}^{N_c-1} y(r, s) W^{N_s qr} (N_s = N_{si}, p = p_i, q = q_i, r = r_i, s = s_i).$$

In accordance with an embodiment of the present invention, the mobile stations of the receiving system 230 do not require the entire sub-carriers but require only those allocated to each mobile station. Accordingly, if a mobile station processes comb symbols allocated to it only, a variable $q_i$ which corresponds to the frequency offset of a mobile station in Equation 5 becomes a constant. In this case, g(q,s) is DFT operation with respect to $N_c$ point, and Y(p, q) can be obtained by multiplying $N_c$ complex numbers. Since multiplication of complex numbers should be performed N times $$\left(N = \sum_{i}^{N_c} N_{si}\right)$$

obtain Y(p, q), the amount of multiplication operation of the complex numbers is reduced, compared to the operation amount $N^2$ that is needed to perform the entire DFT.

Here, if N, $N_{si}$ and $N_c$ is in the shape of $2^n$, that is, if they are exponents of 2, FFT can be applied to computation of Y(k). As shown above, performing only part of FFT computation with respect to particular sub-carriers instead of performing entire FFT computation with respect to the entire sub-carriers is called 'partial FFT computation'. In case that the particular sub-carriers of interest form a comb symbol, the amount of FFT computation can be reduced optimally.

Figure 5:
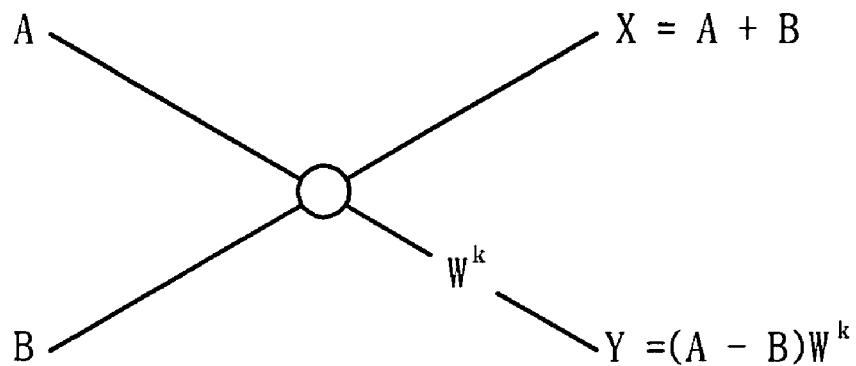
FIG. 5 is a diagram describing a radix-2 Decimation in Frequency (DIF) butterfly unit.
Figure 6:
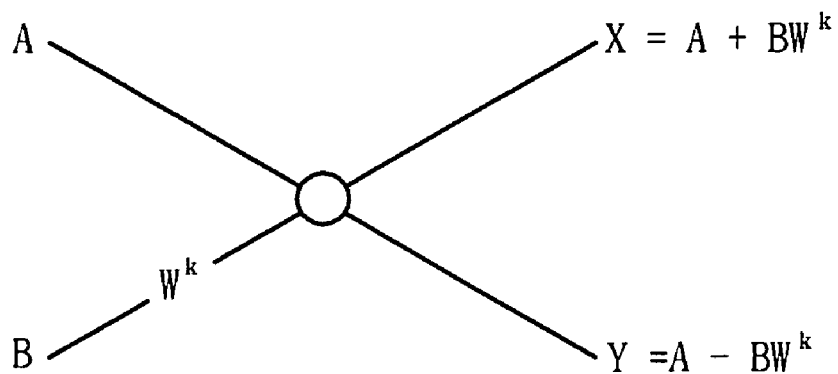
FIG. 6 is a diagram describing a radix-2 Decimation in Time (DIT) butterfly unit.

There are two algorithms in the computation of FFT: Decimation-In-Frequency (DIF) and Decimation-In-Time (DIT). FIGS. 5 and 6 show basic structures of a radix-2 butterfly unit expressed with radix-2 DIF algorithm and radix-2 DIT algorithm, respectively. In other words, FIG. 5 is a diagram showing the structure of the radix-2 DIF butterfly unit and FIG. 6 is a diagram illustrating the structure of the radix-2 DIT butterfly unit.

The butterfly units that form the FFT unit 233 and the IFFT unit 214 are elements that perform the arithmetic operation of Equation 3. The butterfly operation of the FFT unit 233 is performed by the data computation of a γ-point, γ being a radix. An N-point FFT unit includes N/γ butterfly units at each stage of a $\log_\gamma N$ stage. The operation result of one butterfly stage becomes an input to the next butterfly stage.

Figure 7:
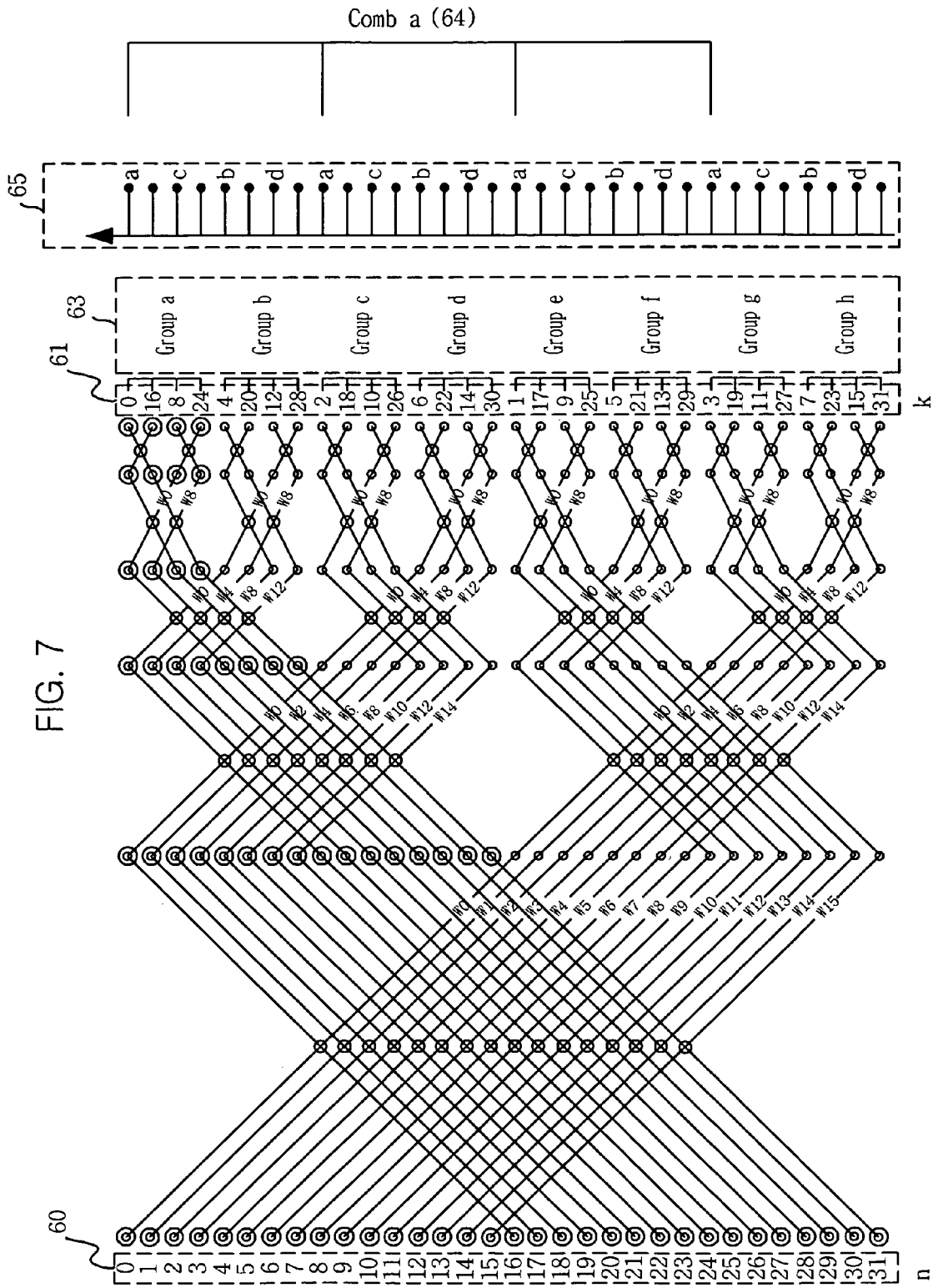
FIG. 7 is a diagram showing a signal flow of a Fast Fourier Transform (FFT) unit adopting a DIF algorithm.
Figure 8:
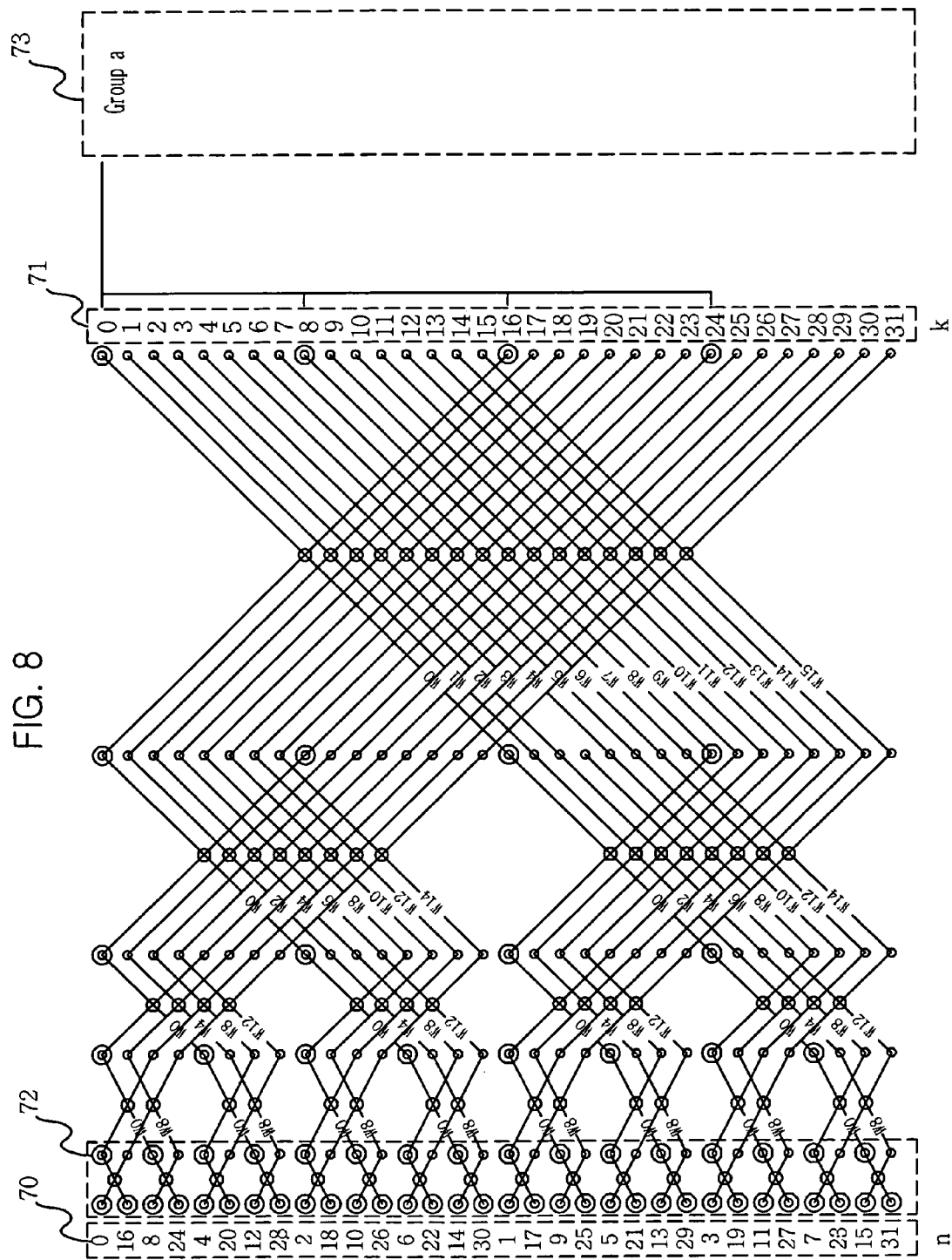
FIG. 8 is a diagram showing a signal flow of a FFT unit adopting a DIT algorithm.

FIG. 7 is a diagram showing a signal flow of the FFT unit adopting the DIF algorithm, and FIG. 8 is a diagram showing a signal flow of the FFT unit adopting the DIT algorithm. FIGS. 7 and 8 present signal flows in the radix-2 FFT unit 233 adopting each of the DIF and DIT algorithm in case N is 32, for example, $N_c=8$ and $N_s=4$. As shown in the drawings, the butterfly operation of the 32-point FFT is performed by 5 ($=\log_2 32$) stages and each stage is formed of 16($=32/2$) butterfly units. FIG. 7 shows the radix-2 FFT unit 233 having the DIF butterfly unit of FIG. 5 and FIG. 8 shows a radix-2 FFT unit 233 having the DIT butterfly unit of FIG. 6.

The comb symbols transmitted through the radio signal receiving unit 232, that is, time-domain sample values y(n) of the OFDM symbols are inputted to an input unit 60 of the FFT unit 233 of FIG. 7 in the marked order sequentially. In FIG. 7, y(n) is inputted to the input unit 60 of the FFT unit 233, n being a value selected from 0 to 31.

Since the number marked in the input unit 60 indicates a time index, which is n of a signal y(n) to be inputted to a corresponding input terminal, it corresponds with the address of the input unit. With respect to the inputted signal y(n), butterfly computation is performed at each stage. After the butterfly computation at the last stage, a frequency-domain signal Y(k) is stored in an output memory 61 of the FFT unit 233.

In the drawings, the numbers marked in the output memory 61 are obtained by bit-reversing the addresses of the output memory 61 that are arranged sequentially from zero. The numbers are k, which is a frequency index.

In the signal flow of the DIF FFT unit 233 illustrated in FIG. 7, frequency domain signals Y(k) stored in the output memory 61 are grouped according to a predetermined standard based on the memory address sub-carrier groups. The numbers are k, which is a frequency index.

The frequency-domain signals Y(k) stored in the output memory 61 are grouped according to a predetermined standard based on the memory address and form sub-carrier groups. Then, one of the sub-carrier groups closest to the stored memory address is defined as an adjacent group. In FIG. 7, Y(k) sets grouped in the order of the memory addresses becomes sub-carrier groups.

The frequency-domain signals Y(k) stored in the output memory 61 are mapped in the order that the addresses of the output memory 61 are bit-reversed so that they have a value in the frequency of the sub-carriers that constitute a comb symbol in the frequency domain 65. Therefore, the frequency-domain signals Y(k) of the sub-carrier groups that are stored in the output memory 61 become sub-carrier signals constituting the comb symbol.

In case the addresses of the output memory 61 are formed of five bits in the embodiment of FIG. 7, that is, in the 32-point FFT unit, the addresses of the output memory 61 and the signals Y(k) obtained by bit-reversing the addresses and transmitted by the sub-carriers $$\left(f_c + \left(k - \frac{N}{2}\right) \Delta f [\text{Hz}]\right)$$

constituting comb symbols are mapped as shown in Table 1.

TABLE 1

| Address of Output Memory (Denary Number) | Address of Output Memory (Binary Number) | Bit-Reversed k (Binary Number) | Bit-Reversed k (Denary Number) | Frequency of Y(k) |
|---|---|---|---|---|
| 0 | 00000 | 00000 | 0 | $f_e + \left(0 - \frac{N}{2}\right) \times \Delta f$ |
| 1 | 00001 | 10000 | 16 | $f_e + \left(16 - \frac{N}{2}\right) \times \Delta f$ |
| 2 | 00010 | 01000 | 8 | $f_e + \left(8 - \frac{N}{2}\right) \times \Delta f$ |
| 3 | 00011 | 11000 | 24 | $f_e + \left(24 - \frac{N}{2}\right) \times \Delta f$ |
| 4 | 00100 | 00100 | 4 | $f_e + \left(4 - \frac{N}{2}\right) \times \Delta f$ |
| 5 | 00101 | 10100 | 20 | $f_e + \left(20 - \frac{N}{2}\right) \times \Delta f$ |
| 6 | 00110 | 01100 | 12 | $f_e + \left(12 - \frac{N}{2}\right) \times \Delta f$ |
| 7 | 00111 | 11100 | 28 | $f_e + \left(28 - \frac{N}{2}\right) \times \Delta f$ |
| 8 | 01000 | 00010 | 2 | $f_e + \left(2 - \frac{N}{2}\right) \times \Delta f$ |
| 9 | 01001 | 10010 | 18 | $f_e + \left(18 - \frac{N}{2}\right) \times \Delta f$ |
| 10 | 01010 | 01010 | 10 | $f_e + \left(10 - \frac{N}{2}\right) \times \Delta f$ |
| 11 | 01011 | 11010 | 26 | $f_e + \left(26 - \frac{N}{2}\right) \times \Delta f$ |
| 12 | 01100 | 00110 | 6 | $f_e + \left(6 - \frac{N}{2}\right) \times \Delta f$ |
| 13 | 01101 | 10110 | 22 | $f_e + \left(22 - \frac{N}{2}\right) \times \Delta f$ |
| 14 | 01110 | 01110 | 14 | $f_e + \left(14 - \frac{N}{2}\right) \times \Delta f$ |
| 15 | 01111 | 11110 | 30 | $f_e + \left(30 - \frac{N}{2}\right) \times \Delta f$ |
| 16 | 10000 | 00001 | 1 | $f_e + \left(1 - \frac{N}{2}\right) \times \Delta f$ |
| 17 | 10001 | 10001 | 17 | $f_e + \left(17 - \frac{N}{2}\right) \times \Delta f$ |
| 18 | 10010 | 01001 | 9 | $f_e + \left(9 - \frac{N}{2}\right) \times \Delta f$ |
| 19 | 10011 | 11001 | 25 | $f_e + \left(25 - \frac{N}{2}\right) \times \Delta f$ |
| 20 | 10100 | 00101 | 5 | $f_e + \left(5 - \frac{N}{2}\right) \times \Delta f$ |
| 21 | 10101 | 10101 | 21 | $f_e + \left(21 - \frac{N}{2}\right) \times \Delta f$ |

TABLE 1-continued

| Address of Output Memory (Denary Number) | Address of Output Memory (Binary Number) | Bit-Reversed k (Binary Number) | Bit-Reversed k (Denary Number) | Frequency of Y(k) |
|---|---|---|---|---|
| 22 | 10110 | 01101 | 13 | $f_c + \left(13 - \frac{N}{2}\right) \times \Delta f$ |
| 23 | 10111 | 11101 | 29 | $f_c + \left(29 - \frac{N}{2}\right) \times \Delta f$ |
| 24 | 11000 | 00011 | 3 | $f_c + \left(3 - \frac{N}{2}\right) \times \Delta f$ |
| 25 | 11001 | 10011 | 19 | $f_c + \left(19 - \frac{N}{2}\right) \times \Delta f$ |
| 26 | 11010 | 01011 | 11 | $f_c + \left(11 - \frac{N}{2}\right) \times \Delta f$ |
| 27 | 11011 | 11011 | 27 | $f_c + \left(27 - \frac{N}{2}\right) \times \Delta f$ |
| 28 | 11100 | 00111 | 7 | $f_c + \left(7 - \frac{N}{2}\right) \times \Delta f$ |
| 29 | 11101 | 10111 | 23 | $f_c + \left(23 - \frac{N}{2}\right) \times \Delta f$ |
| 30 | 11110 | 01111 | 15 | $f_c + \left(15 - \frac{N}{2}\right) \times \Delta f$ |
| 31 | 11111 | 11111 | 31 | $f_c + \left(31 - \frac{N}{2}\right) \times \Delta f$ |

Referring to FIG. 7, the frequency domain signals Y(k) stored in the output memory 61 are grouped into each four of them and the sub-carrier groups are expressed as a sub-carrier group a, sub-carrier group b, sub-carrier group C, . . . , sub-carrier group h 63. The addresses of the output memory 61 are 0, 1, 2, 3, . . . , 31, which are shown in Table 1 sequentially. Their bit-reversed sequence is 0, 16, 8, 24, . . . , 31. Thus, the actual frequency domain signals that appear in the sub-carrier group a are Y(0), Y(16), Y(8), and Y(24).

Likewise, the actual frequency-domain signals expressed by the sub-carrier group b are Y(4), Y(20), Y(12), and Y(28). Generally, values corresponding to a sub-carrier group i are frequency domain signals of a comb symbol i. In short, the values Y(k) of the sub-carrier group a correspond to a set of sub-carriers that constitutes a comb symbol a 64 in the frequency domain 65.

Referring to FIG. 8, time domain signals y(n) are inputted to an input unit 70 of the DIT FFT unit in the marked order. In FIG. 8, values y(n) obtained by bit-reversing the addresses 0 to 31 of the input unit 70 are inputted to the input unit 70 of the FFT unit 233. The numbers expressed in the input unit 70 indicate n of the values y(n), which are time indexes, to be inputted through input terminals. Differently from FIG. 7, the values of FIG. 8 are bit-reversed.

In the embodiment adopting a 32-point FFT unit shown in FIG. 8, if the addresses of the input unit 70 are formed of five bits, the addresses are mapped to the sub-carriers y(n) obtained by bit-reversing the addresses of the input unit 70 and constituting a comb symbol as shown in Table 2.

TABLE 2

| Address of Input Unit (Denary number) | Address of Input Unit (Binary number) | Bit-Reversed n (Binary number) | Bit-Reversed n (Denary number) | Sampling Point of y(n) |
|---|---|---|---|---|
| 0 | 00000 | 00000 | 0 | $0 * T_s$ |
| 1 | 00001 | 10000 | 16 | $16 * T_s$ |
| 2 | 00010 | 01000 | 8 | $8 * T_s$ |
| 3 | 00011 | 11000 | 24 | $24 * T_s$ |
| 4 | 00100 | 00100 | 4 | $4 * T_s$ |
| 5 | 00101 | 10100 | 20 | $20 * T_s$ |
| 6 | 00110 | 01100 | 12 | $12 * T_s$ |
| 7 | 00111 | 11100 | 28 | $28 * T_s$ |
| 8 | 01000 | 00010 | 2 | $2 * T_s$ |
| 9 | 01001 | 10010 | 18 | $18 * T_s$ |
| 10 | 01010 | 01010 | 10 | $10 * T_s$ |
| 11 | 01011 | 11010 | 26 | $26 * T_s$ |
| 12 | 01100 | 00110 | 6 | $6 * T_s$ |
| 13 | 01101 | 10110 | 22 | $22 * T_s$ |
| 14 | 01110 | 01110 | 14 | $14 * T_s$ |
| 15 | 01111 | 11110 | 30 | $30 * T_s$ |
| 16 | 10000 | 00001 | 1 | $1 * T_s$ |
| 17 | 10001 | 10001 | 17 | $17 * T_s$ |
| 18 | 10010 | 01001 | 9 | $9 * T_s$ |
| 19 | 10011 | 11001 | 25 | $25 * T_s$ |
| 20 | 10100 | 00101 | 5 | $5 * T_s$ |
| 21 | 10101 | 10101 | 21 | $21 * T_s$ |
| 22 | 10110 | 01101 | 13 | $13 * T_s$ |
| 23 | 10111 | 11101 | 29 | $29 * T_s$ |
| 24 | 11000 | 00011 | 3 | $3 * T_s$ |
| 25 | 11001 | 10011 | 19 | $19 * T_s$ |
| 26 | 11010 | 01011 | 11 | $11 * T_s$ |
| 27 | 11011 | 11011 | 27 | $27 * T_s$ |
| 28 | 11100 | 00111 | 7 | $7 * T_s$ |
| 29 | 11101 | 10111 | 23 | $23 * T_s$ |

TABLE 2-continued

| Address of Input Unit (Denary number) | Address of Input Unit (Binary number) | Bit-Reversed n (Binary number) | Bit-Reversed n (Denary number) | Sampling Point of y(n) |
|---|---|---|---|---|
| 30 | 11110 | 01111 | 15 | 15 * $T_s$ |
| 31 | 11111 | 11111 | 31 | 31 * $T_s$ |

To the signals y(n) inputted to the input unit 70 of the FFT unit 233 performs butterfly computation at each stage. After butterfly computation is performed at the last stage, the frequency domain signals Y(k) are stored in an output memory 71 of the FFT unit 233. In FIG. 8, the numbers expressed in the output memory 71 are the addresses of the output memory 71, k denoting a frequency index. Differently from FIG. 7, those numbers are not bit-reversed.

That is to say, FIG. 8 shows the frequency domain signals Y(k) stored in the output memory 71 correspond to the actual frequency band in the sequence that bit-reversion is not performed in the FFT unit adopting the DIT algorithm. Therefore, in the signal flow of FIG. 8 where the DIT algorithm is applied, a set of values Y(k) with a regular space $N_c$ stored in the output memory 71 becomes a sub-carrier group.

To put it differently, in the signal flow of the DIT FFT unit 233 illustrated in FIG. 8, a sub-carrier group is defined as what is obtained by bit-reversing the indexes k of the frequency domain signals Y(k) stored in the output memory 71 and grouping the bit-reversed indexes into a predetermined number of them. Also, among the sub-carrier groups stored in the addresses of the output memory, a sub-carrier group having a bit-reversed value closest to the values obtained by bit-reversing the addresses of the output memory 71 becomes an adjacent group.

For example, the indexes k of the frequency domain signals Y(0), Y(8), Y(16) and Y(24) that are stored in the output memory 71 or values obtained by bit-reversing the addresses of the output memory 71 are 0, 2, 1 and 3 and the four sub-carriers are defined as a group a. To take another example, the indexes k of the frequency domain signals Y(4), Y(20), Y(12) and Y(28) that are stored in the output memory 71 or values obtained by bit-reversing the addresses of the output memory 71 are 4, 5, 6 and 7 and the four sub-carriers are defined as one of the groups adjacent to the group a.

In conclusion, in both signal flows adopting the DIF algorithm of FIG. 5 and the DIT algorithm of FIG. 6 that are presented in FIGS. 7 and 8, respectively, one sub-carrier group Y(k) stored in the output memory 71 of the FFT unit 233 forms one single comb symbol in the actual frequency band.

In FIGS. 7 and 8, the input and output points for butterfly computation for obtaining the sub-carrier signals Y(0), Y(8), Y(16) and Y(24) of the sub-carrier group a are circled. In accordance with the embodiment of the present invention shown in the drawings, computation is operated partially in the FFT unit to obtain a comb symbol a 64. Therefore, power consumption is reduced remarkably due to the reduced computation.

The receiving system 230 is aware of the sub-carrier groups it should acquire in advance through the properties of the sub-carrier groups, such as the starting point of a signal, frequency hopping pattern, size of the sub-carrier groups and the like. So, it can determine the input and output points for butterfly computation for obtaining sub-carrier signals Y(k) in advance. The butterfly computation is operated as shown in FIGS. 7 and 8. Thus, the amount of computation can be reduced by performing partial FFT to restore the sub-carrier signals of a comb symbol in the receiving system 230.

Meanwhile, in order to generate OFDM transmitting signals in the transmitting system 210, IFFT computation should be operated in an IFFT unit 214. The computation amount of the IFFT unit can be reduced by allocating the sub-carriers in the form of comb symbols.

Generally, the IFFT computation is operated in the FFT unit. According to the IFFT computation, time domain signals x(n) are obtained by switching the real number portion and the imaginary number portion of the frequency domain signals X(k), inputting the resultant values to input units 60 and 70 of the FFT unit, operating butterfly computation at each stage, and then switching again the real number portion and the imaginary number portion of the output values obtained in output memories 61 and 71.

Figure 9:
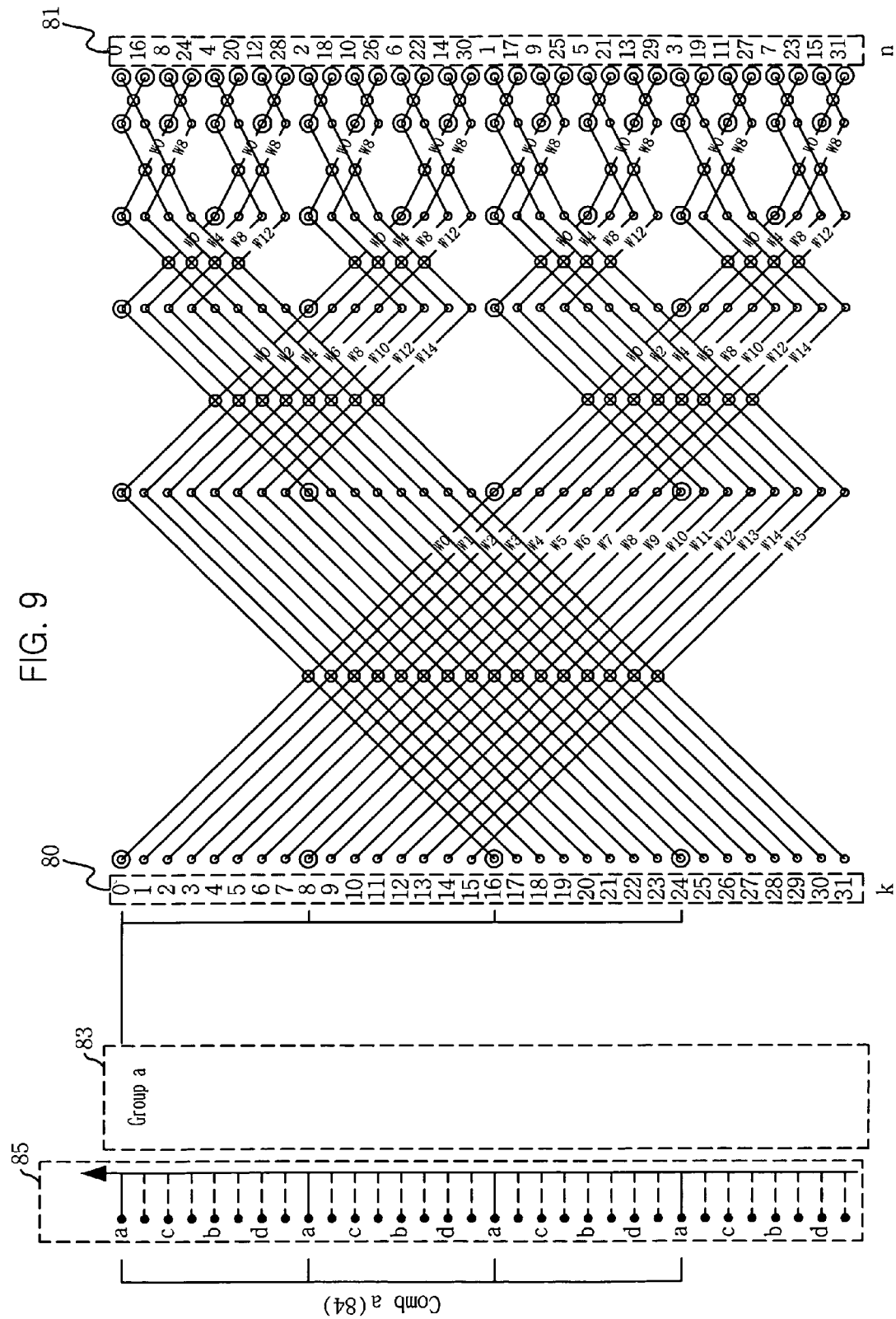
FIG. 9 is a diagram showing a signal flow of an Inverse Fast Fourier Transform (IFFT) unit adopting a DIF algorithm.

FIG. 9 shows an embodiment where the IFFT computation is operated using radix-2 DIF algorithm of FIG. 5. In the drawing, frequency domain signals X(0), X(16), X(8), and X(24), which are sub-carrier signals X(0), X(16), X(8), and X(24) that form a comb symbol a 84, are inputted to corresponding terminals of the IFFT unit 214 whose addresses are 0, 8, 16 and 24. To other terminals of the IFFT unit 214, null (0) signals are inputted.

The input and output points for butterfly computation for obtaining time domain sub-carrier signals x(0) to x(31) are circled. In FIG. 9, in case '0' is inputted to two input terminals of butterfly and butterfly computation is kept from being operated, the butterfly computation is operated as shown in the input and output points of FIG. 9.

Here, the sub-carrier signals X(0), X(8), X(16), and X(24) form the comb symbol a 84. The sub-carrier signals X(0), X(8), X(16), and X(24) are inputted to the IFFT unit 214 by mapping a data sequence transmitted from the transmitting system 210 of FIG. 2 to complex numbers through the modulation unit 211, receiving comb symbols formed of four sub-carriers allocated thereto through the sub-carrier allocating unit 212 based on the transmission rate of the data sequence, and performing the frequency hopping on the sub-carriers according to a given pattern along each time slot in the frequency hopping unit 213. A method for allocating comb symbols to mobile station without frequency collision will be describer later.

FIG. 8 shows that time domain signals y(n) are inputted, and four frequency domain signals Y(k) constituting the comb symbol a are outputted. On the contrary, FIG. 9 shows that the four frequency domain signals X(k) constituting the comb symbol a are inputted and the time domain signals x(n) are outputted to an output memory 81.

The two drawings, FIGS. 8 and 9, shows their computation amounts are the same. In the computation of the IFFT unit, if two input values for butterfly computation are all '0', the butterfly computation is not operated. The butterfly computation can be operated only when both two input values are not '0'. Therefore, the computation amount of the IFFT unit of the transmitting system 210 is the same as that of the case partial FFT is applied to the receiving system 230.

Just as the computation of the DIF IFFT unit is understood easily from the computation of the DIT FFT unit of FIG. 8, the signal flow of the IFFT unit adopting the DIT algorithm can be understood easily from the computation of the DIF FFT unit of FIG. 7. Hence, no further explanation will be provided herein.

In conclusion, if sub-carriers are allocated in the form of comb symbols, the computation amount of the IFFT unit can be reduced. This leads to reduction in the computation amount of the transmitting system 210.

Differently from the conventional cluster-based frequency hopping, the comb symbol-based frequency hopping of the present invention makes the frequency offset 65 of the comb symbols differ in the frequency band according to the frequency hopping between sub-carrier groups. For example, in FIG. 7, a sub-carrier group a is allocated as sub-carriers of a comb symbol. If the frequency of the sub-carrier group a hops to an adjacent sub-carrier group b, the frequency offset is changed from a comb symbol a to a comb symbol b in the frequency domain.

In accordance with the embodiment of the present invention, frequency hopping is performed between sub-carrier groups. So, the sub-carriers allocated after frequency hopping are always different from the sub-carriers allocated in the preceding time slot.

Figure 11:
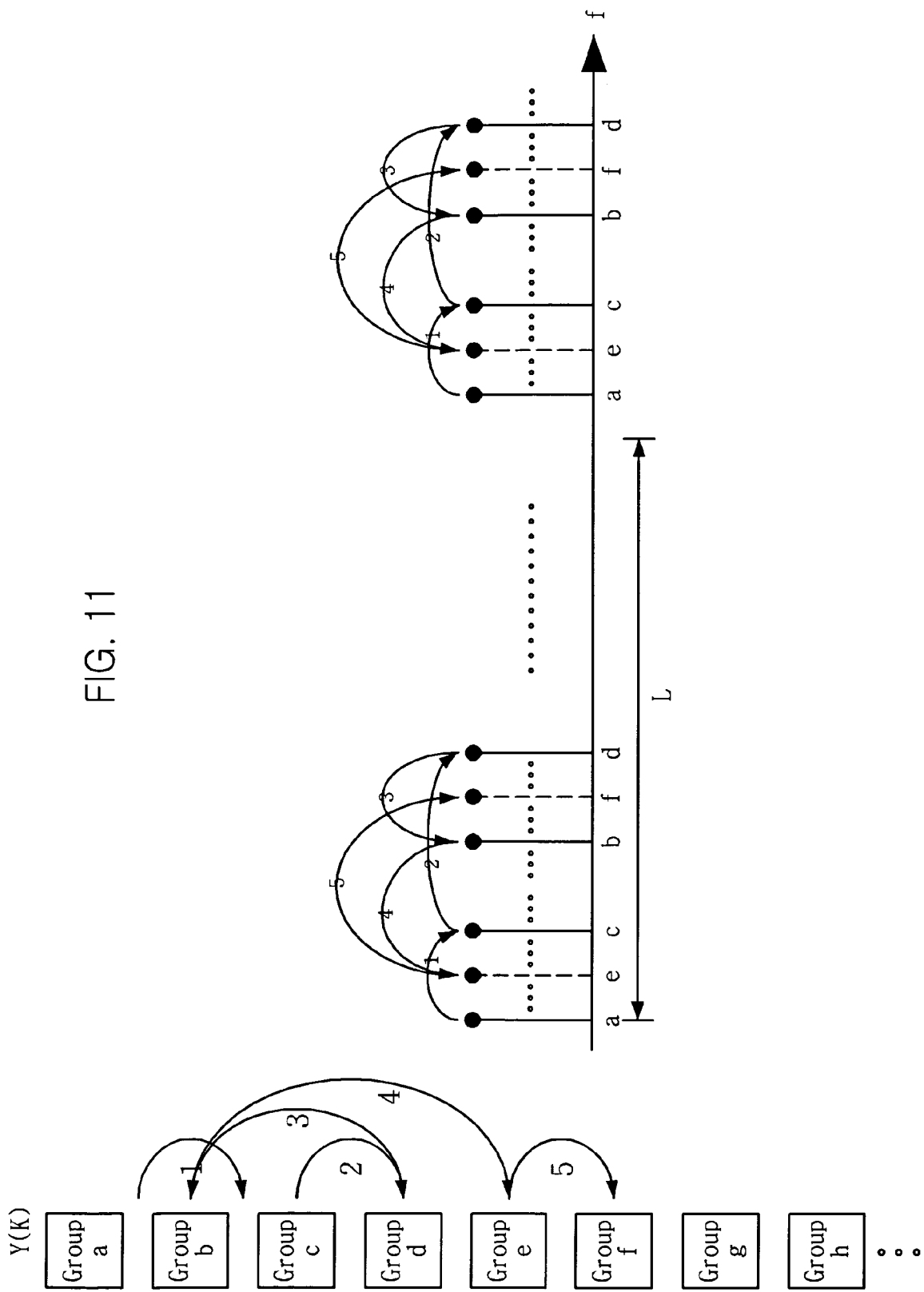
FIG. 11 is a diagram describing comb symbols, which are allocated to one mobile station, performing frequency hopping randomly in accordance with an embodiment of the present invention.

FIG. 10 is a diagram illustrating comb symbols, which are allocated to one mobile station, performing frequency hopping to an adjacent sub-carrier group in accordance with an embodiment of the present invention. FIG. 11 is a diagram describing comb symbols, which are allocated to one mobile station, performing frequency hopping randomly in accordance with an embodiment of the present invention.

In other words, FIG. 10 shows a pattern the sub-carrier group of one comb symbol performs frequency hopping to an adjacent sub-carrier group, and FIG. 11 presents a pattern the sub-carrier group of one comb symbol performs frequency hopping randomly. The random frequency hopping pattern includes a frequency hopping pattern having an identical frequency offset, which is a case where frequency hopping does not occur substantially in the frequency band. This is possible by establishing an independent frequency offset according to time.

Referring to FIG. 9, the frequency offset of comb symbols is different in the frequency band according to the frequency hopping between sub-carrier groups. The boxes marked as sub-carrier groups Y(k) on the left part of FIGS. 10 and 11 are the sub-carrier groups a, b, c, . . . 63 of FIG. 7.

As shown in FIGS. 10 and 11, the comb symbol formed of the adjacent sub-carrier group performs frequency hopping in accordance with the embodiment of the present invention. However, in the actual frequency band, the frequency hopping is not carried out to the comb symbol of the adjacent frequency but it occurs in a complex pattern. This acts as a positive factor for increasing the frequency diversity effect based on frequency hopping.

Figure 12:
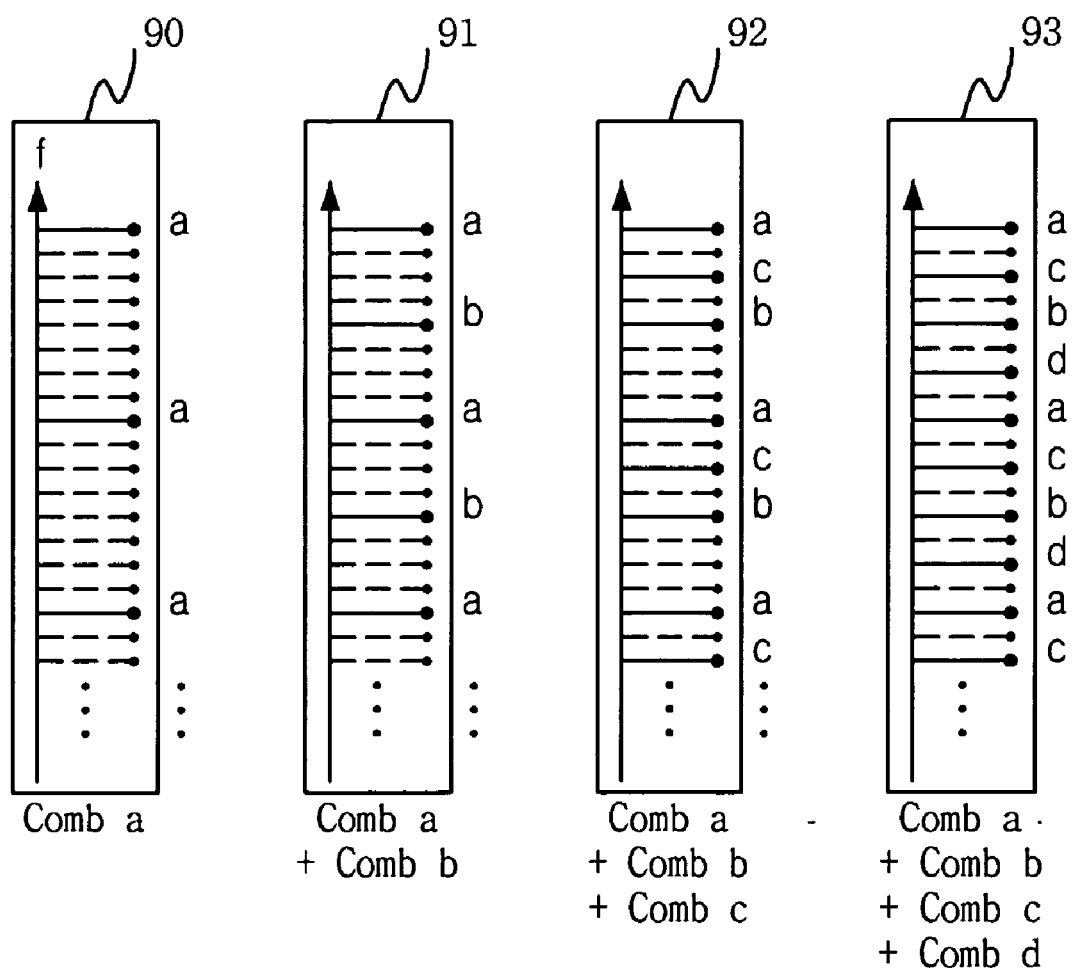
FIG. 12 is a diagram depicting sub-carriers changing their positions in the frequency domain, when comb symbols are allocated additionally in accordance with an embodiment of the present invention.

Meanwhile, if the transmission rate is increased in the mobile station, the number of sub-carrier groups required for transmitting signals is increased, too. This requires additional allocation of comb symbols and the space between sub-carriers is decreased. FIG. 12 shows the sub-carriers of which the positions are changed in the frequency domain due to the additional allocation of comb symbols caused by the increase in the transmission rate.

FIG. 12 is a diagram depicting sub-carriers changing their positions in the frequency domain, when comb symbols are allocated additionally in accordance with the embodiment of the present invention. It shows a pattern 90 of a comb symbol a when a sub-carrier group a is allocated, a pattern 91 of a combination of the comb symbol a and a comb symbol b when the sub-carrier b is allocated in addition to the sub-carrier a, a pattern 92 of a combination of the comb symbol a, the comb symbol b and a comb symbol c when the sub-carrier group a, the sub-carrier group b, and a sub-carrier group c are allocated, and a pattern 93 of a combination of the comb symbol a, the comb symbol b, the comb symbol c and a comb symbol d when the sub-carrier group a, the sub-carrier group b, the sub-carrier group c and a sub-carrier group d are allocated.

In other words, if the sub-carrier group a is allocated initially and then the sub-carrier groups b, c and d are allocated additionally in proportion to the increasing transmission rate, the space between the sub-carriers of a comb symbol is decreased.

In case that a plurality of comb symbols are allocated to one mobile station, the space between the sub-carriers constituting the comb symbols may not be the same but depends on the frequency offset of the comb symbols. Also, if the initial comb symbol is not the comb symbol a but a comb symbol having another frequency offset, the sub-carrier allocation pattern that is changed according to the increasing transmission rate and the additional allocation of other comb symbols is different from that of FIG. 12. For example, if the initial comb symbol allocated to the mobile terminal is the comb symbol b and then the comb symbols c, d and a are allocated additionally, the sub-carrier allocation pattern appears differently from that of FIG. 12.

Figure 13:
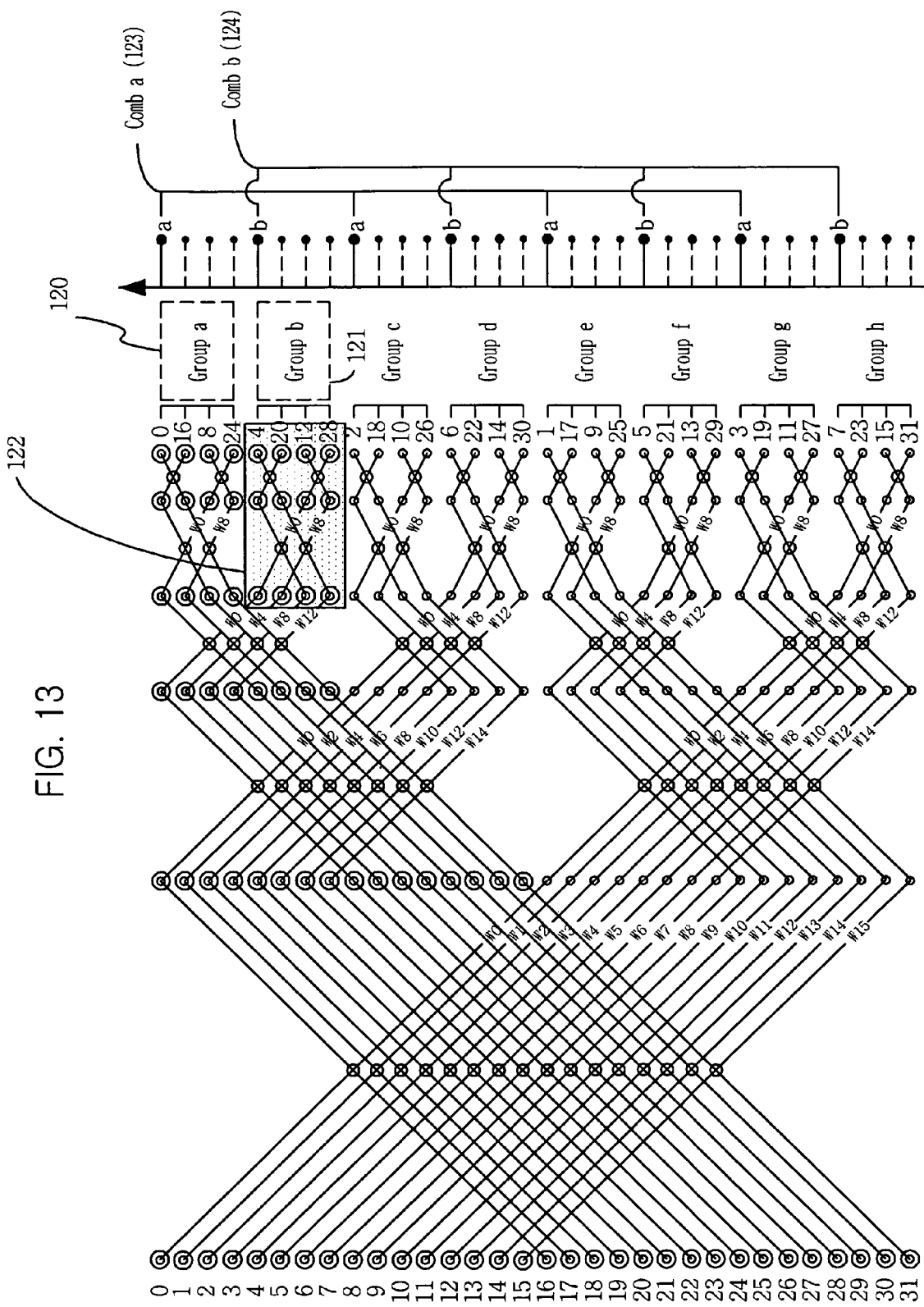
FIG. 13 is a diagram describing the amount of computation which should be performed in a butterfly unit for the FFT unit adopting a DIF algorithm to yield neighboring sub-carrier groups in accordance with an embodiment of the present invention.
Figure 14:
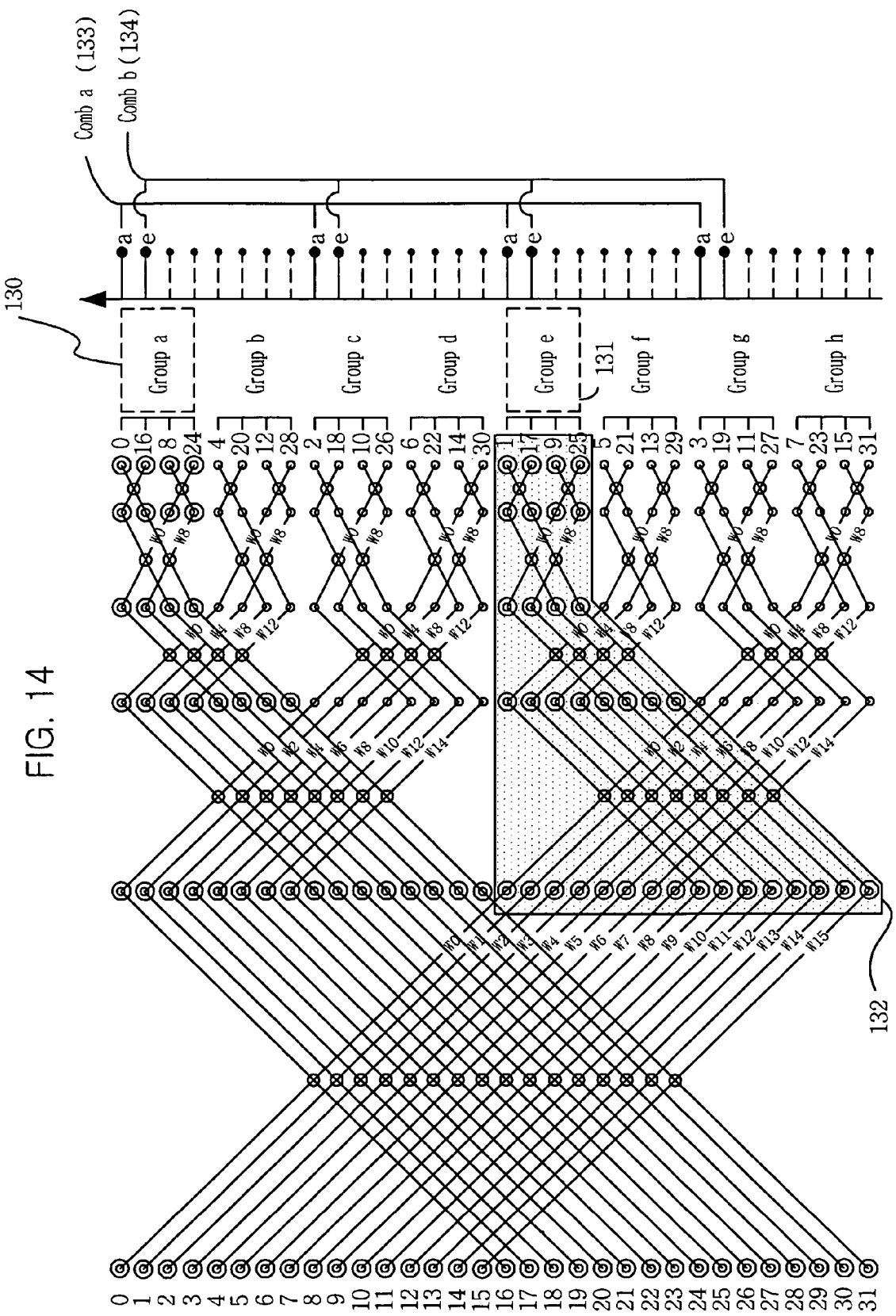
FIG. 14 is a diagram illustrating the amount of computation which should be performed in a butterfly unit for the FFT unit adopting a DIF algorithm to yield un-neighboring sub-carrier groups in accordance with an embodiment of the present invention.

FIG. 13 is a diagram describing the amount of computation which should be performed in a butterfly unit for the FFT unit adopting a DIF algorithm to yield neighboring sub-carrier groups in accordance with an embodiment of the present invention. FIG. 14 is a diagram illustrating the amount of computation which should be performed in a butterfly unit for the FFT unit adopting a DIF algorithm to yield un-neighboring sub-carrier groups in accordance with an embodiment of the present invention.

FIGS. 13 and 14, which show signal flow in the FFT unit 233, presents an embodiment where two comb symbols of the same size are allocated to one mobile station to double the transmission rate. Referring to FIG. 13, a comb symbol of an adjacent sub-carrier group is allocated in accordance with the present invention. On the contrary, FIG. 14 shows a case where a comb symbol of a sub-carrier group that is not an adjacent sub-carrier group is allocated. From the two drawings, it can be seen that the technology of the present invention where a comb symbol of an adjacent sub-carrier group is allocated is superior to that of FIG. 14.

In FIGS. 13 and 14, the dot-lined boxes 122 and 132 denote the amount of computation consumed additionally by the comb symbols allocated additionally. As shown in FIG. 13, when a comb symbol of a sub-carrier group a and a comb symbol of an adjacent sub-carrier group b 121 are allocated to one mobile station, only a little amount of computation is consumed additionally. In this case, the sub-carriers of the comb symbol a 123 and the comb symbol b 124 that belongs to an adjacent sub-carrier group do not appear adjacently but they are put apart with a regular space in the frequency band.

On the other hand, FIG. 14 shows a case where comb symbols of a sub-carrier a 130 and a sub-carrier e 131 that are not adjacent sub-carrier groups are allocated to one mobile station. In the drawing, the increase 132 in the butterfly computation amount for obtaining a signal of the additional sub-carrier group e 131 is larger than the increase 122 in the computation of FIG. 13.

Therefore, if the number of comb symbols to be allocated is increased, the computation amount can be decreased more by additionally allocating a comb symbol of an adjacent sub-carrier group than allocating a comb symbol of a sub-carrier group which is not an adjacent sub-carrier group.

Figure 15:
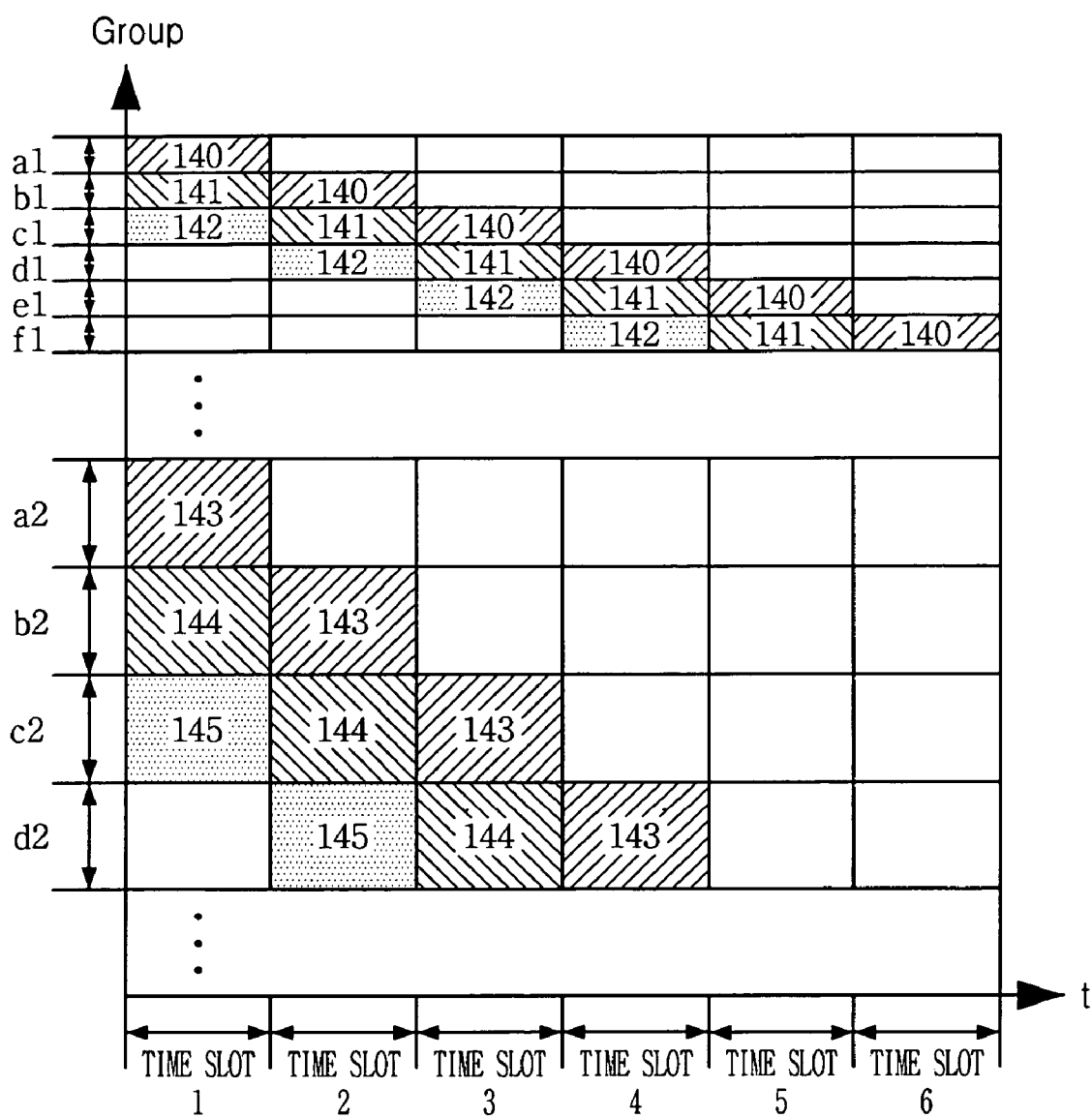
FIG. 15 is a diagram showing comb symbols, each formed of a different number of sub-carriers, being allocated to many mobile stations within a cell of a base station and performing frequency hopping to adjacent sub-carrier groups of the same size in accordance with an embodiment of the present invention.
Figure 16A:
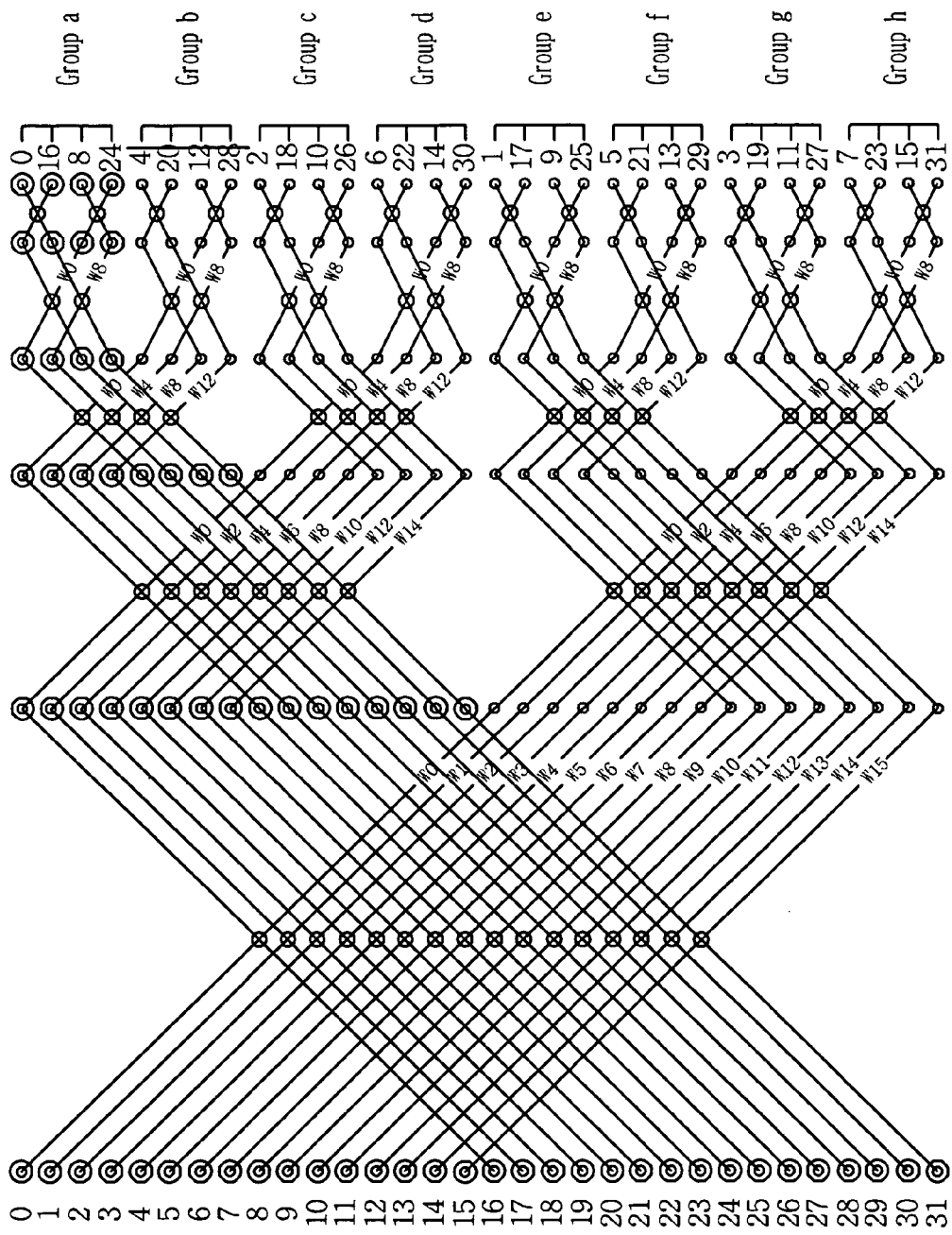
FIGS. 16A to 16D are diagrams describing partial FFT computation based on the frequency hopping pattern of a comb symbol, which is formed of a group of sub-carriers, i.e., a sub-carrier group, in accordance with an embodiment of the present invention.
Figure 16B:
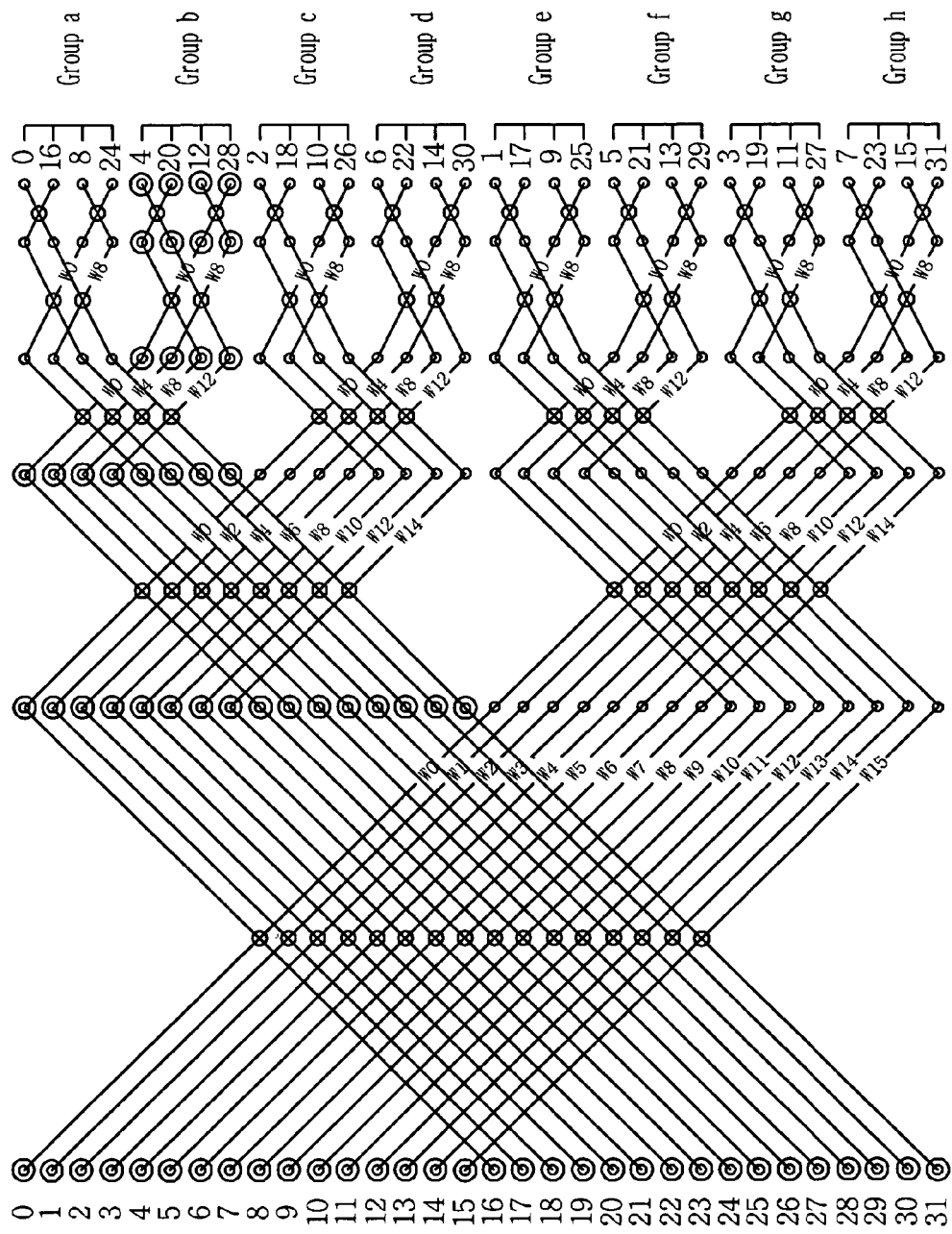
Figure 16C:
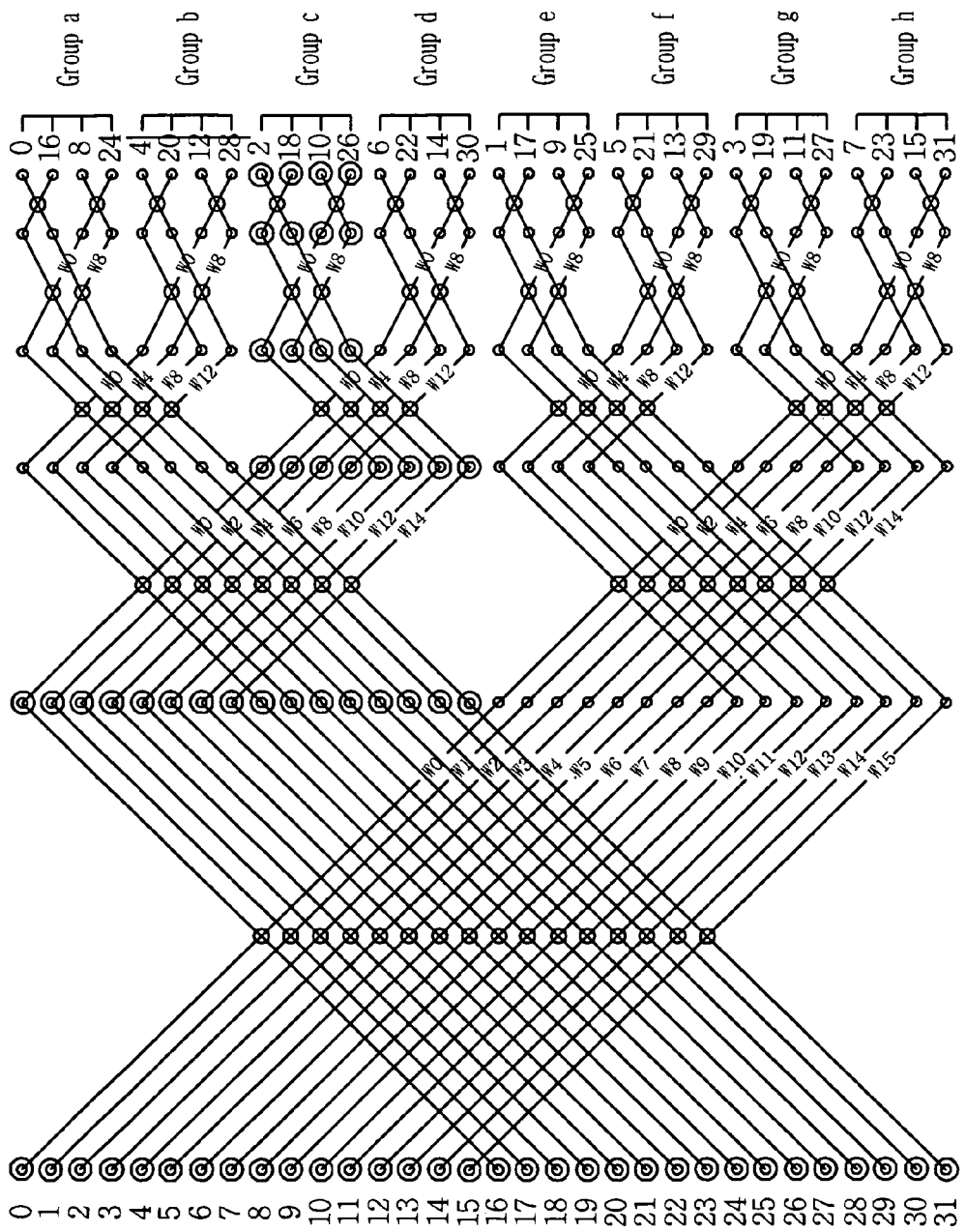
Figure 16D:
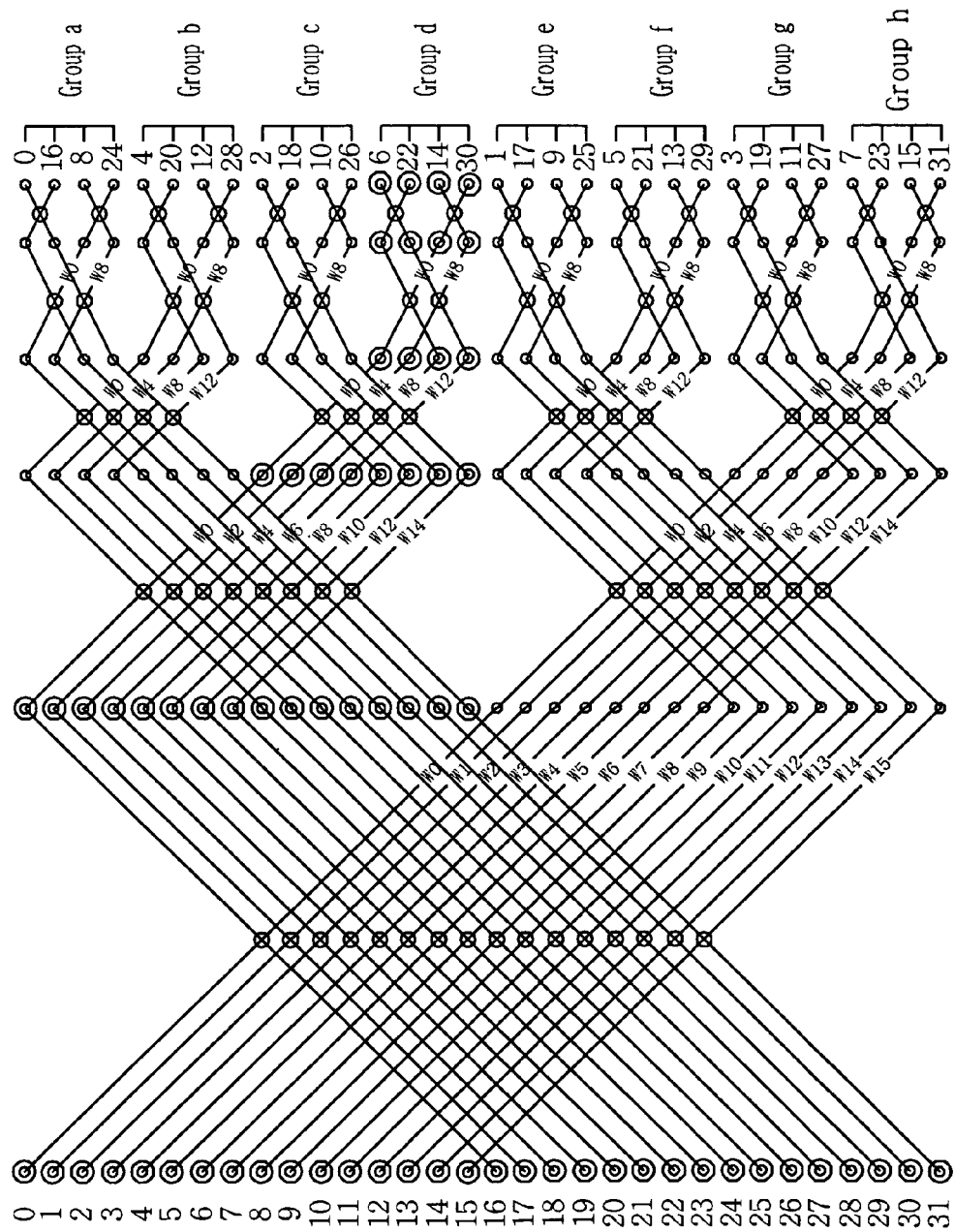
Figure 17A:
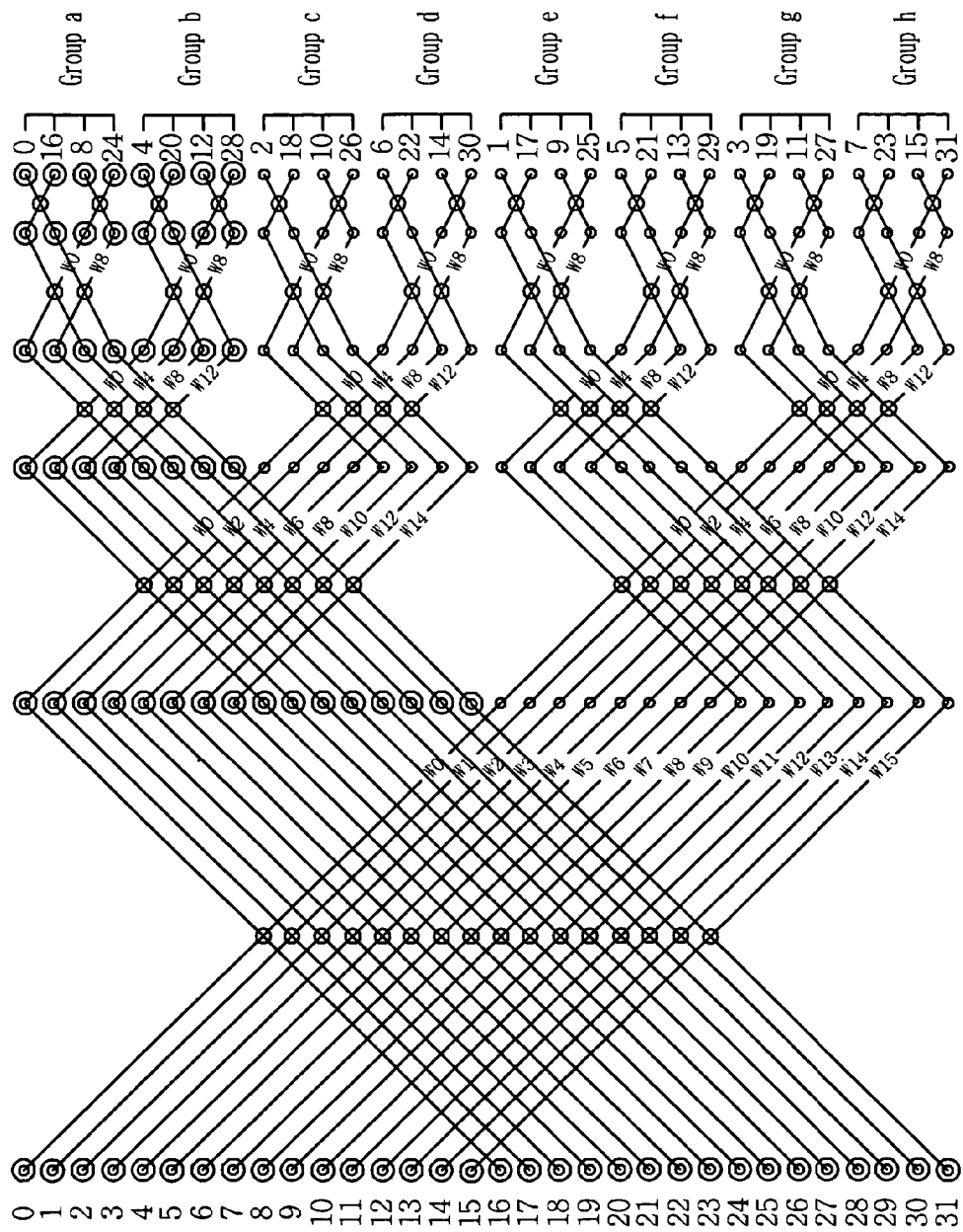
FIGS. 17A to 17D are diagrams depicting partial FFT computation based on the frequency hopping pattern when two comb symbols are allocated.
Figure 17B:
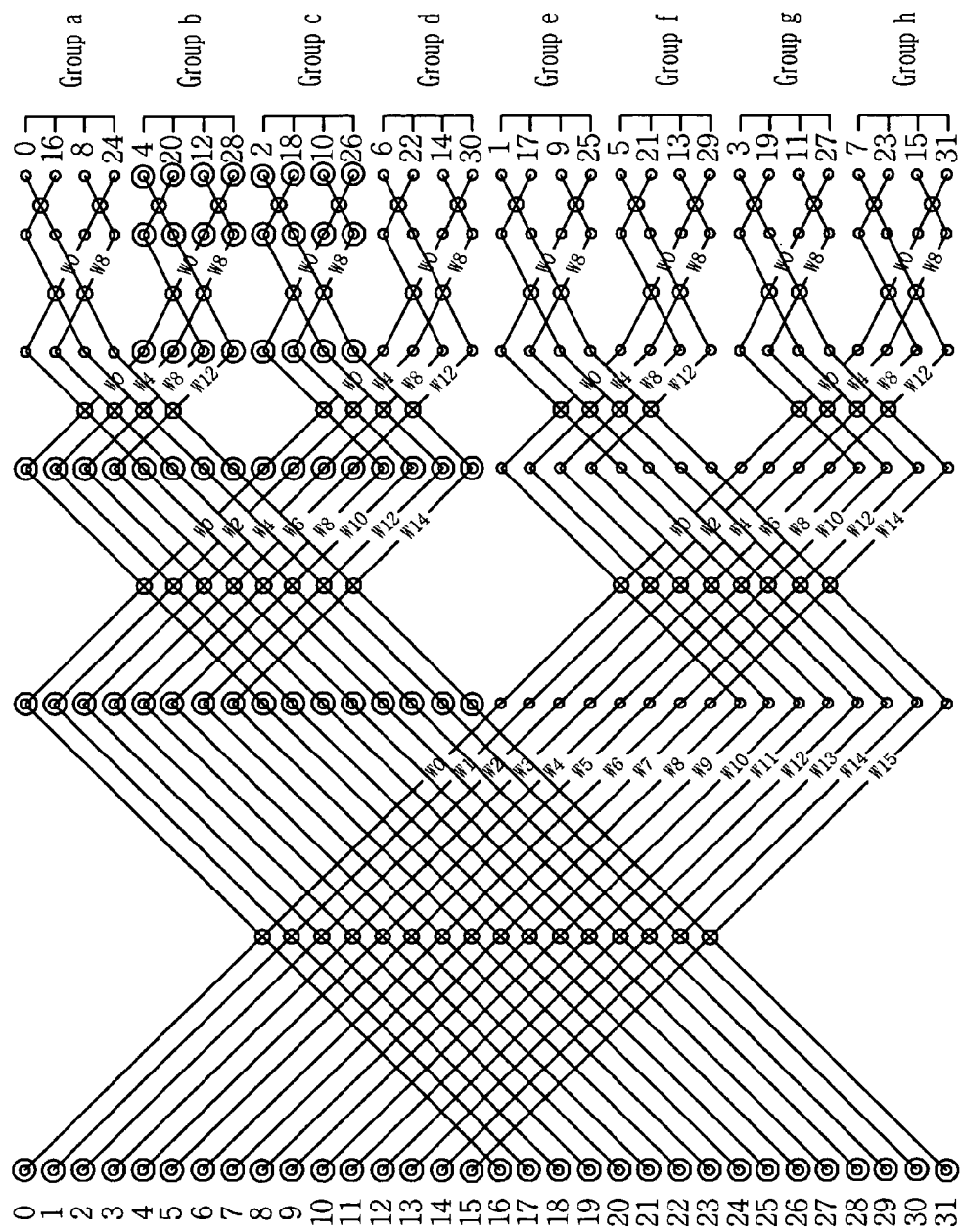
Figure 17C:
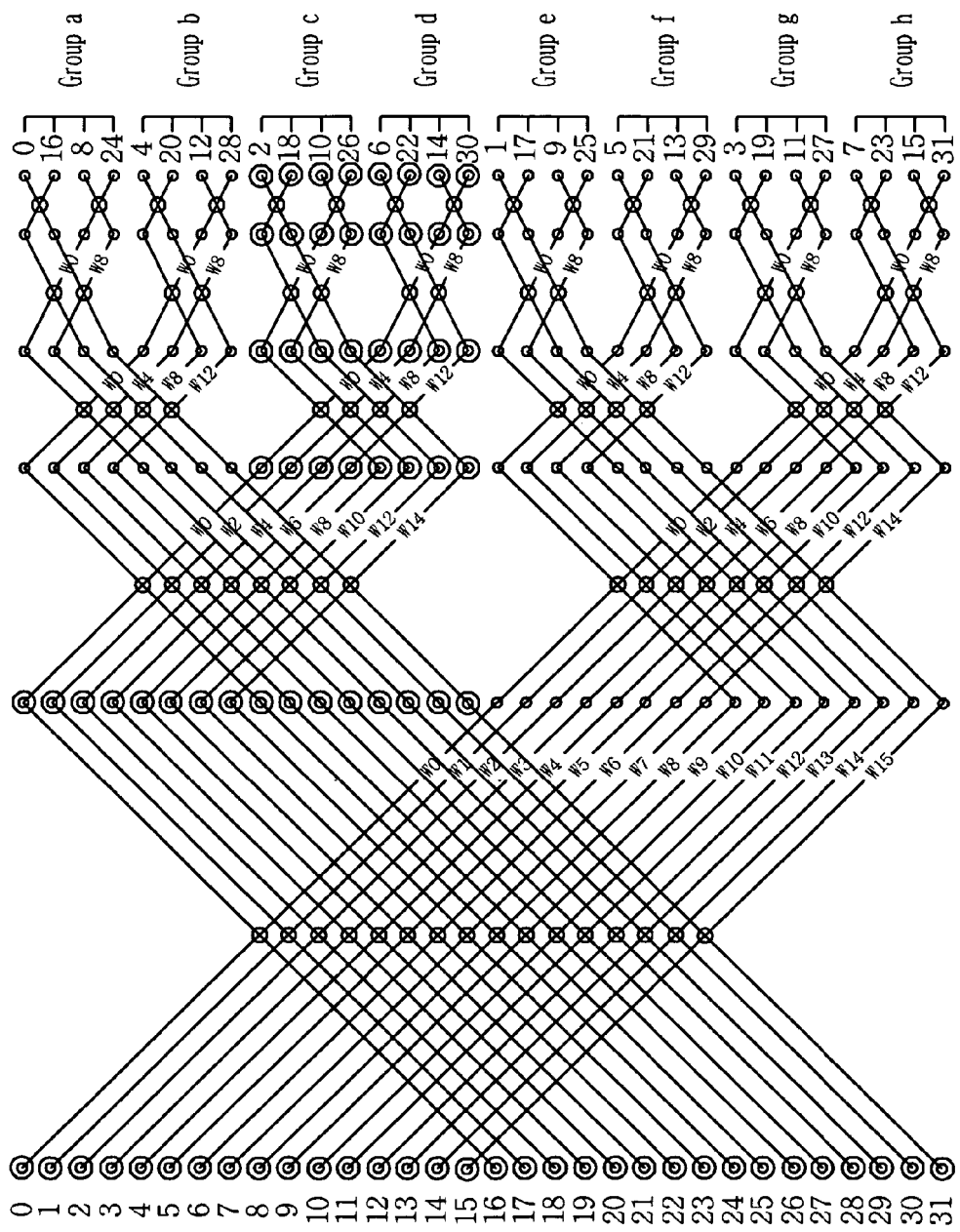
Figure 17D:
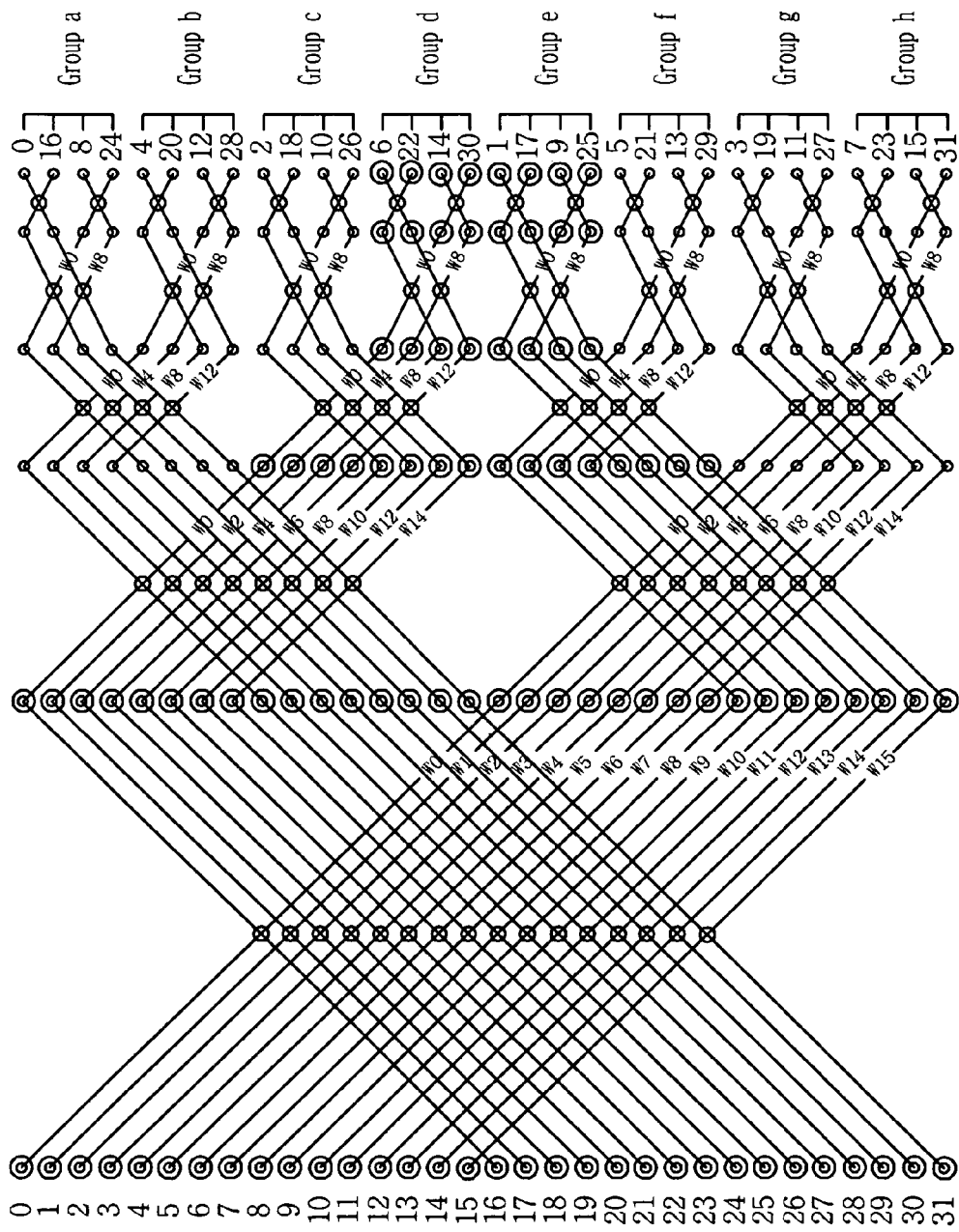

FIG. 15 is a diagram showing comb symbols, each of which is formed of a different number of sub-carriers, being allocated to many mobile stations within a cell of a base station and performing frequency hopping to adjacent sub-carrier groups of the same size in accordance with an embodiment of the present invention. It shows an example of a pattern that a comb symbol of a sub-carrier group performs frequency hopping to a comb symbol of an adjacent sub-carrier group. In the drawing, the horizontal axis indicates time slots, while the vertical axis shows sub-carrier group. It should be noted that the vertical axis shows sub-carrier group, which is different from FIG. 1A.

As shown in FIG. 15, if different comb symbols are allocated to different mobile stations and performs frequency hopping in the same pattern in all the mobile stations, the sub-carrier groups performs frequency hopping to adjacent comb symbols without any overlapping. Thus, interference can be prevented between the mobile stations in a cell.

FIG. 15 shows an example where the number of sub-carriers constituting an allocated comb symbol is different according to the type of data. Referring to FIG. 15, the sub-carrier groups formed having a few number of sub-carriers, for example, 4 sub-carriers, are a1, b1 and c1 and those having many sub-carriers, for example, 64 sub-carriers, are a2, b2 and c2. If the number of sub-carriers constituting a comb symbol is the size of the comb symbol, it is proper to allocate comb symbols of small size to data signals having short packets, such as voice signals or control signals and allocate comb symbols of large size to signals requiring high transmission rates.

The computation amount of partial FFT can be minimized by grouping the sub-carriers a1, b1 and c1 constituting the comb symbol of small size, e.g., 4 sub-carriers, as one group and grouping the sub-carriers a2, b2 and c2 constituting the comb symbol of large size e.g., 64 sub-carriers, as another group and then making the sub-carrier groups perform frequency hopping to sub-carrier groups of the same size in the process for allocating comb symbols and determining a frequency hopping pattern.

When the size of the comb symbols are determined according to the attributes of transmitted data, factors such as system condition and the type of service should be considered and the factors can be different according to system designers. The embodiment of the present invention should be understood not limited to the two sub-carrier groups illustrated in FIG. 15.

According to the embodiment of the present invention, the frequency hopping can be carried out only between the comb symbols of the same size, that is, within the sub-carrier groups that form allocated comb symbols. In short, the frequency hopping is performed between comb symbols having the same size but different frequency offsets. This way, the computation amount of partial FFT can be minimized.

FIGS. 16A to 16D are diagrams describing partial FFT computation based on the frequency hopping pattern of a comb symbol, which is formed of a group of sub-carriers, in accordance with an embodiment of the present invention. FIGS. 17A to 17D and 18A to 18D are exemplary diagrams describing the computation of partial FFT according to the frequency hopping pattern when two or more comb symbols are allocated to one mobile station.

FIGS. 16A to 16D show signal flow of the FFT unit adopting the DIF algorithm according to the frequency pattern, when the size of the sub-carrier group is 4, i.e., when the comb symbol is formed of four sub-carriers. The four drawings are discriminated according to time slots and the frequency hopping pattern is carried in the order of sub-carrier groups a->b->c->d.

FIGS. 17 A to 17D show signal flow of the FFT unit adopting the DIF algorithm according to frequency hopping pattern, when two comb symbols of the same size are allocated due to increase in the transmission amount. The four drawings are discriminated according to time slots and the frequency hopping pattern is carried in the order of sub-carrier groups (a,b)->(b,c)->(c,d)->(d,e).

As shown above, when additional comb symbols need to be allocated, the FFT computation amount can be decreased and thus the frequency diversity can be increased by establishing the minimum unit for frequency hopping as the size of the comb symbol allocated initially and changing the space between sub-carriers through frequency hopping.

Further, in accordance with the embodiment of the present invention, the minimum unit for frequency hopping is determined to be a summation of the sizes of two sub-carrier groups. The frequency hopping is performed in the order of the sub-carrier groups (a,b)->(c,d)->(e,f)->(g,h). That is, if i comb symbols are allocated to one mobile station, the minimum unit for the frequency hopping of the comb symbols is established as the number of sub-carriers that forms the i comb symbols.

Referring to FIGS. 18A to 18D, it can be seen that the number of butterflies required for computation according to time slots, i.e., computation amount, is the same when comb symbols are allocated additionally and frequency hopping is carried out. Here, the sub-carriers are placed based on the comb symbol.

Generally, if the frequency hopping is performed on the allocated sub-carrier groups, i.e., allocated comb symbols taking the number of the allocated sub-carrier groups as a unit, the partial FFT computation efficiency is improved. This can be expressed as Equation 6.

$$G = (g_n + P(l) \times i) \bmod N_c \qquad \text{Equation 6}$$

wherein G denotes a group number in a time slot 1;

P(l) denotes a frequency hopping pattern function;

i denotes the number of allocated groups, or sub-carrier groups; and $g_n$ denotes a group number in the initial time slot.

For example, in FIGS. 18A to 18D, groups a, b, c and the like acquire group numbers corresponding thereto, such as groups 0, 1, 2 and the like, sequentially and the group number of the sub-carrier group allocated initially is $g_n$, the frequency hopping is performed to a sub-carrier group G according to the frequency hopping pattern function P(l) shown in Equation 6. The unit of the frequency hopping is the summation of the sizes of the sub-carrier groups allocated to the mobile station.

Meanwhile, the allocation and frequency hopping of the comb symbols are performed within the sub-carrier groups having the same size. By carrying out frequency hopping based on the maximum number of the allocated sub-carrier groups, the computation amount of partial FFT is minimized. At the same time, the frequency diversity effect can be maximized by changing the space between the allocated sub-carriers.

Figure 18A:
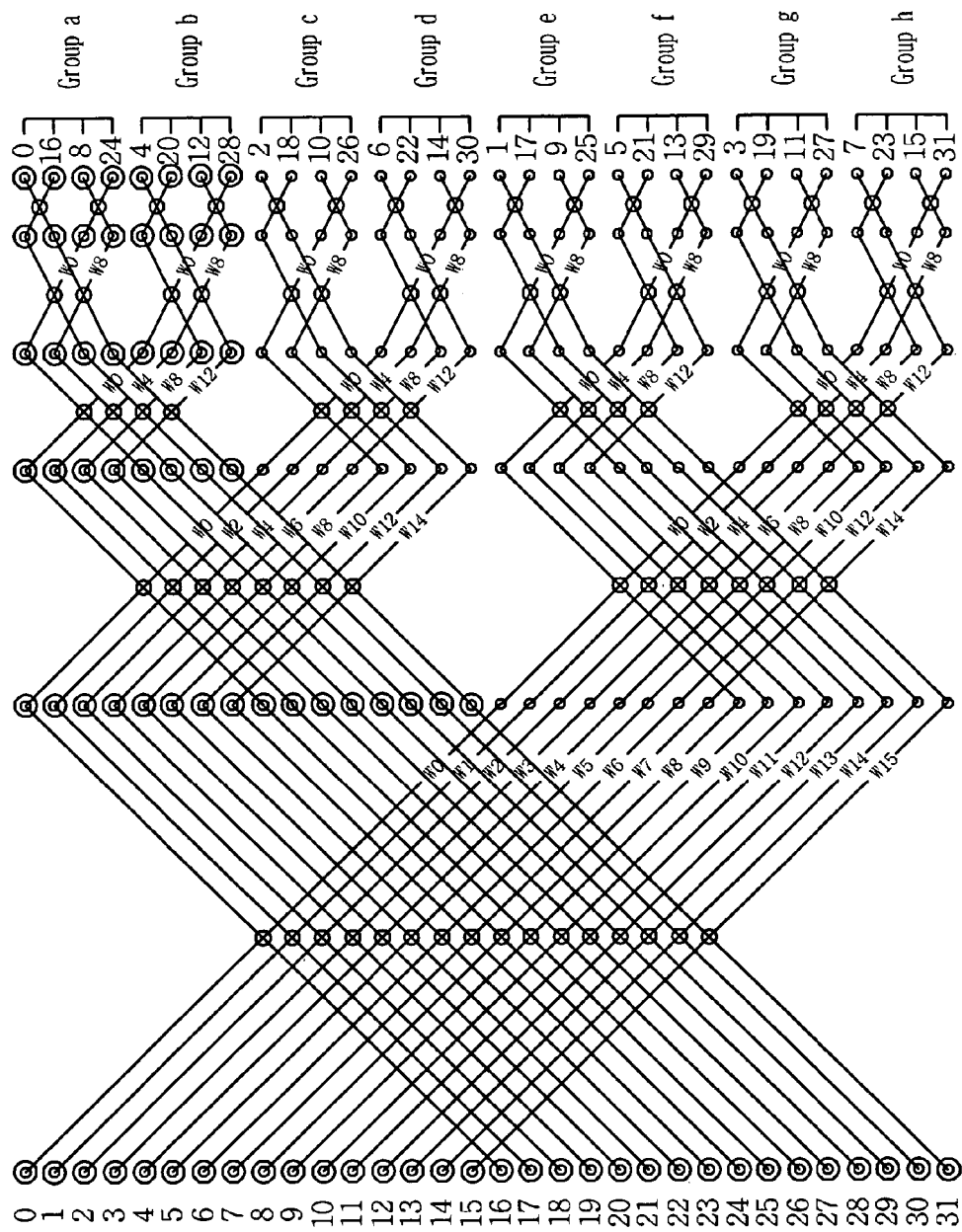
FIGS. 18A to 18D are diagrams depicting partial FFT computation based on the frequency hopping pattern when two comb symbols are allocated.
Figure 18B:
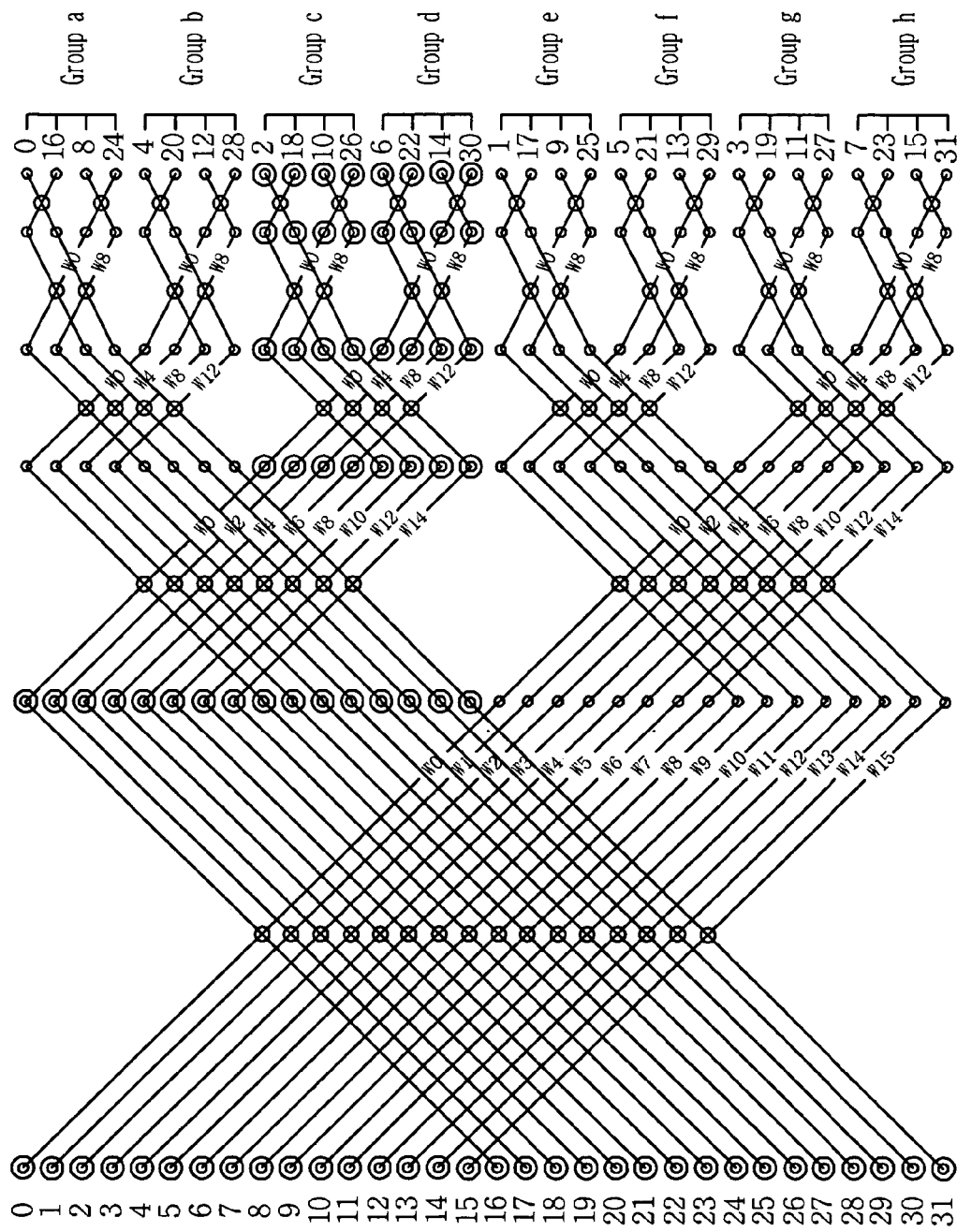
Figure 18C:
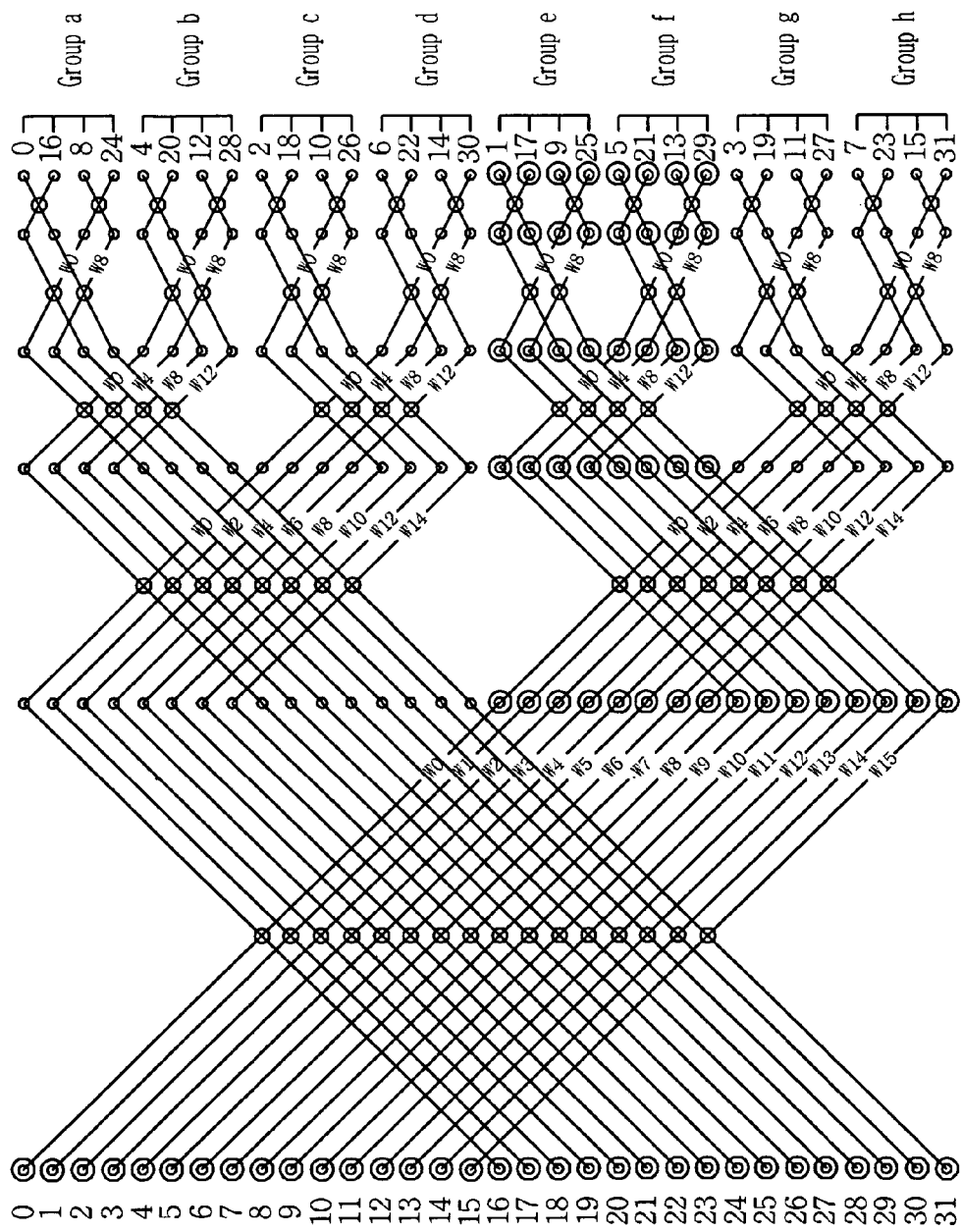
Figure 18D:
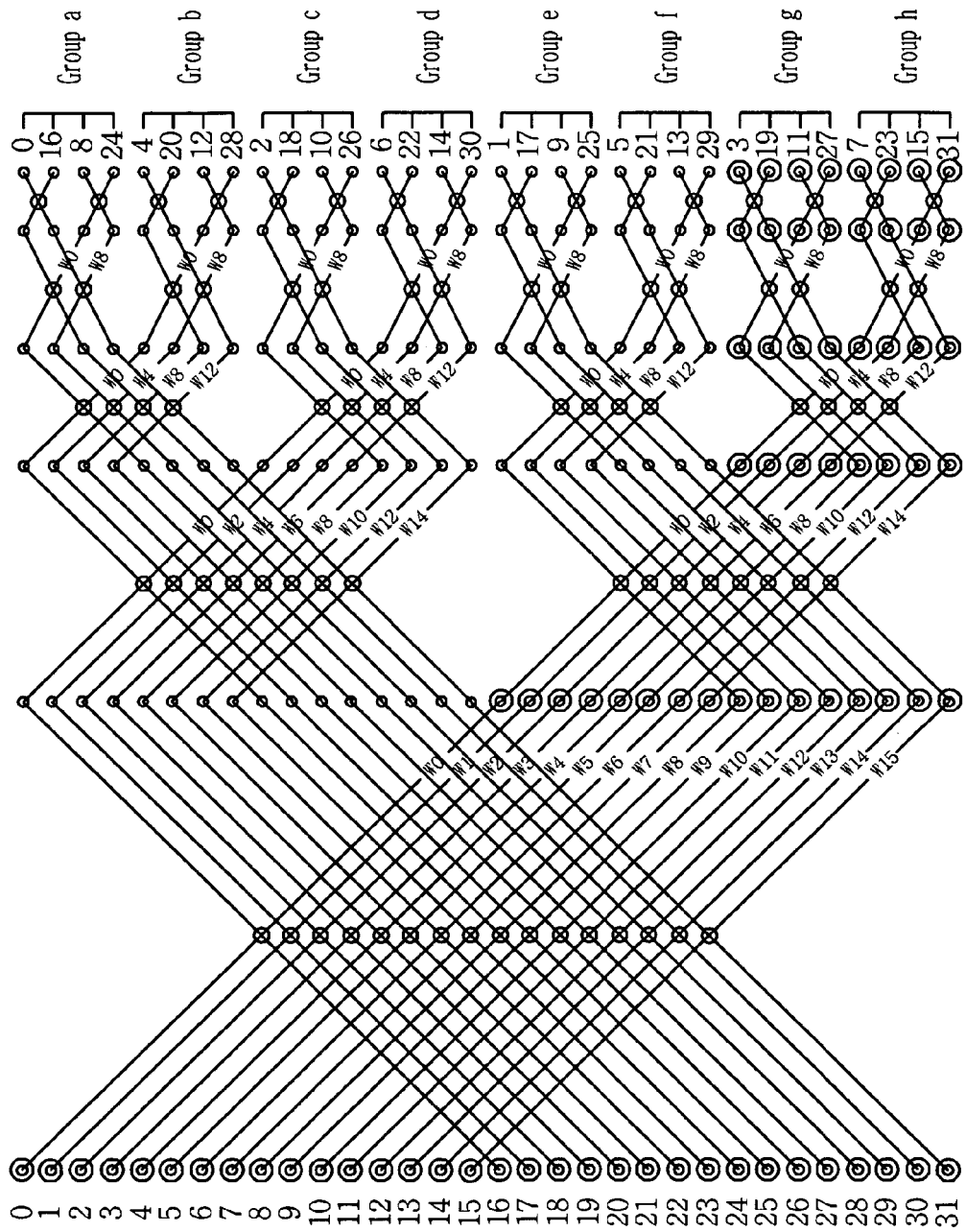
Figure 19:
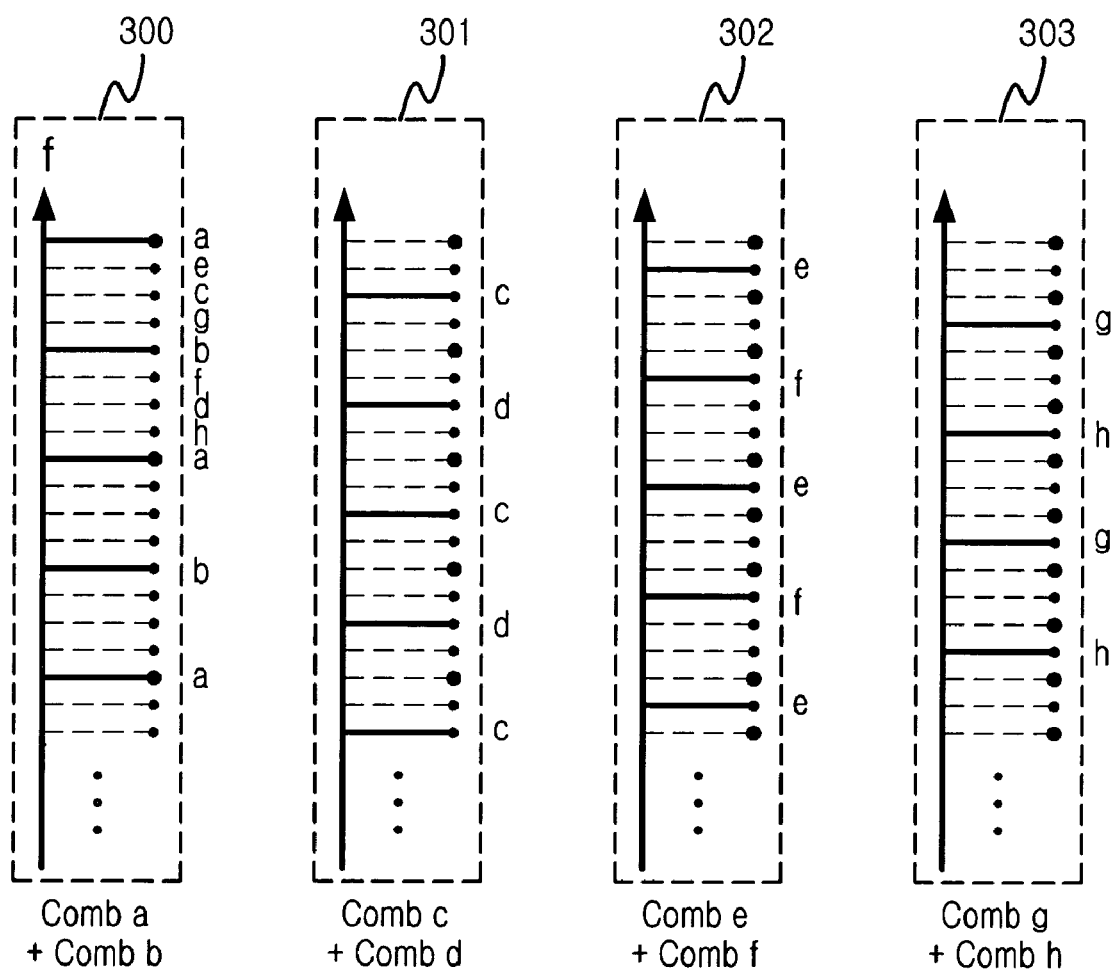
FIG. 19 is a diagram showing a change in the interval of sub-carriers in the frequency domain, when a comb symbol is allocated additionally and thus two symbols perform frequency hopping in accordance with an embodiment of the present invention.

FIG. 19 illustrates the frequency hopping of FIGS. 18A to 18D in the frequency band. FIG. 19 describes the change in the space between the sub-carrier groups in the frequency band when a comb symbol is allocated additionally and thus two sub-carrier groups performs frequency hopping.

That is, the sub-carriers allocated in a time slot 1 of FIG. 18A is the reference number 300 of FIG. 19 and a time slot 2 of FIG. 18B is the reference number 301 of FIG. 19. Then a time slot 3 of FIG. 18C is the reference number 302 of FIG. 19 and a time slot 4 of FIG. 18D is the reference number 303 of FIG. 19.

Referring to FIG. 19, when the frequency hopping of FIG. 18 is performed, the spaces between the sub-carrier groups are changed. Thus, frequency diversity effect can be brought about by changing the spaces between the sub-carrier groups through frequency hopping.

Figure 20:
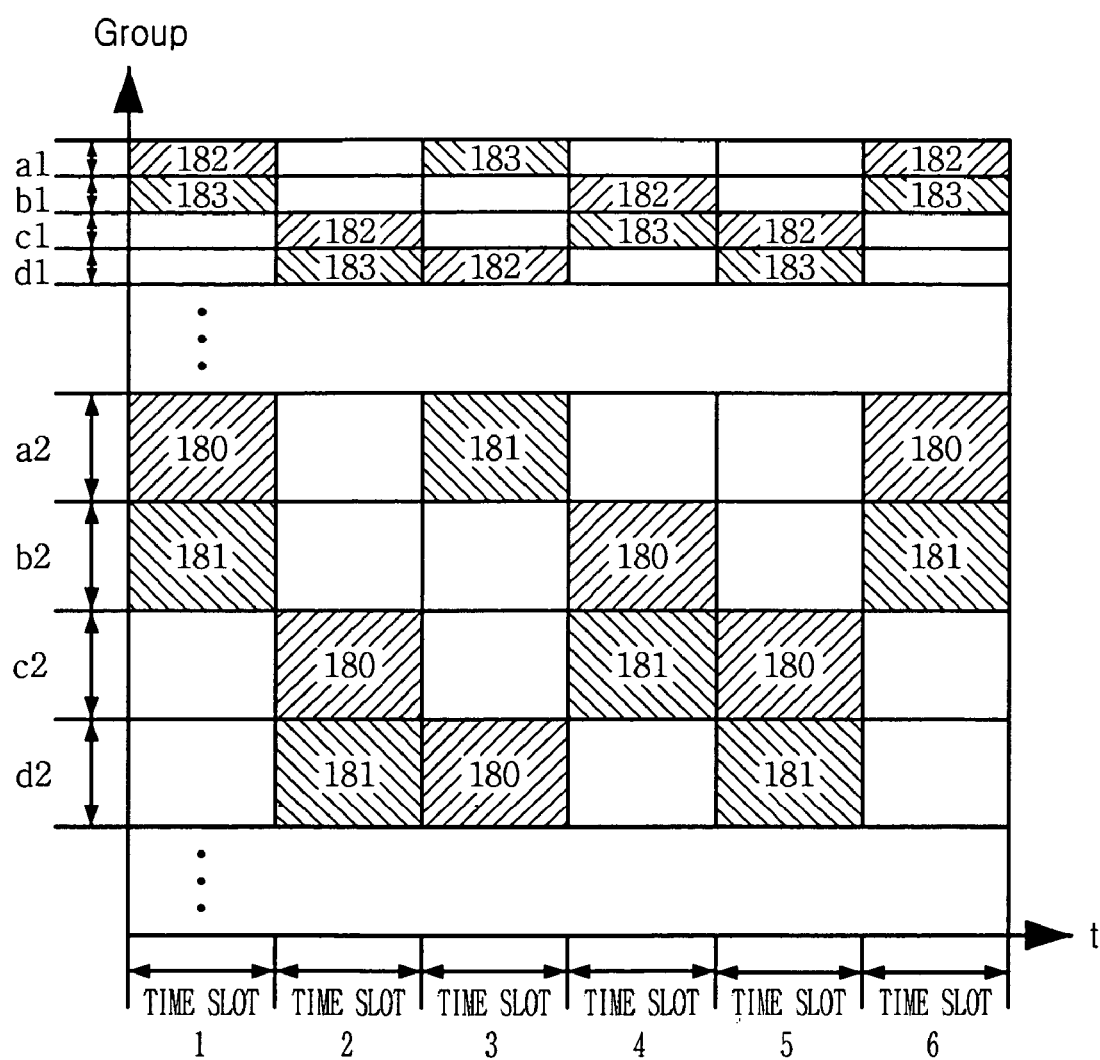
FIG. 20 is an exemplary diagram illustrating comb symbols, each formed of four sub-carriers, being allocated to many mobile stations within a cell and performing frequency hopping randomly in accordance with an embodiment of the present invention.

FIG. 20 is an exemplary diagram illustrating comb symbols, each including four sub-carriers, being allocated to many mobile stations within a cell and performing frequency hopping randomly in accordance with an embodiment of the present invention. When a transmission amount is increased, an adjacent sub-carrier group is allocated additionally to form a comb symbol. Then, although the frequency hopping is carried out randomly, the advantage of calculating partial FFT can be revealed.

Meanwhile, FIG. 20 shows sub-carrier groups, each formed of the same number of sub-carriers, being allocated and performing frequency hopping among the sub-carrier groups of the same size. For example, if comb symbols of the size 182 and the size 183 are allocated and perform frequency hopping, the comb symbol allocation and the frequency hopping are carried out among the sub-carrier groups a1, b1, c1 and d1. In case that the comb symbols having the sizes 180 and 181 are allocated and performed frequency hopping, the comb symbol allocation and frequency hopping are performed among the sub-carrier groups a2, b2, c2 and d2.

Meanwhile, if all mobile stations have an independent frequency hopping pattern or all mobile stations within a cell has the same frequency hopping pattern, the interference between the mobile stations within the cell can be removed. On the contrary, if the frequency hopping patterns of comb symbols are different between the mobile stations, the interference between cells can be equalized without additional frequency allocation. That is to say, neighboring cells may use the same frequency in one time slot by chance. However, since each cell has a different frequency hopping pattern, the interference between the cells is leveled, which leads to decreasing the interference affected on one mobile station.

Figure 21:
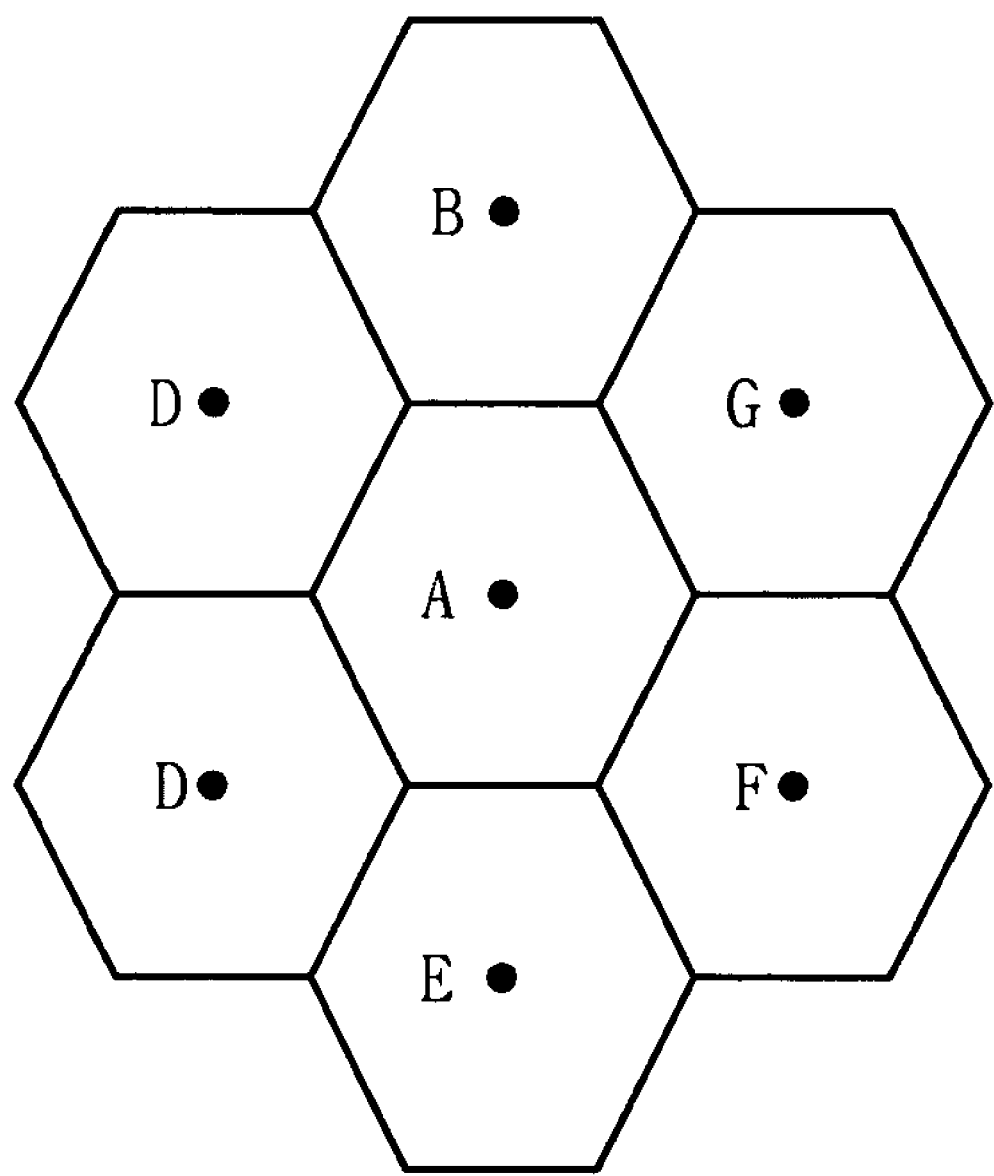
FIG. 21 is a diagram showing a cell arrangement.

FIG. 21 is a diagram showing an arrangement of cells and FIGS. 22A to 22G are diagrams describing an example of a hopping pattern for reducing inter-cell interference in accordance with an embodiment of the present invention. FIGS. 23A to 23G are diagrams describing an example of a hopping pattern for reducing inter-cell interference in accordance with an embodiment of the present invention.

Examples of frequency hopping patterns that are appropriate when each cell uses a different frequency hopping pattern in the cellular environment of FIG. 21 are presented in FIGS. 22A to 22G and 23A to 23G. In FIGS. 22A to 22G and 23A to 23G, a sub-carrier group at the top of the y axis is a sub-carrier group a, followed by sub-carrier groups b, c, d, e, f, g, h, i, j, k, l, m, n, o, and p in the mentioned order. The x axis shows time slots.

Figure 22A:
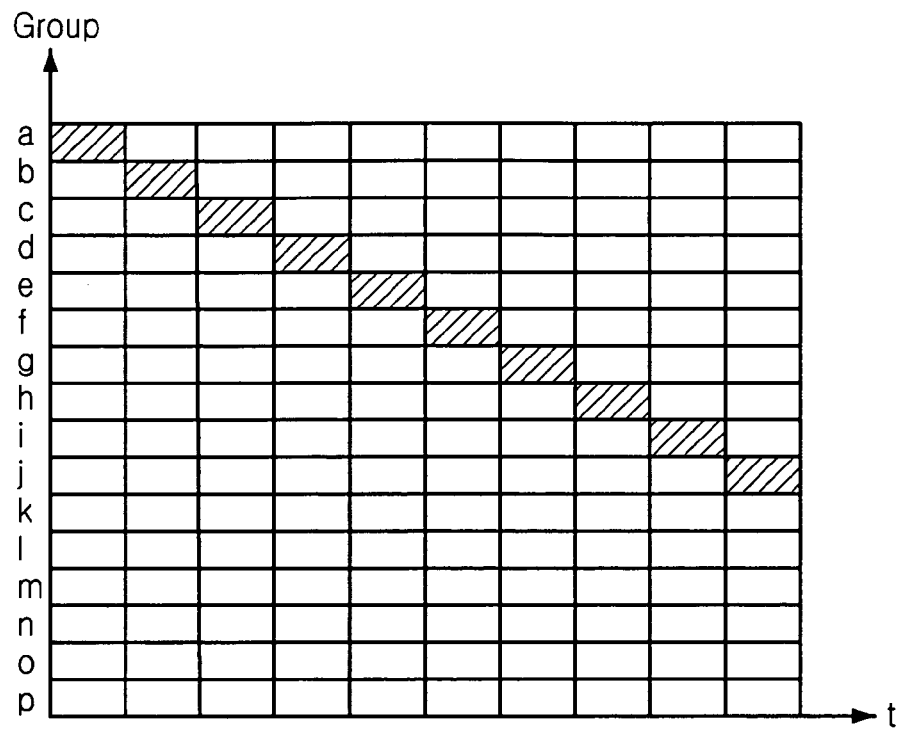
FIGS. 22A to 22G are diagrams describing an example of a frequency hopping pattern for reducing inter-cell interference in accordance with an embodiment of the present invention.
Figure 22B:
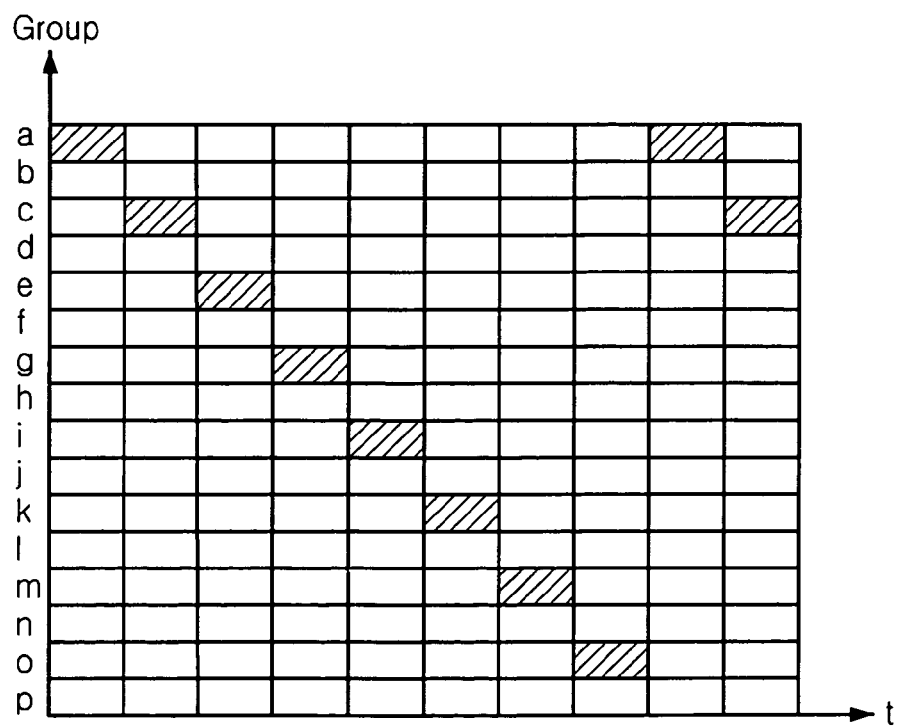

FIG. 22A shows a frequency hopping pattern established in a cell A and FIG. 22B shows a frequency hopping pattern established in a cell B. In FIG. 22A, the frequency hopping to adjacent sub-carrier groups begins with the sub-carrier group a, followed by the sub-carrier groups b, c, d, e, f, g, h, i, j, k, l, m, n, o, and p in the mentioned order. In FIG. 22B, the frequency hopping to adjacent sub-carrier groups begins with the sub-carrier group a, followed by the sub-carrier groups c, e, g, i, k, m, o, and p in the mentioned order. That is, the frequency hopping is performed to a next adjacent sub-carrier group that comes after one adjacent sub-carrier.

Figure 22C:
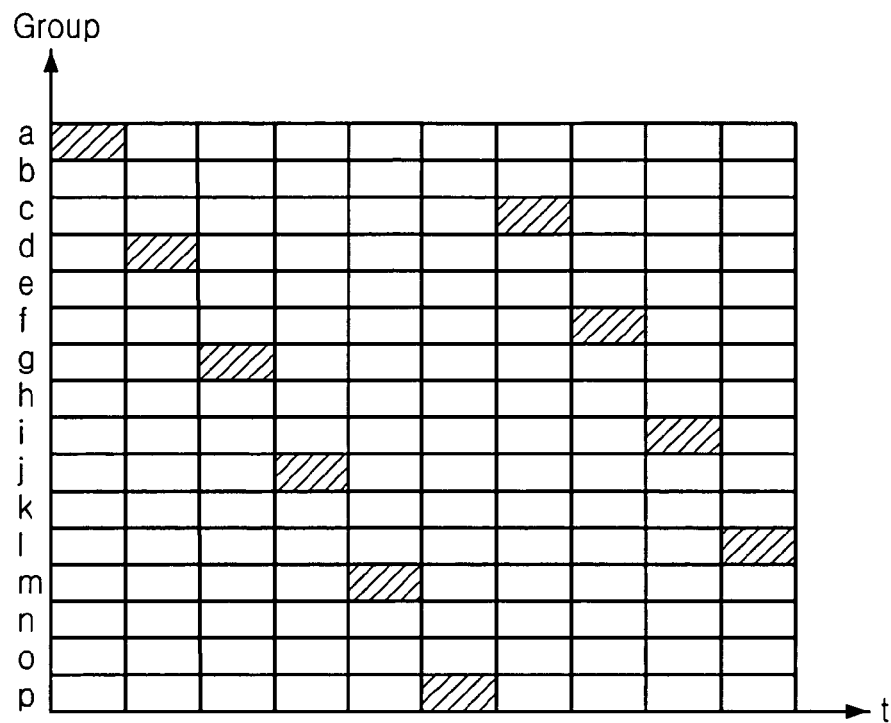
Figure 22D:
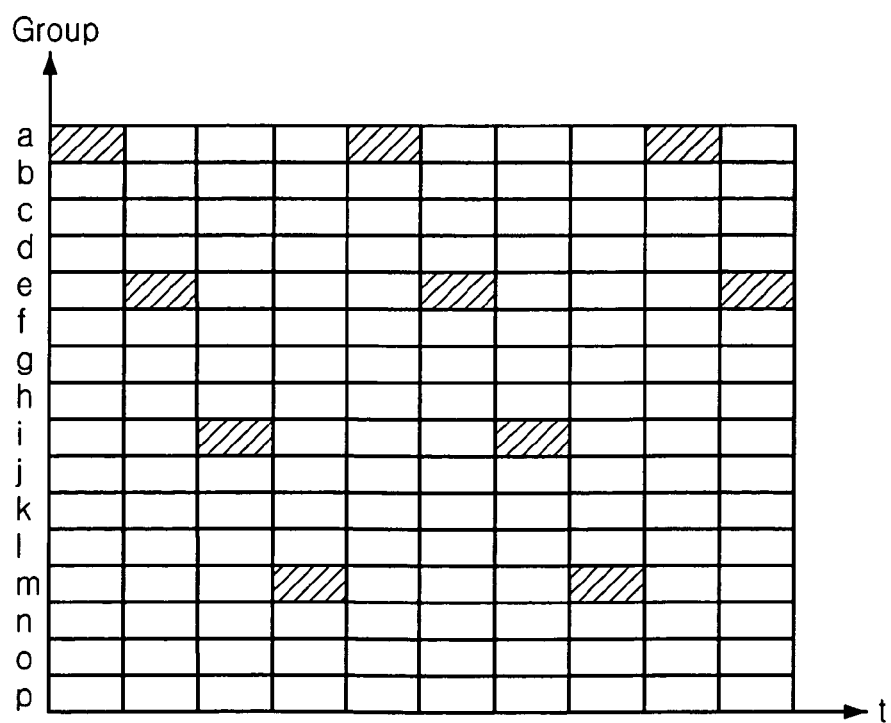
Figure 22E:
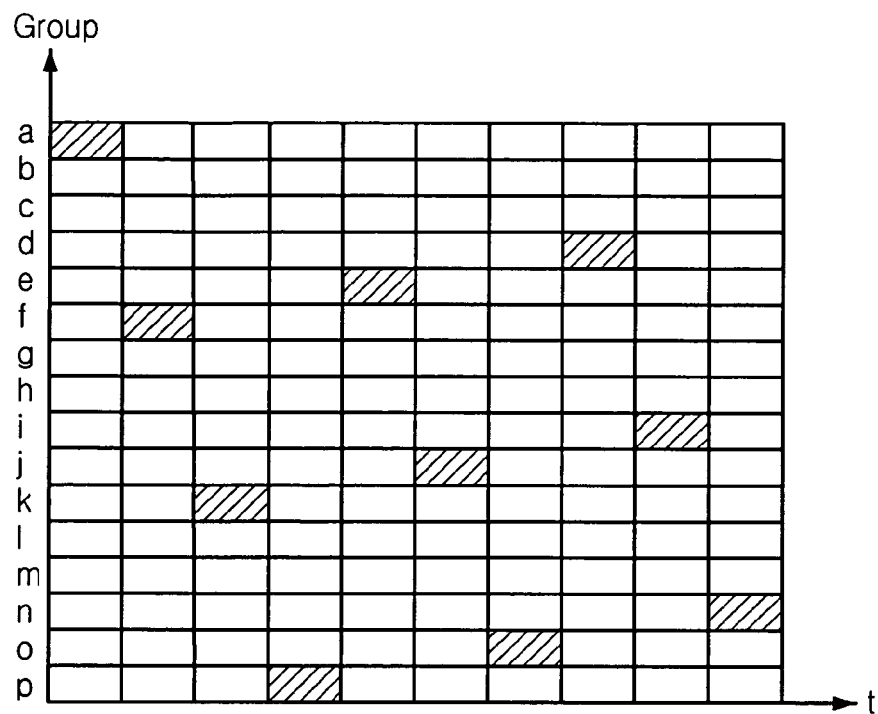
Figure 22F:
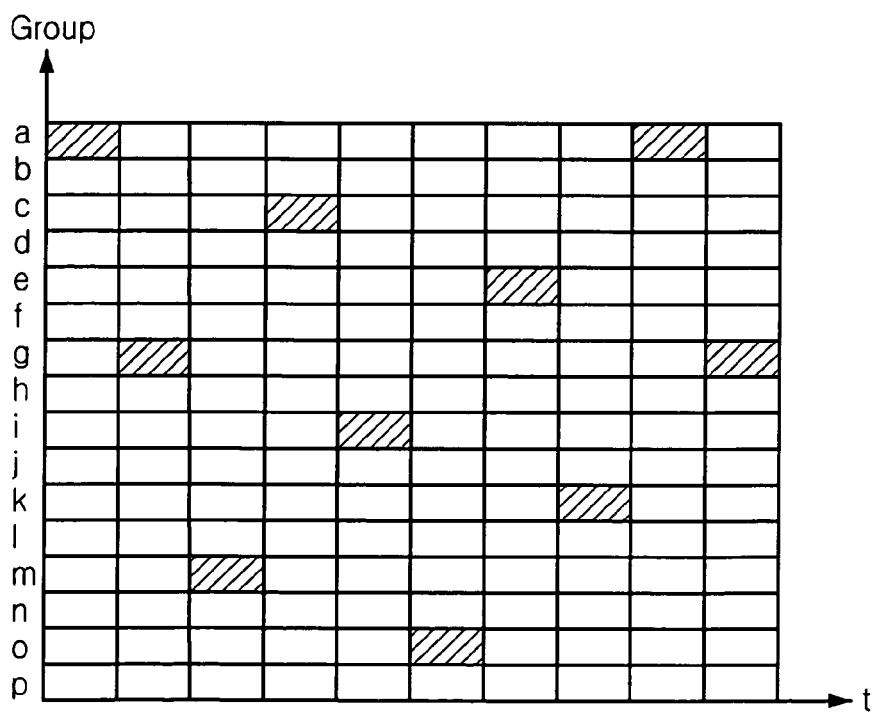
Figure 22G:
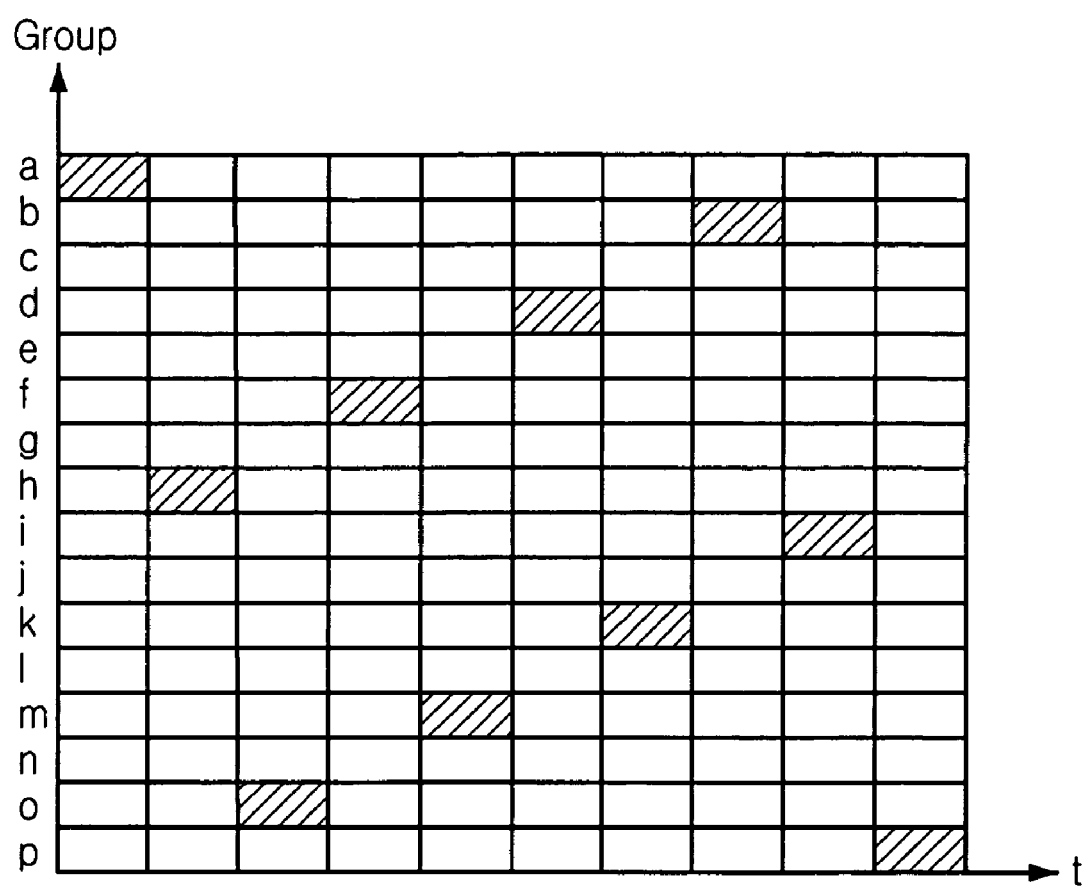

FIGS. 22C though 22G also show patterns of frequency hopping performed jumping over some sub-carrier groups. In short, different frequency hopping patterns are established for cells A to G, which are presented in FIGS. 22a to 22G, by making the direction of the frequency hopping the same and making the hopping space different.

Figure 23A:
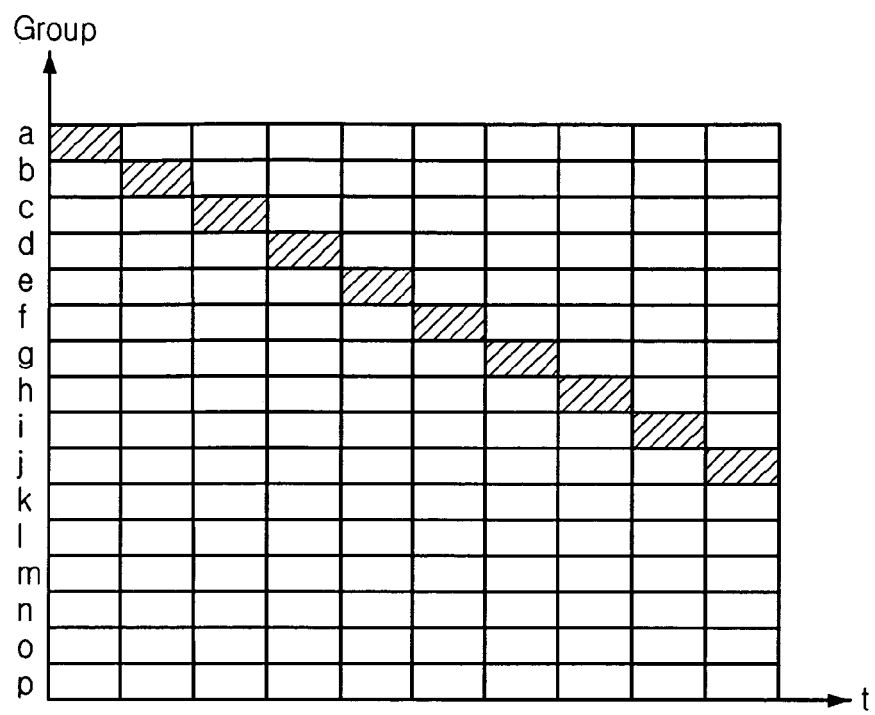
FIGS. 23A to 23G are diagrams describing an example of a hopping pattern for reducing inter-cell interference in accordance with an embodiment of the present invention.
Figure 23B:
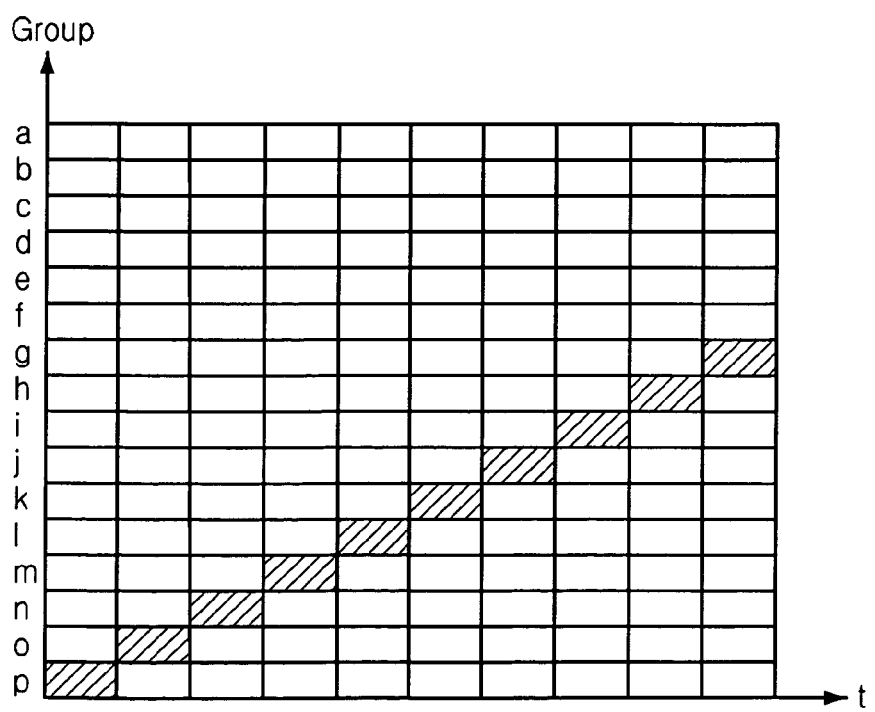
Figure 23C:
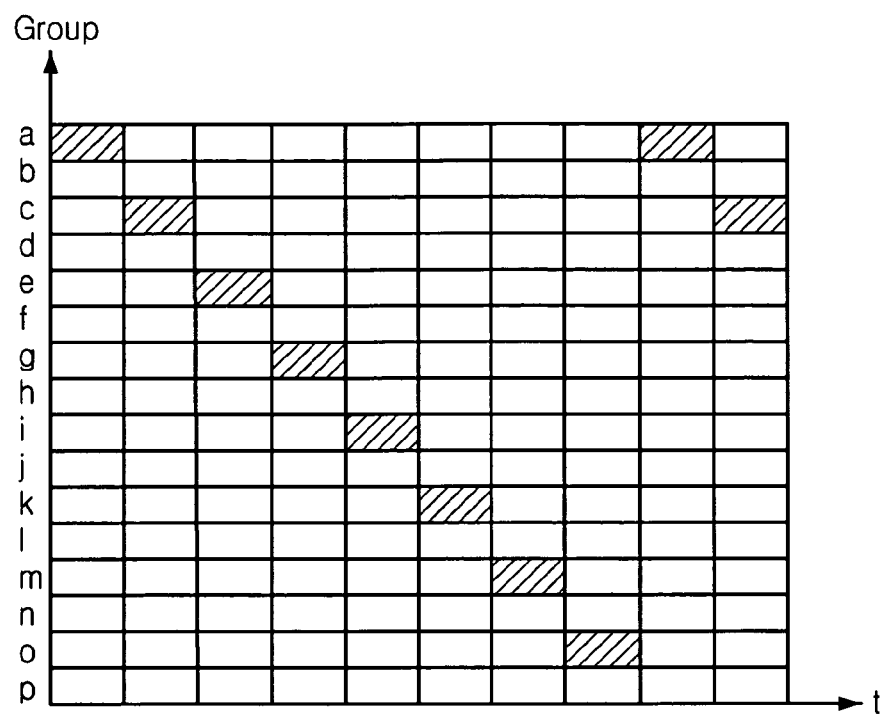
Figure 23D:
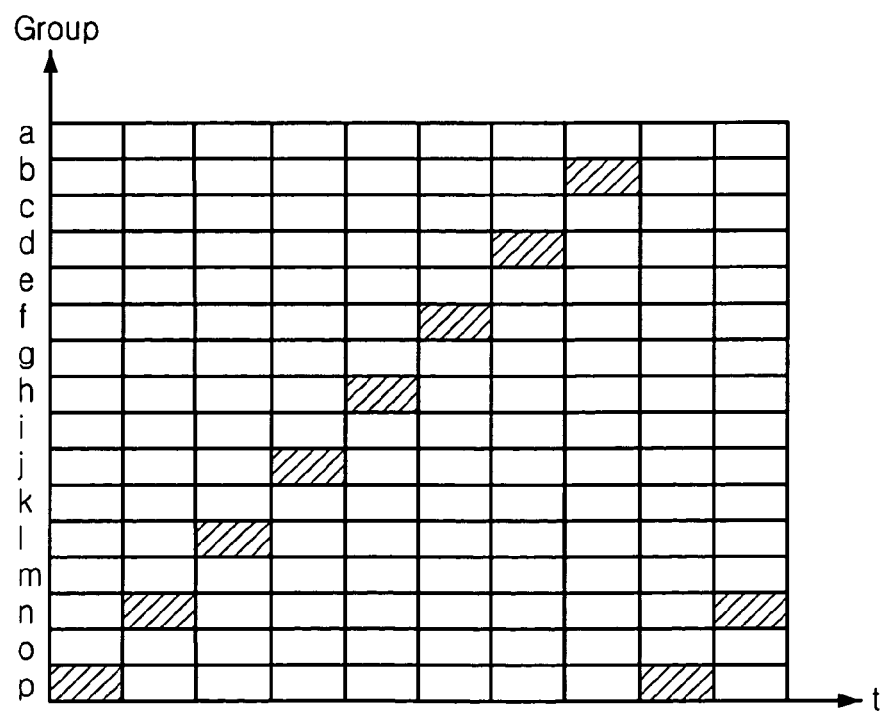
Figure 23E:
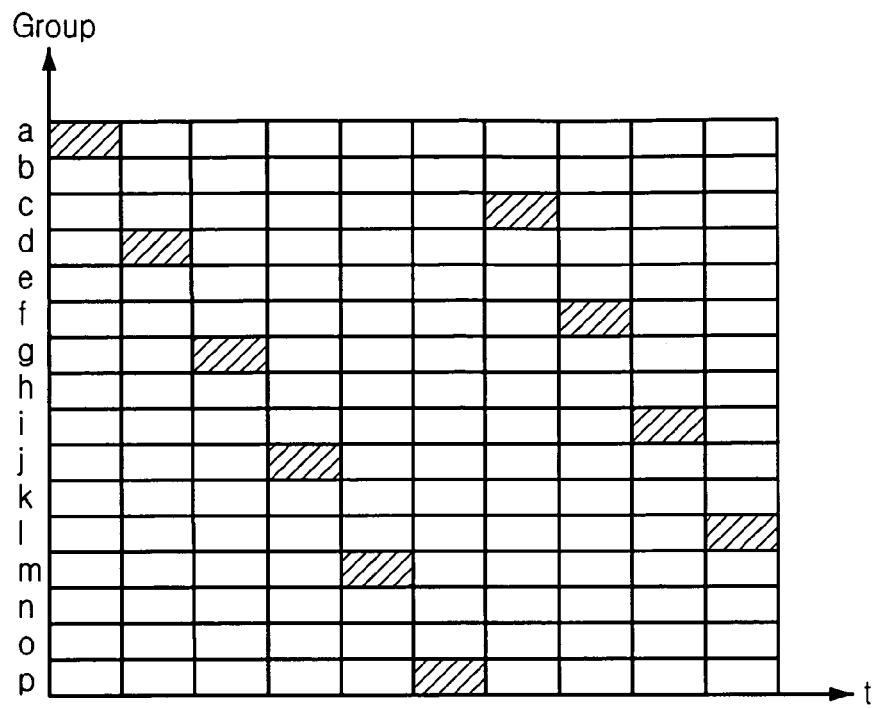
Figure 23F:
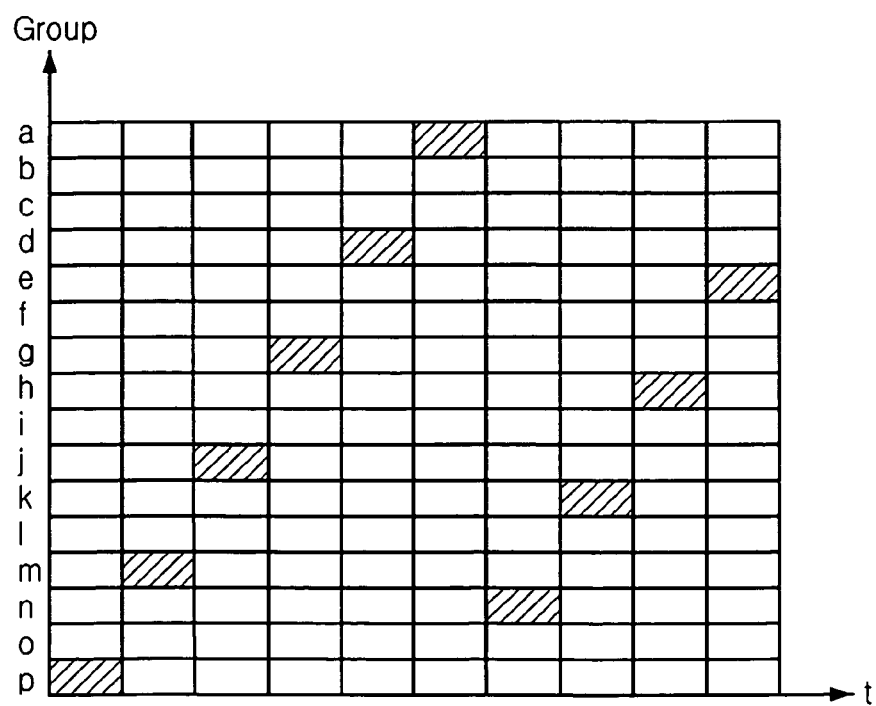
Figure 23G:
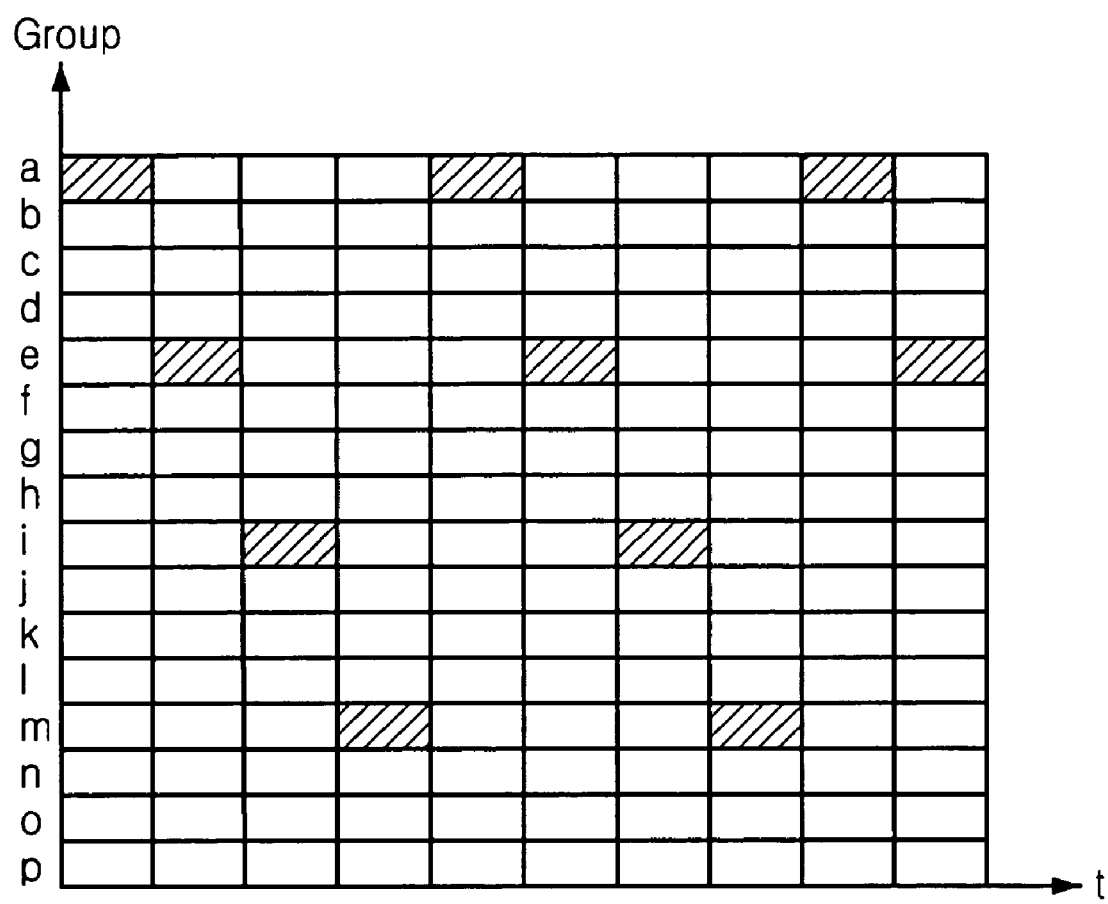

FIG. 23A shows a frequency hopping pattern established in the cell A and FIG. 23C shows a frequency hopping pattern established in the cell C. FIG. 23E shows a frequency hopping pattern established in the cell E and FIG. 23G shows a frequency hopping pattern established in the cell G. The frequency hopping patterns of FIGS. 23A, 23C, 23E and 23G are the same as those of FIGS. 22A, 22B, 22C and 22D, respectively.

Meanwhile, FIG. 23B presents a frequency hopping pattern of a cell B where the frequency hopping begins with the sub-carrier group p, which is in the lowest position, and is performed in the reverse direction. FIG. 23D presents a frequency hopping pattern of a cell D where the frequency hopping begins with the sub-carrier group p and is performed in the reverse direction, jumping over one adjacent sub-carrier group. That is, different frequency hopping patterns are generated by changing shifting spaces and directions and then allocated. If the frequency hopping patterns described above are used, the probability of using the same frequency in the cells can be minimized, thus reducing inter-cell interference.

For example, the frequency hopping pattern 1 of FIG. 22A and the frequency hopping pattern 2 of FIG. 22B are described herein. Here, it is assumed that there are only two cells A and B. Both frequency hopping patterns 1 and 2 have the same shifting direction according to time slots, but they are different in that the sub-carrier groups of the pattern 1 shift to their adjacent sub-carrier groups and the sub-carrier groups of the pattern 2 shift to the next adjacent sub-carrier groups after jumping over one sub-carrier group.

If the number of the entire sub-carrier groups is $N_g$ and the frequency hopping period is $N_h$, the number of sub-carrier groups that can be used for one frequency hopping period is $N_g \times N_h$. If each user is assumed to receive only one sub-carrier group, the number of users that can perform multiple access in one cell is $N_g$.

In the first time slot, a sub-carrier group positioned at the top of the y axis, which shows sub-carrier groups, is referred to as a group 0 and the sub-carrier groups that come below the group 0 is referred to as groups 1, 2, 3, . . . , $N_g$–1. In other words, the entire sub-carrier groups are defined as groups 0 to $N_g$–1. In the initial time slot, a user to which a group u is allocated is defined as a user u.

If there are $N_g$ users in the cell A using the frequency hopping pattern 1 and there is only one user whose sub-carrier group allocated in the first time slot is the group 0 in the cell B, the number of groups that act as interference on the cell A during one frequency hopping period is $N_h$. Since the cell A uses all sub-carrier groups, it is inevitable that the sub-carrier groups of the two cells are overlapped as many as the number of sub-carrier groups used in the cell B. The number of sub-carrier groups that act as interference on the users of the cell A is $N_g/N_h$ in average.

The number of groups acting as interference is an integer. Therefore, the number of groups acting as interference for each user of the cell A may be different based on the $N_g$ and $N_h$. In other words, the number of the groups overlapped between the user of the cell A and the one user of the cell B can be different according to the $N_g$ and $N_h$. For example, if the cell B adopts the frequency hopping pattern 2 and the sub-carrier group allocated to the user of the cell B in the initial slot is the group 0, the number of overlapped sub-carrier groups for the user u of the cell A is (i+1), when it satisfies the condition of Equation 7.

$$iN_g + u < N_h \leq (i+1)N_g + u \quad \text{Equation 7}$$
$$i = 0, 1, 2, \ldots$$
$$u = 0, 1, 2, \ldots, N_g - 1$$

The frequency hopping patterns of FIGS. 23A to 23G are described as follows. Here, it is assumed that the cell A uses the frequency hopping pattern 1 of FIG. 23A and the cell B uses the frequency hopping pattern 2 of FIG. 23B. Other conditions remain the same as the aforementioned examples.

The shifting directions of the frequency hopping patterns 1 and 2 along the time slots are different from each other. If the cell A has Ng users and the cell B has one user whose sub-carrier group allocated in the initial time slot is a group $N_g-1$, the number of groups acting as interference on the cell A by the user of the cell B during a period of frequency hopping is $N_h$. This result is the same as that of the aforementioned example. In short, the number of groups interfered by the cell B is the same, $N_h$, with respect to the users of the cell A. However, when it comes to each user of the cell A, the number of interfered groups is different from the result of the above example.

$$\frac{N_g+1}{2} + iN_g - m \leq N_h < \frac{N_g+1}{2} + (i+1)N_g - m \quad \text{Equation 8}$$
$$i = 0, 1, 2, \ldots$$

If the condition of Equation 8 is satisfied and $N_g$ is 2z+1, z being an integer, the user u of the cell A has (i+1) sub-carrier groups overlapped (u=2m, m=0,1,2, ..., $(N_g-1)/2$). If the condition of Equation 8 is satisfied and $N_g$ is 2z, the user u of the cell A has no sub-carrier group overlapped (u=2m, m=0, 1,2, ..., $N_g/2-1$).

$$N_g + iN_g - m \leq N_h < N_g + (i+1)N_g - m \quad \text{Equation 9}$$
$$i = 0, 1, 2, \ldots$$

If the condition of Equation 9 is satisfied and $N_g$ is 2z+1, the user u of the cell A has (i+1) sub-carrier group overlapped (u=2m+1, m=0,1,2, ..., $(N_g-3)/2$).

$$\frac{N_g}{2} + i\frac{N_g}{2} - m \leq N_h < \frac{N_g}{2} + (i+1)\frac{N_g}{2} - m \quad \text{Equation 10}$$
$$i = 0, 1, 2, \ldots$$

If the condition of Equation 10 is satisfied and $N_g$ is 2z, the user u of the cell A has (i+1) sub-carrier group overlapped (u=2m+1, m=0,1,2, ..., $N_g/2-1$).

It should be noted that the inner-cell and/or inter-cell frequency hopping patterns described with reference to FIGS. 22A to 22G and 23A to 23G need not be combined with other technological properties of the present invention necessarily. This is because the effect of frequency diversity and the effect of reduced FFT computation amount can be brought about with the technological properties of comb symbol allocation and frequency hopping of the present invention alone. Also, the inner-cell and/or inter-cell frequency hopping pattern shown in FIGS. 22A to 22G and 23A to 23G have an additional effect of minimizing inter-cell interference and preventing interference between mobile stations within a cell.

Figure 24:
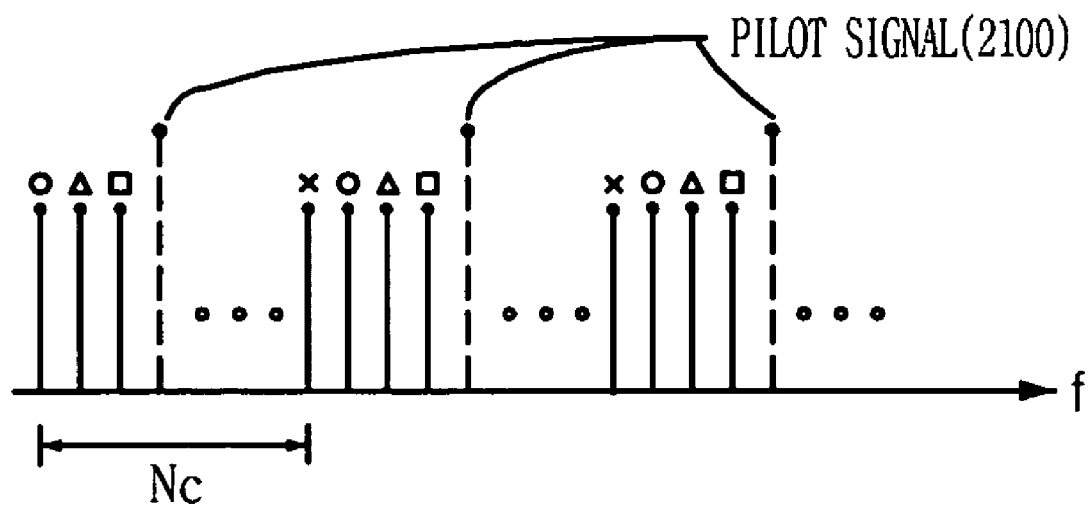
FIG. 24 is a diagram illustrating placement of pilot signals.

FIG. 24, which is a diagram illustrating arrangement of pilot signals, provides an example of pilot signal arrangement in an OFDM system for estimating a channel or a synchronization unit. In the detailed description of the present invention, pilot signals are defined as signals that are transmitted along with data signals among the signals for control, signals necessary for all users, and signals for estimating a channel.

Generally, the pilot signals 2100 are arranged at the same intervals over the entire frequency band. This is the same as the comb symbols defined in the present invention for data transmission. So, the method of the present invention can be applied directly.

To be more specific, the pilot signals 2100 are regarded as one comb symbol that is fixed and does not perform frequency hopping according to time slots. Then, channel information on the entire frequency band can be obtained with a small amount of computation by using only the sub-carriers corresponding to the pilot signals and performing partial FFT in the receiving system 230.

All mobile stations need the channel information to restore signals. According to the present invention, the channel information can be obtained with a least power consumption by performing partial FFT on the comb symbol corresponding to the pilot signals 2100 and the comb symbols allocated to mobile stations in all receiving system 230.

Since the pilot signals are required by all mobile stations, it is desirable to allocate the pilot signals to comb symbols that can be obtained by consuming a least amount of power.

Table 3 shows computation amounts needed for each comb symbol to obtain a comb symbol having a least amount of computation. In the table, the computation amounts of complex number summation and complex number multiplication required to each comb symbol are presented for comparison. Here, the number N of the entire sub-carriers is 2,048 and the number $N_c$ of symbols of a comb is 16 and the number $N_s$ of sub-carriers allocated to each comb symbol is 128. In Table 3, a, b, ..., p expressed as a comb are the sub-carrier groups a, b, ..., p stored in the output memory 61 of the FFT unit 233 of FIG. 7.

TABLE 3

| comb | Partial FFT(DIF) | | Partial FFT(DIT) | |
|---|---|---|---|---|
| | Summation of Complex Number | Multiplication of Complex Number | Summation of Complex Number | Multiplication of Complex Number |
| a | 2,816 | 258 | 2,816 | 258 |
| b | 2,816 | 384 | 2,816 | 384 |
| c | 2,816 | 512 | 2,816 | 448 |
| d | 2,816 | 638 | 2,816 | 448 |
| e | 2,816 | 768 | 2,816 | 576 |
| f | 2,816 | 894 | 2,816 | 576 |
| g | 2,816 | 1,022 | 2,816 | 576 |
| h | 2,816 | 1,148 | 2,816 | 576 |
| i | 2,816 | 1,280 | 2,816 | 832 |
| j | 2,816 | 1,406 | 2,816 | 832 |
| k | 2,816 | 1,534 | 2,816 | 832 |
| l | 2,816 | 1,660 | 2,816 | 832 |
| m | 2,816 | 1,790 | 2,816 | 832 |
| n | 2,816 | 1,916 | 2,816 | 832 |
| o | 2,816 | 2,044 | 2,816 | 832 |
| p | 2,816 | 2,170 | 2,816 | 832 |
| Total | 45,056 | 19,424 | 45,056 | 10,498 |
| Average | 2,816 | 1,214 | 2,816 | 656.1 |

From Table 3, it can be seen that the required number of complex number multiplication is increased as the comb symbol comes down. Therefore, the pilot signals should be allocated and perform frequency hopping sequentially according to a priority order from a comb symbol with the least number of complex number multiplication, that is, from a comb symbol including a sub-carrier stored in an address 0 of the output memory. Otherwise, the computation amount for obtaining channel information becomes the least in all mobile stations.

That is, the comb symbols should be allocated according to the required number of pilot signals, but the selection priority should be given to a comb symbol including a sub-carrier stored in the address 0 of the output memory, followed by a comb symbol including a sub-carrier stored in the address of the next smallest value.

For example, the priority is established in the order of a comb a, a comb b, . . . in FIG. 7. If there are a plurality of pilot signals to be allocated, the pilot signals are allocated according to the priority order determined in the above and transmitted to mobile stations.

Figure 25:
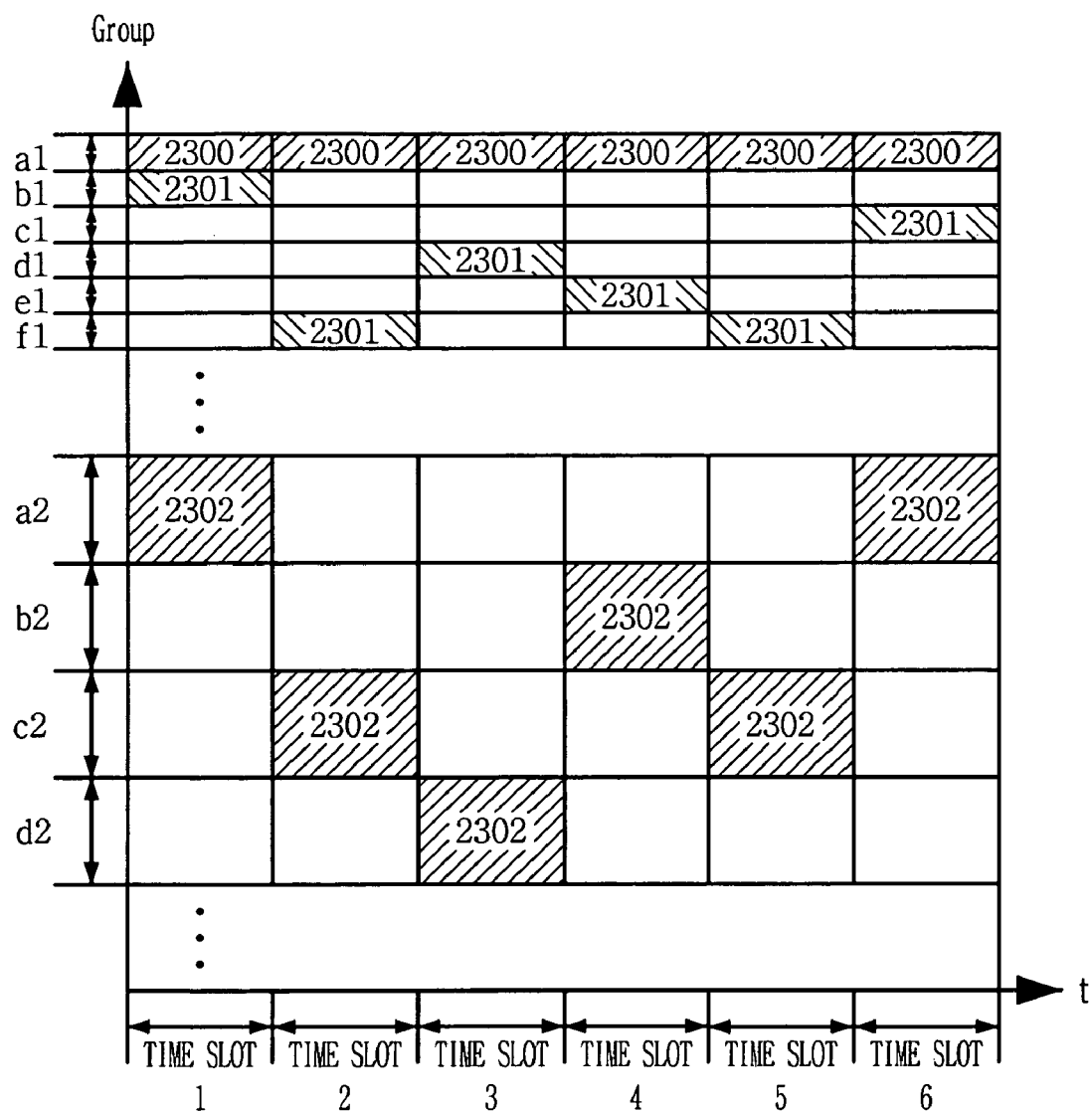
FIG. 25 is a diagram describing the frequency hopping of a sub-carrier group allocated for a pilot signal and that of a sub-carrier group allocated for a data signal in accordance with an embodiment of the present invention.

FIG. 25 is a diagram describing the frequency hopping of a sub-carrier group allocated for a pilot signal and that of a sub-carrier group allocated for a data signal in accordance with an embodiment of the present invention. It shows an example where a sub-carrier group a1 is allocated to a pilot signal 2300. The pilot signal 2300 does not perform frequency hopping according to time slots and are allocated to the sub-carrier group a1 all the time. On the other hand, data signals 2301 and 2302 perform frequency hopping along the time slots based on a given frequency hopping pattern.

All mobile stations perform partial FFT only on the pilot signals 2300 of the sub-carrier group a1 and the comb symbols allocated to them in the receiving system 230 to thereby obtain channel and synchronization information and transmitted data. Actually, the sub-carriers of the sub-carrier group are allocated in the form of comb symbols actually, and the frequency hopping of the sub-carrier group is frequency hopping to a comb symbol having a different frequency offset actually.

Described in the above is a technology of allocating to mobile stations comb symbols, which are sub-carrier groups dispersed at predetermined intervals over the entire frequency band and performing frequency hopping.

In accordance with the embodiment of the present invention, comb symbols are formed in a tree structure. The comb symbols, sub-carrier resources, are allocated dynamically. Hereinafter, a method for allocating the tree-structured sub-carrier resources to mobile stations will be described.

Figure 26:
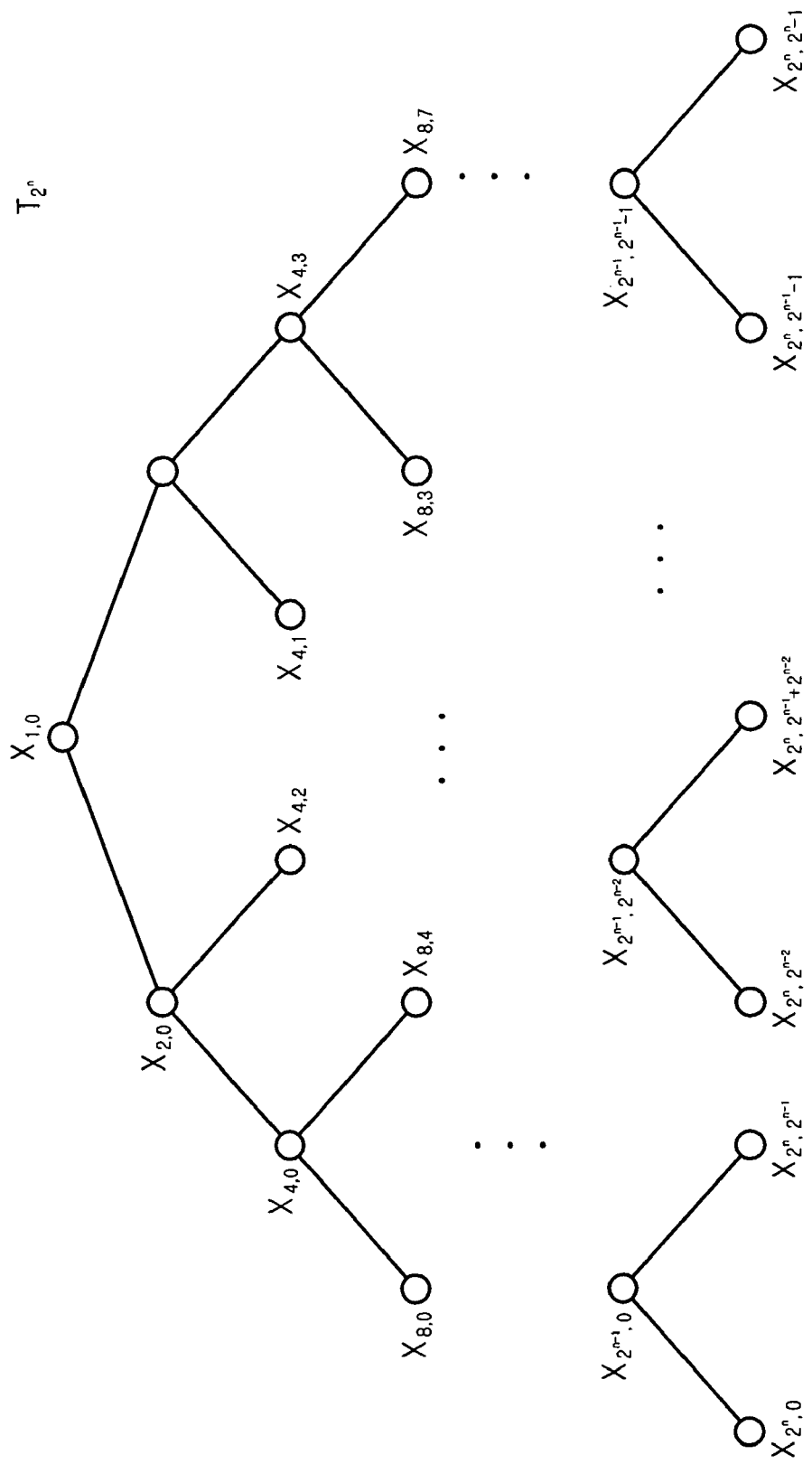
FIG. 26 is a diagram illustrating a method for allocating comb symbol resources by forming the symbols in a tree structure in accordance with an embodiment of the present invention.

FIG. 26 is a diagram illustrating a method for allocating comb symbol resources by forming the comb symbols in a tree structure in accordance with an embodiment of the present invention. In this embodiment, the number N of sub-carriers in the entire frequency band and the number Ns of sub-carriers constituting a comb symbol are powers of 2 and the comb symbols are formed in a tree structure. The comb symbol resources are allocated based on the tree structure in a cell as follows.

Referring to FIG. 26, if the number of the sub-carriers is $N=2^n$ in the entire frequency band, the comb symbols are formed in a tree structure where the numbers $N_s$ of the sub-carriers constituting the comb symbols are $1, 2, 4, \ldots, 2^n$. The comb symbols are expressed based on Equation 2. In case the frequency index k needs not be discriminated, it is omitted hereinafter.

In the tree structure of FIG. 26, a comb symbol $X_{1,0}$ at a root node is formed of $2^n$ sub-carriers. The root node comb symbol $X_{1,0}$ includes comb symbols $X_{2,0}$ and $X_{2,1}$, each of which is formed of $2^{n-1}$ sub-carriers.

A comb symbol $X_{2^a,b}$ which is formed of $2^{n-a}$ sub-carriers and has a frequency offset b includes comb symbols $X_{2^{a-1},b}$ and $X_{2^{a-1},b+2^a}$, each of which is formed of $2^{n-a-1}$ sub-carriers and the frequency offset is b and $b+2^a$, respectively.

FIG. 26 presents a tree structure $T_{2^a}$ which has comb symbols formed of $N_s$ sub-carriers ($N_s=1,2,4,\ldots,2^n$, n being an integer) as its nodes in an environment where the number of sub-carriers in the entire frequency band is $N=2^n$. For example, if there are two comb symbols $X_{a,b}$ and $X_{c,d}$ in a tree structure $T_{2^n}$ ($a \neq c$) and $X_{a,b}$ is a parent node of $X_{c,d}$, $X_{a,b}$ includes $X_{c,d}$. That is, if $X_{c,d}(k)=1$, it means $X_{a,b}(k)=1$.

However, if $X_{a,b}$ is not a parent node of $X_{c,d}$, $X_{a,b}$ and $X_{c,d}$ are orthogonal to each other. That is, if $X_{c,d}(k)=1$, it means $X_{a,b}(k)=0$, or if $X_{c,d}(k)=0$, it means $X_{a,b}(k)=1$. Therefore, comb symbols formed of Ns sub-carriers (Ns=1,2,4,\ldots,$2^n$, n being an integer) can be allocated to mobile stations without collision between frequencies in an environment where the number of sub-carriers in the entire frequency band is $N=2^n$ by forming a set $\{X_{1,0}, X_{2,0}, X_{2,1}, \ldots, X_{2^n,0}, \ldots, X_{2^n,2^n-1}\}$ of the entire comb symbols into a tree structure $T_{2^n}$, allocating the comb symbols according to data transmission rates required by the mobile stations, establishing the allocated comb symbols and the comb symbols of their child nodes as used ones and, if the allocation of the comb symbols are cancelled, establishing the corresponding comb symbols and the comb symbols of their child nodes as usable ones.

Meanwhile, the OFDMA system can use null carriers due to the implementation of filters in the transmitting end or receiving end. So, the number of sub-carriers that can carry actual data may not be a power of 2. In this case, the comb symbols are formed into the tree structure of FIG. 26 and allocated according to the tree and, also, the data are transmitted after shifted or punctured because the positions of the data corresponding to the null carriers can be know in advance.

Figure 27A:
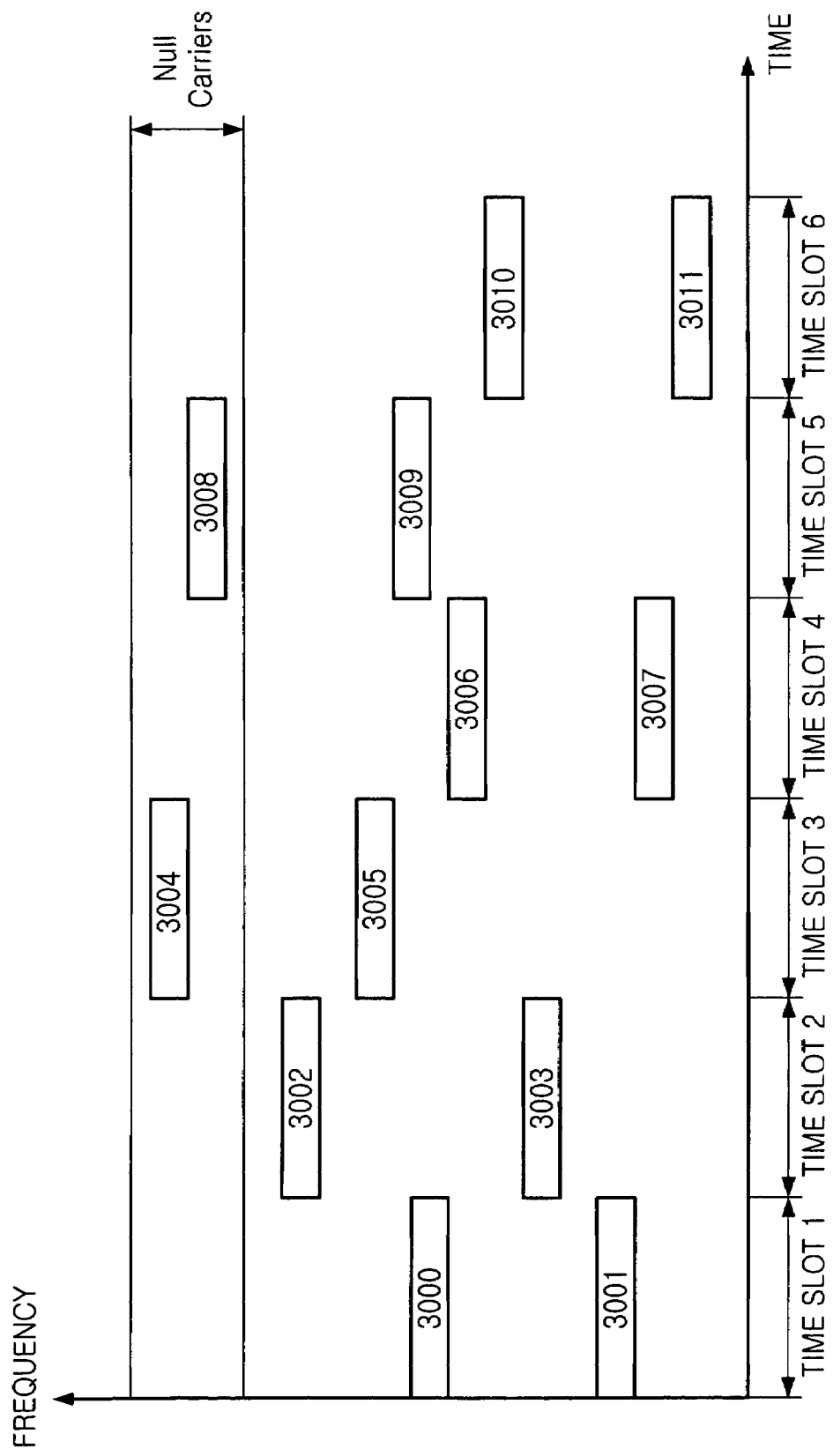
FIG. 27A is a diagram describing a data transmission method without loss in the data transmission rate by puncturing data corresponding to null carriers in accordance with an embodiment of the present invention.

FIG. 27A is a diagram describing a data transmission method without loss in the data transmission rate by puncturing data corresponding to null carriers in accordance with an embodiment of the present invention. In the drawing, data are transmitted after null data are inserted to the data at positions corresponding to the null carriers. In FIG. 27A, the comb symbols are formed into a tree structure when the number N of the entire sub-carriers is an arbitrary integer and the number Ns of sub-carriers constituting a comb symbol is not a power of 2, and the comb symbols are allocated according to the tree structure in a cell.

FIG. 27A shows an example where comb symbols, each having two sub-carriers, are allocated and perform frequency hopping. The reference numerals 3000 through 3011 are data to be transmitted. The data 3004 and 3008 correspond to null carriers. So, they are punctured and not transmitted actually. Since the data are punctured and transmitted, the data transmission rate is the same as a case where no null carrier exists. The punctured data can be restored during the decoding of an error correction code in the receiving end.

Figure 27B:
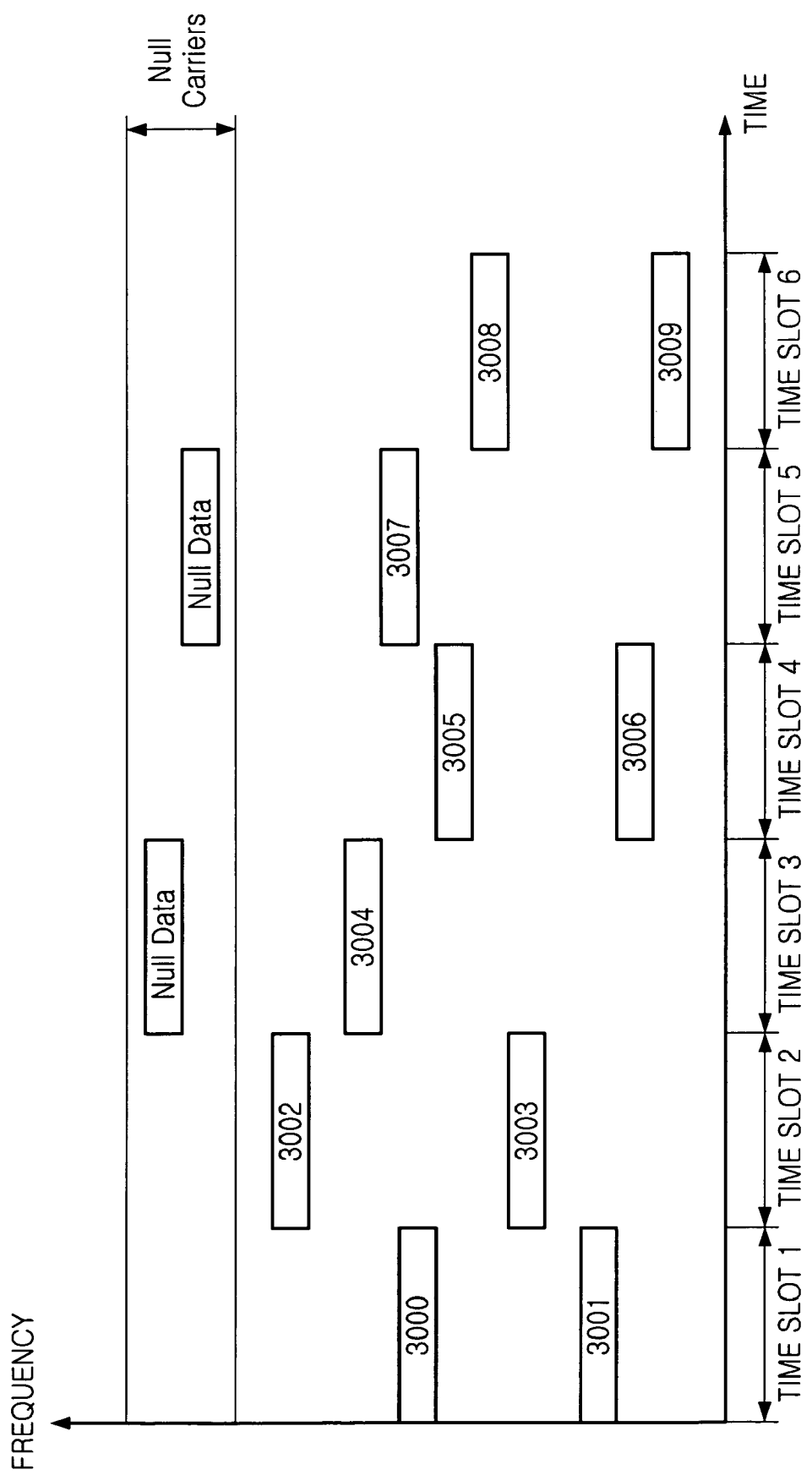
FIG. 27B is a diagram depicting a data transmission method without data loss by shifting data corresponding to null carriers in accordance with an embodiment of the present invention.

FIG. 27B is a diagram depicting a data transmission method without data loss by shifting data corresponding to null carriers in accordance with an embodiment of the present invention. In the drawing, data are transmitted after null data are inserted to the data at positions corresponding to the null carriers. In FIG. 27B, the comb symbols are formed into a tree structure when the number N of the entire sub-carriers is an arbitrary integer and the number Ns of sub-carriers constituting a comb symbol is a power of 2, and the comb symbols are allocated according to the tree structure in a cell.

FIG. 27B shows an example where comb symbols, each having two sub-carriers, are allocated and perform frequency hopping. The reference numerals 3000 through 3009 are data to be transmitted. Since the initial position and hopping pattern of the comb symbols are known in the transmitting end, null data are inserted to null carriers and the data corresponding to the null carriers are shifted and moved to sub-carriers for carrying the next data and transmitted. The present invention also includes combinations of the methods illustrated in FIGS. 27A and 27B.

Figure 28A:
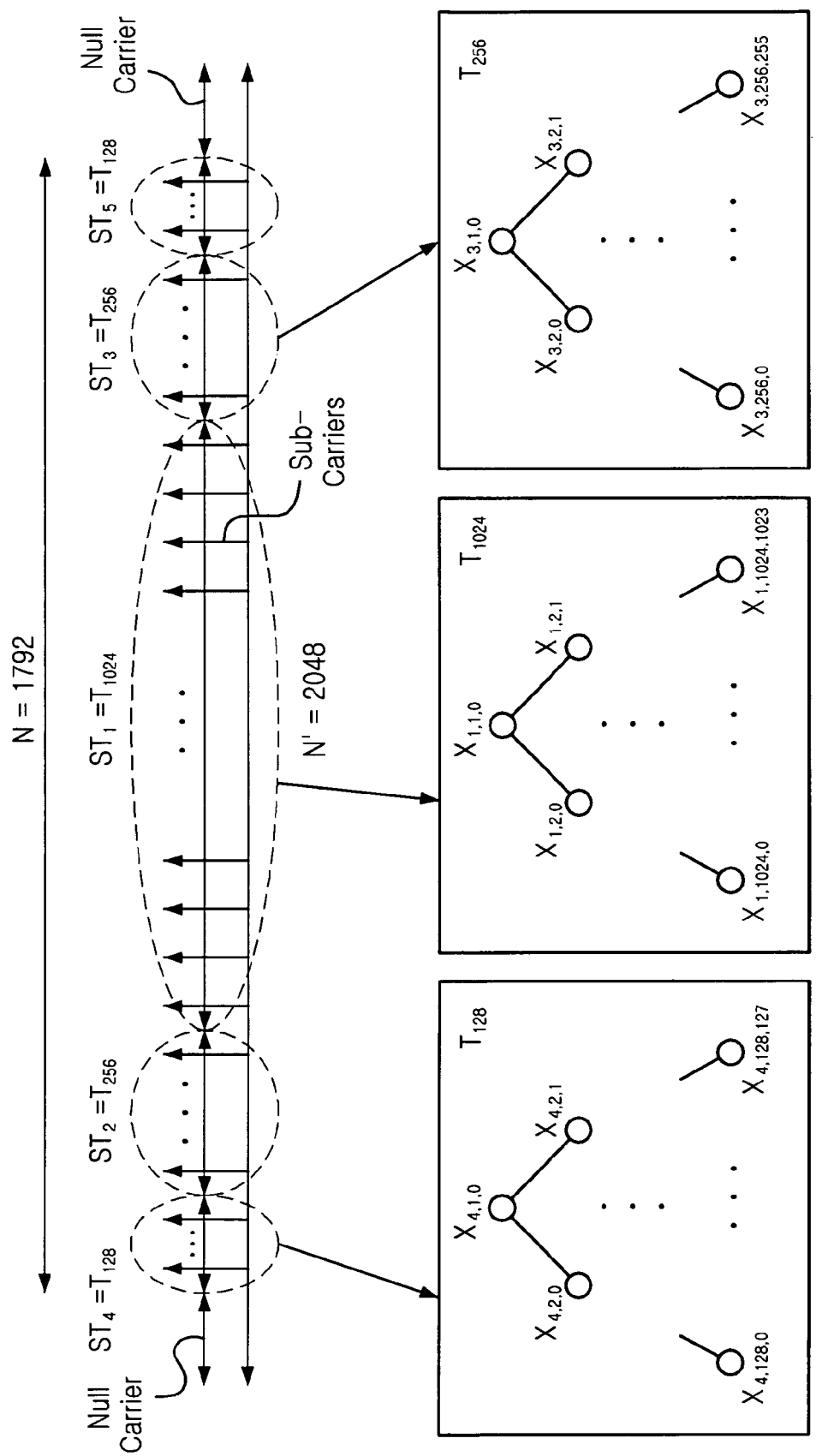
FIGS. 28A and 28B are diagrams illustrating a method for allocating comb symbol resources by forming the symbols in a multi-tree structure in accordance with an embodiment of the present invention.
Figure 28B:
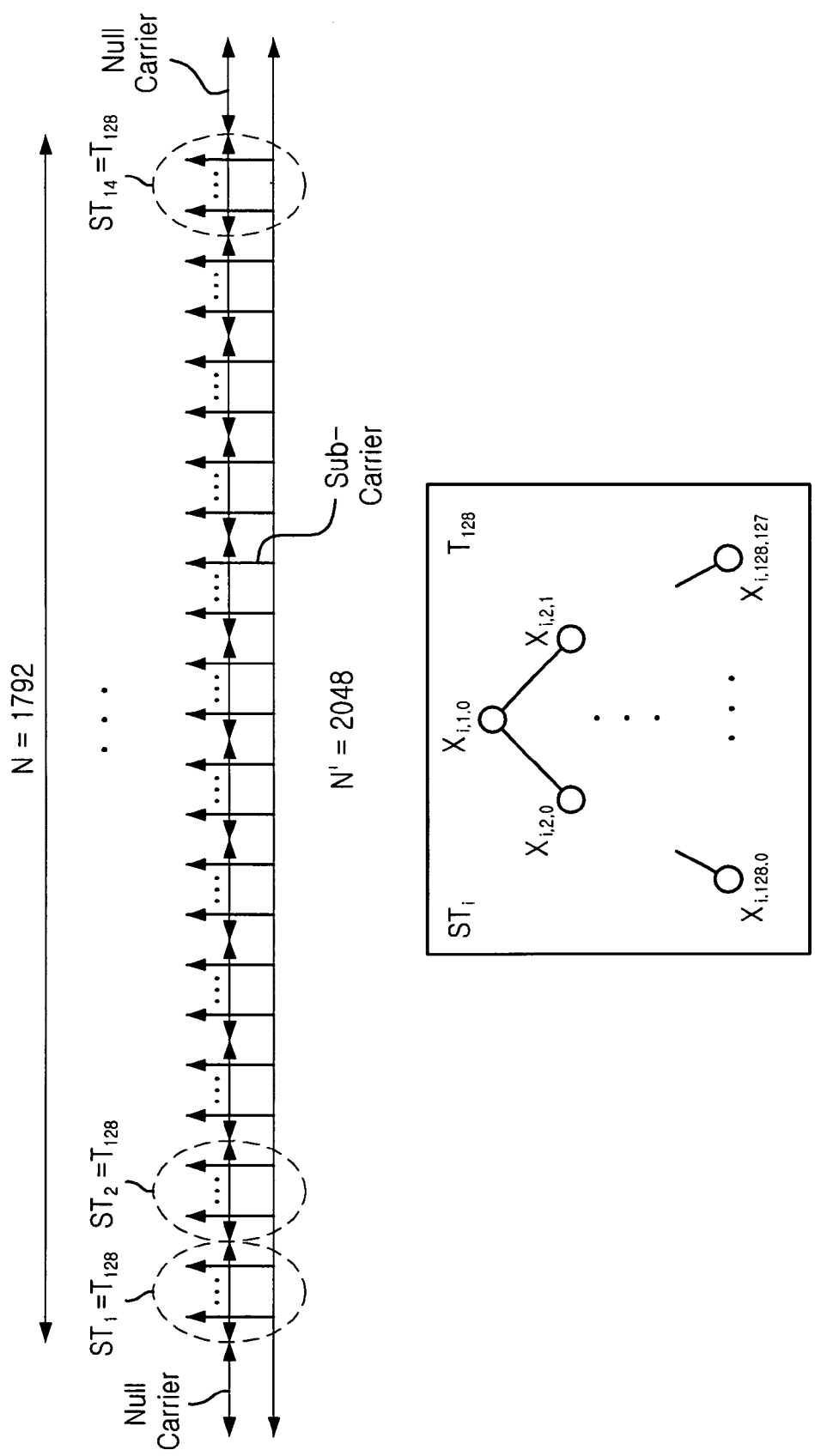

FIGS. 28A and 28B are diagrams illustrating a method for allocating symbol resources of a comb pattern by forming the symbols in a multi-tree structure in accordance with an embodiment of the present invention. In the embodiments of FIGS. 28A and 28B, comb symbols are formed in a multiple-tree structure and allocated according to the multiple-tree in a cell, when the N'-point FFT is used and the number N of the sub-carriers in the entire frequency band is not a power of 2.

If the number N of sub-carriers in the frequency band is $2^{n-1} < N < 2^n$, it means $$N = \sum_{i=0}^{n} a_i 2^i$$

($a_i$, i=0, ... ,n), $a_i$,i being an integer that is not negative. In this case, a multiple tree can be formed $$\sum_{i=0}^{n} a_i^1$$

respect to the number N of sub-carriers by forming trees $T_{2^i}$ with respect to i=0, ... ,n.

FIG. 28A is an exemplary diagram showing a multiple tree formed of five sub-trees, $ST_1=T_{1024}, ST_2=ST_3=T_{256}, ST_4=ST_5=T_{128}$ ($2^7=128, 2^8=256, 2^{10}=1024$), when N' is 2048 and N is 1792 (N'=2048 and N=1792) and $a_{10}=1, a_8=2, a_7=2$ (the remainder $a_i=0$).

FIG. 28B is an exemplary diagram showing a multiple tree formed of 14 sub-trees, $ST_i=T_{128}$, (i=1, ... ,14) ($2^7=128$), when N' is 2048 and N is 1792 (N'=2048 and N=1792) and $a_7=14$ (the remainder $a_i=0$).

In order to discriminate the comb symbols corresponding to the nodes of different sub-trees, Equation 2 is re-defined as Equation 11:

$$X_{st,N_c,q}(k) \begin{cases} \neq 0, & k = pN_c + q + K_{st} \\ = 0, & \text{Others} \end{cases} \quad \text{Equation 11}$$

wherein st denotes a sub-tree index;

$K_{st}$ denotes a beginning frequency index of a sub-tree;

p=0,1, ... ,$(N_{st}/N_c)-1$, $N_{st}$ being the number of sub-carriers in a sub-tree; and q=0,1, ... ,$N_c-1$.

Apparently, FIGS. 28A and 28B and Equation 11 show that the comb symbols of different sub-tree nodes are orthogonal to each other. Therefore, comb symbols formed of many sub-carriers can be allocated to mobile stations without frequency collision by applying the method of FIG. 26 to each sub-tree and allocating frequency resources.

Also, if $$\sum_{i=0}^{n} a_i$$

is a large value, the number N of the sub-carriers int he entire frequency band is defined by $$N \approx \sum_{i=0}^{n} b_i 2$$

to reduce the number of sub-trees. That is, $$\sum_{i=0}^{n} a_i$$

is established small. The data corresponding to null carriers can be transmitted after punctured and shifted using the methods of FIGS. 27A and 27B.

Meanwhile, in order to make it possible to perform adaptive modulation at each frequency band, the entire frequency band including N sub-carriers is divided into M sub-bands formed of consecutive sub-carriers. Then, N/M-point FFT is used in each sub-band to reduce the computation amount of the mobile stations and/or base stations.

In this case, the FFT computation amount of the mobile stations can be reduced by forming the sub-carriers of each sub-band into a tree structure of comb symbols, extending the tree structure to form a multiple-tree including the sub-trees on the entire frequency band, and allocating the sub-carriers in one or more sub-bands to the mobile stations during the comb symbol allocating process.

Figure 28C:
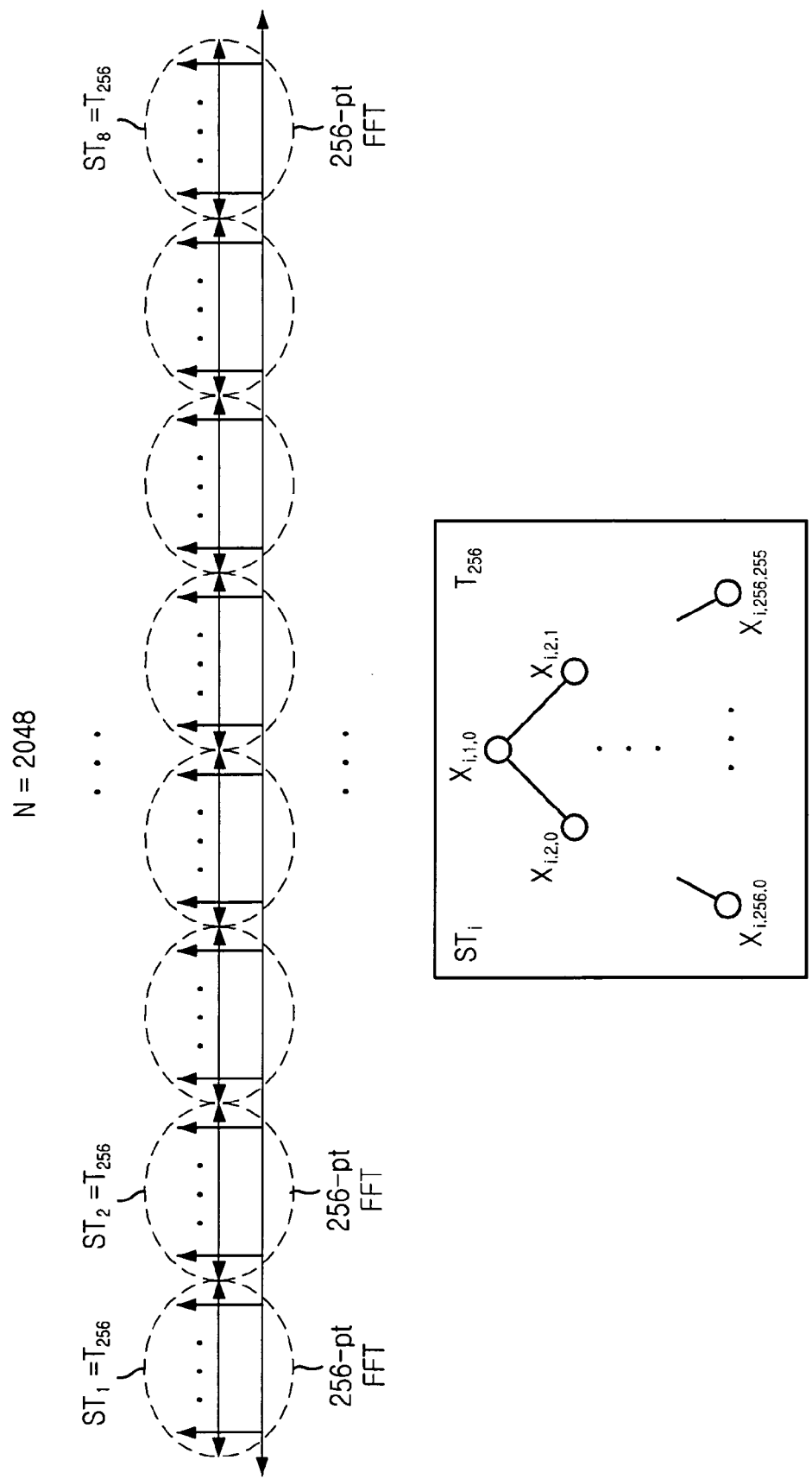
FIG. 28C is an exemplary multi-tree diagram which includes eight sub-trees of $ST_i=T_{256}$ (i=1, ..., 8) when each sub-band uses 256 (=2048/8)–FFT, N and M being 2048 and 8, respectively (N=2048, M=8)

FIG. 28C is an exemplary multi-tree diagram which includes eight sub-trees of $ST_i=T_{256}$ (i=1, ... ,8) when each sub-band uses 256 (=2048/8)–FFT, when N is 2048 and M is 8 (N=2048 and M=8). If there are null carriers, the methods of FIGS. 27A, 27B, 28A and 28B can be used.

As described above, sub-carriers of arbitrary sizes in one or more sub-bands are allocated to mobile stations during the comb symbol allocation process by dividing N sub-carriers in the entire frequency band into M sub-bands and building a multiple tree including comb symbol sub-trees, each sub-tree formed with respect to each sub-band, in the entire frequency band. The allocated sub-carriers perform frequency hopping on a sub-band basis. This way, adaptive modulation can be performed based on each frequency band. Since FFT computation is operated with respect to the number N/M of sub-carriers of each sub-band, the amount of computation can be reduced.

Meanwhile, if Nr sub-carriers are allocated to the mobile stations according to the requested data transmission rate of the mobile stations (Nr≠$2^n$, Nr being a positive integer and the number of sub-carriers, Nr, may be defined as $$N_r = \sum_{i}^{n} c_i 2^i$$

($c_i, c_i = 0$ or $1 f = 0, \ldots, n$).

So, in case that $c_i=1$, $f=0, \ldots, n$, $$\sum_{i=0}^{n} c_i$$

comb symbols $X_{2^{n-i}, d_i}$ are formed and comb symbols, each having Nr sub-carriers, can be allocated to the mobile stations.

As described in FIGS. 28A to 28C, even when the entire sub-carriers are formed in a multiple-tree structure, comb symbols each having Nr sub-carriers are allocated to the mobile stations. Also, in order to acquire frequency diversity, i ($c_i=1$, i=O , . . . ,n) can be picked up from all sub-trees. Moreover, to minimize the partial FFT computation amount at the receiving end, if possible, comb symbols $X_{st_1, Nc_1, q_1}, \ldots, X_{st_m, Nc_m, q_m}$ extracted from a plurality of sub-trees are allocated to have the same frequency interval while maintaining $N_{c_i}$ at a fixed value. Preferentially, comb symbols that are extracted from two adjacent sub-trees and whose interval between the frequencies at both ends is the same as the interval between the two comb symbols are allocated.

Figure 29:
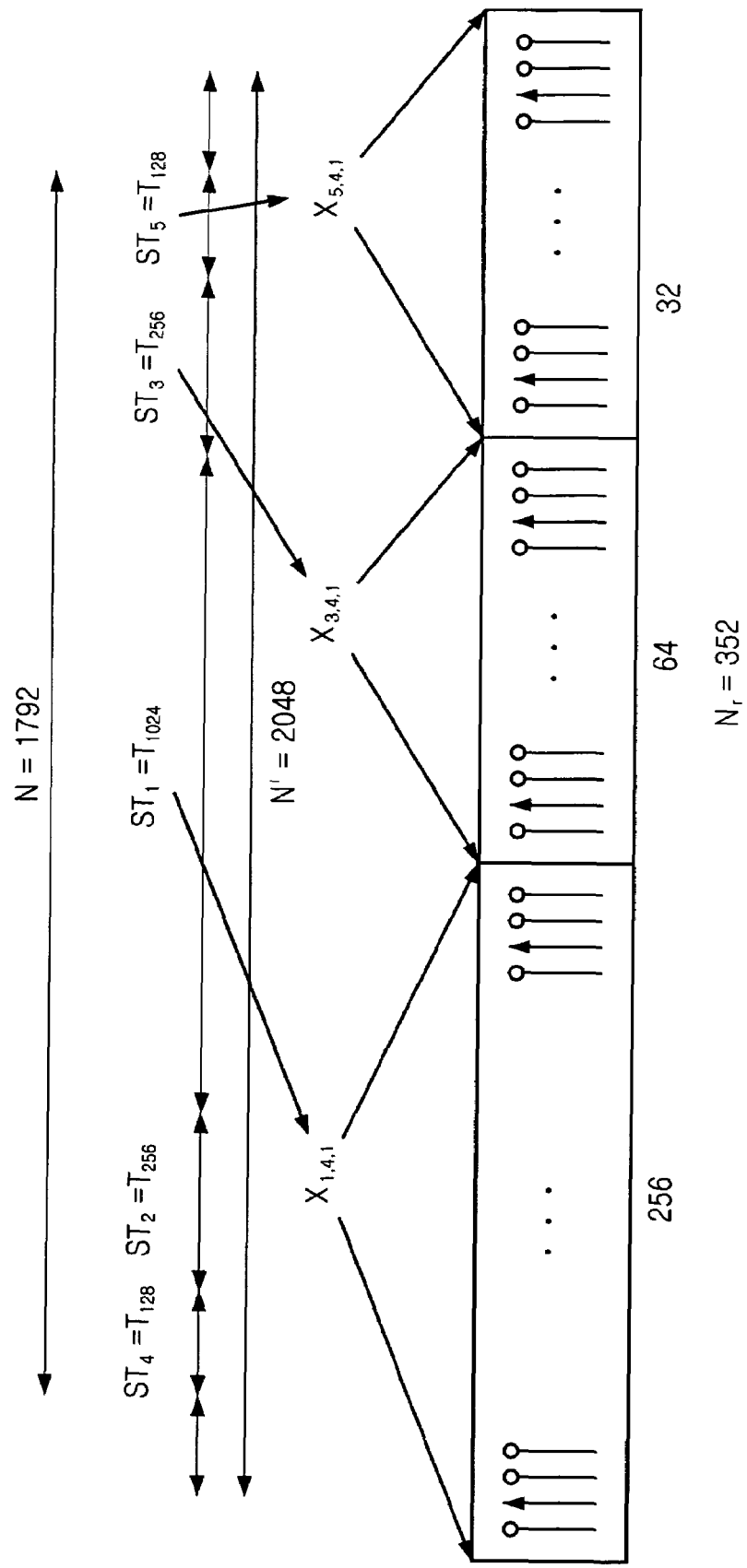
FIG. 29 is an exemplary diagram showing 352 sub-carriers allocated to one mobile station in the multi-tree structure of FIG. 28A.

FIG. 29 is an exemplary diagram showing 352 sub-carriers allocated to one mobile station in the multi-tree structure of FIG. 28A. 352 is a summation of 256, 64 and 32 (352=256+64+32). The sub-trees are allocated to a sub-tree 1, a sub-tree 3, and a sub-tree 5. Then, the comb symbols having the same frequency interval are allocated to thereby minimize the amount of partial FFT computation.

Figure 30:
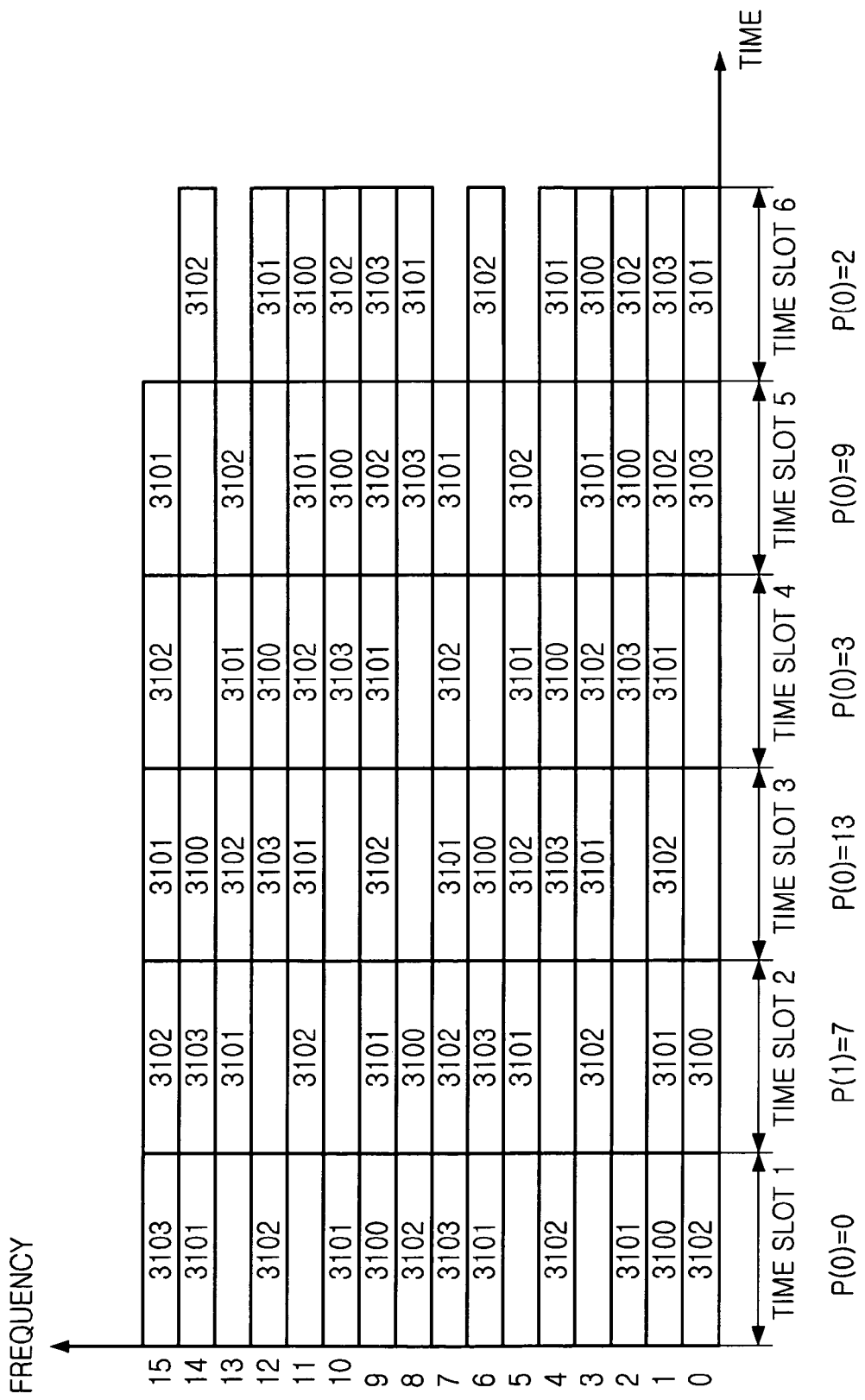
FIG. 30 is a diagram describing a frequency hopping method where all comb symbols of a cell perform frequency hopping in the frequency domain according to a frequency hopping pattern to thereby avoid collision between the symbols having a different size.

FIG. 30 is a diagram describing a frequency hopping method where all comb symbols of a cell perform frequency hopping in the frequency domain according to a frequency hopping pattern to thereby avoid collision between the symbols having different size. It explains a method of performing orthogonal frequency hopping on the comb symbols allocated to the mobile stations of a cell in the frequency area through the methods of FIGS. 26, 28A, 28B and 28C.

In case that comb symbols allocated to the mobile stations in a cell are grouped according to their size, the amount of partial FFT computation at the receiving end can be minimized by using the methods of FIGS. 15 and 20. However, the requests of orthogonal frequency hopping and minimization of partial FFT computation amount can be satisfied, if the frequency hopping is not performed among the sub-carrier groups having the same size as a sub-carrier group constituting a comb symbol of arbitrary size allocated to a mobile station.

Among comb symbols of various sizes that are allocated to the mobile stations within a cell in the methods of FIGS. 26 and 29 and satisfy the orthogonality, a frequency indicator function $Y_{a,b}(k;l)$ of an arbitrary comb symbol $X_{a,b}(k)$ that indicates a frequency hopping pattern in time slot 1 is defined as follows:

$$Y_{a,b}(k;l) = X_{a,b}((k+P(l) \bmod N)) \quad \text{Equation 12}$$

wherein $P(l)$ ($0 \leq P(l) \leq N$) is a frequency hopping pattern of a comb symbol of the cell in time slot 1; and N denotes the number of the entire sub-carriers.

Data are transmitted and frequency hopping is performed based on Equation 12, $Y_{a,b}(k;l)$. In the example of FIG. 30, the number of the entire sub-carriers is 16 and a comb symbol $X_{8,1}$ is allocated to 3100; $X_{4,2}$ to 3101; $X_{4,0}$, 3102; and $X_{8,7}$, 3103, according to the method of FIG. 26. It shows a frequency hopping pattern $P(l)=0,7,13,3,9,2, \ldots$, of the comb symbols according to time based on Equation 12.

As shown in FIG. 29 and Equation 12, all the comb symbols allocated in a cell perform frequency hopping according to a pattern in the frequency domain. So, if the comb symbols allocated during initial period are orthogonal, all the comb symbols allocated in the cell are always orthogonal regardless of the frequency hopping pattern.

Since $Y_{a,b}(k;l)$ can be expressed in the form of $X_{a,b}(k)$ the amount of partial FFT computation can be minimized at the receiving end regardless of the frequency hopping pattern.

As described in FIGS. 22 and 23, inter-cell interference can be leveled by allocating a different frequency hopping pattern in a different cell.

The method of the present invention can be materialized in the form of a program and stored in a computer-readable recording medium, such as CD-ROMs, RAMs, ROMs, floppy disks, hard disks and magneto-optical disks.

According to conventional FH-OFDMA, frequency hopping is performed in the frequency domain on a cluster basis. Clusters are obtained by organizing sub-carriers into groups based on proximity. However, the method of the present invention can increase frequency diversity and enhance inter-ference leveling effect during transmission of short packets by performing frequency hopping on comb symbols in the frequency domain. The comb symbols are formed of sub-carriers that are apart at predetermined frequency intervals over the entire frequency band.

The use of different frequency hopping pattern makes a comb symbol hop into a different sub-carrier always. The present invention has another advantage that it can minimize power consumption by restoring only a part corresponding to a comb symbol allocated to each mobile station through partial FFT. The power consumption can be minimized by performing IFFT with the same computation amount as the partial FFT by not computing when butterfly inputs are all zero in the transmitting system of a mobile station or a base station.

In accordance with the present invention, frequency hopping is performed as comb symbols for carrying data are selected differently according to each time slot. The frequency hopping patterns includes a pattern having a regular rule, for example, a pattern where sub-carriers are shifted to adjacent sub-carriers based on the time slots, and a pattern where frequency hopping is performed randomly.

All the mobile stations of a cell prevent inter-cell interference by not overlapping the frequency hopping in each time slot. If each mobile station has a different transmission rate due to a different service type, the size of a comb symbol is defined differently in proportion to the transmission rate. For addition of comb symbols, additional comb symbols are formed by grouping sub-carriers into adjacent ones. Through the process, the amount of partial FFT can be minimized.

Also, when comb symbols are allocated additionally, the amount of partial FFT computation can be minimized by performing frequency hopping on a sub-carrier group basis. Even when sub-carrier groups are allocated additionally, the amount of FFT computation can be reduced by performing frequency hopping based on an existing sub-carrier group. The frequency diversity effect can be enhanced. During the process, the frequency diversity effect can be enhanced by changing the interval between the allocated sub-carriers.

Meanwhile, the interference between neighboring cells is leveled without extra frequency allocation by unifying the frequency hopping pattern of all comb symbols allocated within a cell and differentiating the frequency hopping pattern between cells. Here, it is possible to maintain one shifting direction of the sub-carrier groups and make the shifting intervals different along the time slots by using a method making different frequency hopping patterns, or it is possible to differentiate the shifting interval of the sub-carrier groups and change the shifting direction. This way, the probability that the same frequency is used between adjacent cells can be minimized and, thus, the inter-cell interference can be reduced.

Pilot signals for estimating a channel or synchronization unit, also, are given in the form of a comb symbol. So, it is possible to acquire information on the entire frequency band with a small computation amount by performing partial FFT in the receiving system. The comb symbol allocating a pilot signal gives a priority to a top sub-carrier group that can perform restoration with the least amount of computation among all available sub-carrier groups and does not perform frequency hopping. Then, all the mobile stations can acquire channel information with the least amount of computation. If the frequency hopping is performed on the pilot signal, the effect of frequency diversity can be obtained and more accurate channel information can be acquired.

Meanwhile, if mobile stations of a cell require diverse transmission rates during the allocation of comb symbols, the comb symbols having orthogonality and suitable for diverse data transmission rate are formed into a tree structure or a multiple tree structure and allocated dynamically.

Also, for adaptive modulation in each frequency band, the entire frequency bands formed of N sub-carriers are divided into sub-bands, each formed of M consecutive sub-carriers. The sub-carriers in each sub-band are formed into a tree structure of comb symbols and a multiple tree including such a sub-tree as a sub-tree is formed on a basis of the entire frequency band. In the allocation of the comb symbols, the FFT computation amount can be reduced by allocating sub-carriers of arbitrary size in one or more sub-bands to mobile stations and using N/M-point FFT in each sub-band. Adaptive modulation can be performed in each frequency band by performing the frequency hopping on a sub-band basis.

While the present invention has been described with respect to certain preferred embodiments, it will be apparent to those skilled in the art that various changes and modifications may be made without departing from the scope of the invention as defined in the following claims.

What is claimed is:

1. method for performing frequency hopping Orthogonal Frequency Division Multiple Accesses (OFDMA), comprising the steps of:
    a) allocating frequency domain signals X(k) of a comb pattern to a modulated data sequence, X(k) being comb symbols and k being a frequency index;
    b) performing frequency hopping so that the comb symbols could have an independent frequency offset; and
    c) performing inverse Fast Fourier Transform (iFFT) on the comb symbols to be transformed to time domain signals x(n) and transmitting, using a transmitter, the time domain signals x(n), n being a time index,
    wherein the comb symbols formed of a predetermined number of sub-carriers, which is called a sub-carrier group, are positioned on an entire usable frequency band at predetermined intervals and the number of subcarriers on the entire usable frequency is expressed as:

$$N = \sum_{i}^{N_C} N_{si} = N_C * N_S, \ (N_{si} = N_s = \text{Const.})$$

where $N_C$ denotes the number of comb symbols that can be allocated in the entire usable frequency band;
$N_{si}$ denotes the number of sub-carriers within an $i^{th}$ comb symbol, the size of the $i^{th}$ comb symbol, or the size of a sub-carrier group constituting the $i^{th}$ comb symbol, and $$X_{N_C,i,q}(k) = \begin{cases} \neq 0, & k = p_i N_C + q_i \\ = 0, & \text{Otherwise} \end{cases}$$

$$\begin{cases} p_i = 0, 1, \ldots, N_{si} - 1 \\ q_i = 0, 1, \ldots, N_C - 1 \end{cases} ; \text{ and}$$

wherein, in the step b), frequency hopping is performed on comb symbols $X_{a,b}(k)$ allocated to the mobile station in the cell according to a frequency indicator function $Y_{a,b}(k;l)$, which is a frequency hopping pattern and expressed as:

$$Y_{a,b}(k;l) = X_{a,b}((k+P(l)) \bmod N)$$

where $P(l)$ ($0 \leq P(l) \leq N$) is a frequency hopping pattern of comb symbols within a cell in a time slot l; and
N denotes the entire number of sub-carriers.

2. The method as recited in claim 1, wherein if there are N sub-carriers and N is a power of 2 ($N=2^n$), n being an integer that is not negative, the step a) includes the steps of:
    a1) forming a comb symbol tree $T_{2^n}$ which is formed of 1 to $2^n$ sub-carriers, wherein a comb symbol $X_{1,0}$ having $2^n$ sub-carriers is a parent node and a comb symbol $X_{2^a,b}$ having $2^{n-a}$ sub-carriers and having a frequency offset b includes $X_{2^{a-1},b}$ and $X_{2^{a-1},b+2^a}$ as child nodes, each having $2^{n-a-1}$ sub-carriers and having a frequency offset b and $b+2^a$, respectively, and a comb symbol having one sub-carrier is an end node; and
    a2) allocating comb symbols having appropriate size for a transmission rate requested by mobile station to the mobile station and preventing collision between the comb symbols by not allocating comb symbols corresponding to child nodes of the comb symbols in the tree $T_{2^n}$ to the other mobile stations in the cell to which the mobile station belongs, until the comb symbols having appropriate size are released from the allocation.

3. The method as recited in claim 2, wherein if the number of sub-carriers that can carry data is not a power of 2 due to the presence of null carriers among N sub-carriers in the entire usable frequency band, N being a power of 2 ($N=2^n$, n being an integer that is not negative), part of the data corresponding to the null carriers is punctured in the step a).

4. The method as recited in claim 2, wherein if the number of subcarriers that can carry data is not a power of 2 due to the presence of null carriers among N sub-carriers in the entire usable frequency band, N being a power of 2 ($N=2^n$, n being an integer that is not negative), any loss in the data transmission rate is prevented by inserting null data into the data at positions corresponding to the null carriers and allocating sub-carriers that are not null carriers to the data corresponding to the null carriers in the step a).

5. The method as recited in claim 1, wherein if there are N sub-carriers in the entire usable frequency band ($2^{n-1} < N < 2^n$), the step a) includes the steps of:

a3) forming a comb symbol sub-tree $T_{2^i}$ which is formed of 1 to $2^{n'}$ sub-carriers, wherein a comb symbol $X_{1,0}$ having $2^{n'}$ sub-carriers is a parent node and a comb symbol $X_{2^a,b}$ having $2^{n'-a}$ sub-carriers and having a frequency offset b includes $X_{2^{a-1},b}$ and $X_{2^{a-1},b+2^a}$ as child nodes, each having $2^{n'-a-1}$ subcarriers and having a frequency offset b and $b+2^a$, respectively, and a comb symbol having one sub-carrier is an end node;

a4) forming a multiple-tree having $a_i$ comb symbol sub-trees and a total of N subcarriers by performing the step a3) with respect to each i; and a5) selecting comb symbols having appropriate size for a transmission rate requested by a mobile station from one sub-tree out of the multiple-tree and allocating the comb symbols to the mobile station, and preventing collision between the comb symbols by not collecting comb symbols corresponding to child nodes of the comb symbols in the selected sub-tree to the other mobile stations in the cell to which the mobile station belongs, until the comb symbols having appropriate size are released from the allocation, wherein comb symbols of the multiple-tree formed of a plurality of sub-trees are re-defined as:

$$X_{st,N_c,q}(k) = \begin{cases} \neq 0, & k = pN_c + q + K_{si} \\ = 0, & \text{otherwise} \end{cases}$$

where st denotes a sub-tree index;

$K_{st}$ denotes a beginning frequency index of a sub-tree;

$p=0,1,\ldots,(N_{st}/N_c)-1$, $N_{st}$ being the number of sub-carriers of a sub-tree; and $q=0,1,\ldots,N_c-1$.

6. The method as recited in claim 5, wherein, in the step a5), the comb symbols having appropriate size for a transmission rate requested by the mobile terminal are selected preferentially from a sub-tree having no comb symbol allocated among the sub-trees of the multiple-tree.

7. The method as recited in claim 1, wherein the step a) includes the steps of:

a6) dividing N subcarriers existing in the entire usable frequency band into N sub-bands;

a7) forming a comb symbol sub-tree $T_{2^i}$ which is formed of 1 to $2^{n'}$ sub-carriers, wherein a comb symbol $X_{1,0}$ having $2^{n'}$ subcarriers is a root node and a comb symbol $X_{2^a,b}$ having $2^{n'-a}$ sub-carriers and having a frequency offset b includes $X_{2^{a-1},b}$ and $X_{2^{a-1},b+2^a}$ as child nodes, each having $2^{n'-a-1}$ sub-carriers and having a frequency offset b and $b+2^a$, respectively, and a comb symbol having one sub-carrier is an end node;

a8) forming a multiple-tree having M comb symbol sub-trees and a total of N sub-carriers by performing the step a7) with respect to each sub-band; and a9) selecting the comb symbols having appropriate size for a transmission rate requested by a mobile station from one sub-tree out of the multiple-tree and allocating the comb symbols to the mobile station, and preventing collision between the comb symbols by not allocating comb symbols corresponding to child nodes of the comb symbols having appropriate size in the selected sub-tree to the other mobile stations in the cell to which the mobile station belongs, until the comb symbols having appropriate size are released from the allocation, wherein comb symbols of the multiple-tree formed of M sub-trees are re-defined as:

$$X_{st,N_c,q}(k) = \begin{cases} \neq 0, & k = pN_c + q + K_{si} \\ = 0, & \text{otherwise} \end{cases}$$

where st denotes a sub-tree index;

$K_{st}$ denotes a beginning frequency index of a sub-tree;

$p=0,1,\ldots,(N_{st}/N_c)-1$, $N_{st}$ being the number of sub-carriers of a sub-tree; and $q=0,1,\ldots,N_c-1$.

8. The method as recited in claim 7, wherein, in the step b), frequency hopping is performed on the comb symbols on a basis of a sub-tree to which the comb symbols allocated to the mobile station belong.

9. The method as recited in claim 1, wherein, in the step b), the comb symbols perform frequency hopping to comb symbols having the same size but different frequency offset.

10. The method as recited in claim 1, wherein, in the step b), the comb symbols perform frequency hopping so that all comb symbols have a frequency hopping pattern randomly.

11. The method as recited in claim 1, wherein, in the step b), the comb symbols perform frequency hopping so that the same frequency hopping pattern is provided to all mobile stations within the same cell.

12. The method as recited in claim 11, wherein, in the step b), the comb symbols perform frequency hopping so that mobile stations between different cells can have different frequency hopping patterns.

13. The method as recited in claim 11, wherein, in the step b), the comb symbols perform frequency hopping so as to have different frequency hopping intervals between cells.

14. The method as recited in claim 11, wherein, in the step b), the comb symbols perform frequency hopping so that the direction of the frequency hopping could be different according to each cell.

15. The method as recited in claim 1, wherein if a comb symbol is to be allocated additionally upon a request of a mobile station, a comb symbol formed of a sub-carrier group that is adjacent to the sub-carrier group of the currently allocated comb symbol is allocated additionally.

16. The method as recited in claim 15, wherein if the additional comb symbol is formed of a sub-carrier group selected from sub-carrier groups each having the same size as the sub-carrier group constituting the currently allocated comb symbol.

17. The method as recited in claim 15, wherein, in the step b), the additionally allocated comb symbol performs frequency hopping among the sub-carrier groups each having the same size as the sub-carrier group constituting the currently allocated comb symbol.

18. The method as recited in claim 15, wherein, by utilizing a summation of sub-carrier groups constituting the allocated comb symbols as a minimum unit for frequency hopping, in the step b), the frequency hopping is performed into a comb symbol formed of a sub-carrier group that corresponds to a number obtained from:

$$G=(g_n+P(l)\times i) \bmod N_c$$

where G denotes a group number in a time slot 1;

P(l) denotes a frequency hopping pattern function;

i denotes the number of allocated groups; and $g_n$ denotes a group number in the initial time slot, and wherein, when a comb symbol is allocated additionally, the summation of the sub-carrier groups is the same as the summation of all the sub-carrier groups constituting the initially allocated comb symbol and the additionally allocated comb symbol.

19. The method as recited in claim 15, wherein, in the step b), the sub-carrier group constituting the initially allocated comb symbol is used as a minimum unit for frequency hopping and an allocated comb symbol performs frequency hopping.

20. The method as recited in claim 1, wherein inverse Fast Fourier Transform is performed based on Decimation In Frequency (DIF) algorithm in the step c), and the step c) includes a step of:
   c1) inputting the frequency domain signals X(k) by mapping input addresses of a fast Fourier Transform (FFT) unit to the frequency indexes k sequentially.

21. The method as recited in claim 20, wherein the step c) further includes a step of:
   c2) not performing butterfly computation, if 0 is inputted to all the input ends of a butterfly that forms the IFFT unit.

22. The method as recited in claim 1, wherein IFFT is performed based on Decimation In Time (DIT) algorithm and the step c) includes a step of:
   c3) inputting the frequency domain signals X(k) by mapping bit-reversed values of the input addresses of the IFFT unit to the frequency indexes k.

23. The method as recited in claim 22, wherein the step c) further includes a step of:
   c4) not performing butterfly computation, if 0 is inputted to all the input ends of a butterfly that forms the IFFT unit.

24. The method as recited in claim 1, further including the steps of:
   d) receiving time domain signals y(n) that corresponds to the comb symbols transmitted in the step c);
   e) restoring the time domain signals y(n) into a frequency offset established initially; and
   f) demodulating the modulated data sequence by performing FFT on the time domain signals y(n) to be transformed into frequency domain signals Y(k), k being a frequency index.

25. The method as recited in claim 24, wherein FFT is performed based on the DIF algorithm in the step f), and the step f) includes a step of:
   f1) outputting the frequency domain signals Y(k) by mapping bit-reversed values of output address of the FFT unit to the frequency indexes k.

26. The method as recited in claim 25, wherein the step f) further includes a step of:
   f2) controlling the butterfly, a part of the FFT unit, to perform or not perform computation according to the frequency domain signals Y(k) outputted from the FFT unit.

27. The method as recited in claim 24, wherein FFT is performed based on DIT algorithm in the step f), and the step f) includes a step of:
   f3) outputting the frequency domain signals Y(k) by mapping output addresses of the FFT unit and the frequency indexes k sequentially.

28. The method as recited in claim 27, wherein the step f) includes a step of:
   f4) controlling the butterfly, a part of the FFT unit, to perform or not perform computation according to the frequency domain signals Y(k) outputted from the FFT unit.

29. The method as recited in claim 1, wherein the data sequence corresponds to a pilot signal or a control signal.

30. The method as recited in claim 29, wherein the comb symbol performs frequency hopping to maintain a predetermined frequency offset including 0 in the step b).

31. The method as recited in claim 30, wherein, in the step a), the top priority order is given to sub-carrier groups including 0 addresses from input addresses of the IFFT unit and output addresses of the FFT unit and the next priority is given to sub-carrier groups neighboring the sub-carrier groups having priority, and comb symbols are allocated to the pilot signal or the control signal according to the priority order.

* * * * *